US012627900B2

(12) United States Patent
Tian et al.

(10) Patent No.: US 12,627,900 B2
(45) Date of Patent: May 12, 2026

(54) METHOD FOR SWITCHING CAMERAS AND ELECTRONIC DEVICE

(71) Applicant: HONOR DEVICE CO., LTD.,
Shenzhen (CN)

(72) Inventors: Chunlin Tian, Shenzhen (CN); Wenbo Wang, Shenzhen (CN); Yonghua Wang, Shenzhen (CN); Shiyu Zhu, Shenzhen (CN); Dongmiao Xi, Shenzhen (CN); Congchao Zhu, Shenzhen (CN)

(73) Assignee: HONOR DEVICE CO., LTD.,
Shenzhen (CN)

( * ) Notice: Subject to any disclaimer, the term of this patent is extended or adjusted under 35 U.S.C. 154(b) by 117 days.

(21) Appl. No.: 18/578,278

(22) PCT Filed: Aug. 11, 2023

(86) PCT No.: PCT/CN2023/112634
§ 371 (c)(1),
(2) Date: Jan. 10, 2024

(87) PCT Pub. No.: WO2024/087804
PCT Pub. Date: May 2, 2024

(65) Prior Publication Data
US 2025/0106529 A1 Mar. 27, 2025

(30) Foreign Application Priority Data
Oct. 24, 2022 (CN) .......................... 202211303569.6

(51) Int. Cl.
H04N 23/90 (2023.01)
H04N 23/63 (2023.01)
(Continued)

(52) U.S. Cl.
CPC ........... H04N 23/90 (2023.01); H04N 23/631 (2023.01); H04N 23/667 (2023.01); H04N 23/671 (2023.01); H04N 23/69 (2023.01)

(58) Field of Classification Search
CPC .... H04N 23/90; H04N 23/667; H04N 23/631; H04N 23/671
See application file for complete search history.

(56) References Cited

U.S. PATENT DOCUMENTS

| | | | |
|---|---|---|---|
| 9,749,543 | B2 | 8/2017 | Kim et al. |
| 11,245,832 | B2 | 2/2022 | Zhang et al. |

(Continued)

FOREIGN PATENT DOCUMENTS

| | | |
|---|---|---|
| CN | 110099211 A | 8/2019 |
| CN | 110708463 A | 1/2020 |

(Continued)

*Primary Examiner* — Girumsew Wendmagegn
(74) *Attorney, Agent, or Firm* — WOMBLE BOND DICKINSON (US) LLP

(57) ABSTRACT

This application relates to the field of terminals, and provides a method for switching cameras and an electronic device. The method is applicable to an electronic device, the electronic device includes a camera module, the camera module includes a first camera and a second camera, and the method includes: running a camera application in the electronic device; displaying a first image; determining whether a first distance and a second distance meet a first preset condition, where the first distance and the second distance indicate an object distance between the electronic device and a to-be-photographed object, the first distance is an object distance that is obtained based on a parameter of the first camera, and the second distance is an object distance that is obtained based on a parameter of the second camera; and displaying a second image when the first distance and the second distance meet the first preset condition.

20 Claims, 54 Drawing Sheets

(51) Int. Cl.
*H04N 23/667*    (2023.01)
*H04N 23/67*    (2023.01)
*H04N 23/69*    (2023.01)

(56)    References Cited

U.S. PATENT DOCUMENTS

| | | | |
|---|---|---|---|
| 12,010,408 | B2 | 6/2024 | Feng et al. |
| 2019/0037189 | A1* | 1/2019 | Yuan .................... H04N 1/6077 |
| 2022/0150420 | A1 | 5/2022 | Ren et al. |
| 2023/0247286 | A1 | 8/2023 | Cui et al. |

FOREIGN PATENT DOCUMENTS

| | | | |
|---|---|---|---|
| CN | 111183632 A | 5/2020 | |
| CN | 112672045 A | 4/2021 | |
| CN | 113099102 A | 7/2021 | |
| CN | 113747028 A | 12/2021 | |
| CN | 114339198 A | 4/2022 | |
| CN | 114422687 A | 4/2022 | |
| CN | 115802158 A | 3/2023 | |
| EP | 4030745 A1 | 7/2022 | |
| JP | 2020109560 A | 7/2020 | |
| KR | 20220072616 A | 6/2022 | |
| WO | WO-2020073959 A1 * | 4/2020 | ............ H04N 23/67 |
| WO | 2021000063 A1 | 1/2021 | |

\* cited by examiner

Second position (a)

First position          Second position (b)

300

| Run a camera application | S310 |

| Display a first image | S320 |

| Determine whether a first distance and a second distance meet a first preset condition | S330 |

| When the first distance and the second distance meet the first preset condition, display a second image | S340 |

(a)            (b)            (c)

METHOD FOR SWITCHING CAMERAS AND ELECTRONIC DEVICE

CROSS-REFERECNE TO RELATED APPLICATIONS

This application is a national stage of International Application No. PCT/CN2023/112634, filed on Aug. 11, 2023, which claims priority to Chinese Patent Application No. 202211303569.6, filed on Oct. 24, 2022. The disclosures of both of the aforementioned applications are hereby incorporated by reference in their entireties.

TECHNICAL FIELD

This application relates to the field of terminals, and specifically, to a method for switching cameras and an electronic device.

BACKGROUND

When shooting, an electronic device often faces the need to automatically switch cameras to collect a clear image; for example, when shooting distant scenery, the electronic device may switch to a telephoto camera; and when shooting close-up scenery, the electronic device may switch to an ultra wide-angle camera. When the electronic device does not include a laser sensor, the electronic device may automatically switch between different cameras based on a parameter of a wide-angle camera; for example, when identifying, based on the parameter of the wide-angle camera, that a distance between the electronic device and a to-be-photographed object is less, the electronic device may automatically switch to the ultra wide-angle camera and use the ultra wide-angle camera as a main camera, to enter a super macro mode; but when the distance between the electronic device and the to-be-photographed object is less, the distance between the electronic device and the to-be-photographed object is less than an effective distance for the wide-angle camera that performs focusing. As a result, accuracy of the parameter of the wide-angle camera is reduced, causing a problem that the electronic device may automatically exits when shooting in the super macro mode, and resulting in poor stability of the super macro mode.

Therefore, how to improve stability of a photographing mode (for example, the super macro mode or a super long shot mode) in the electronic device has become an urgent problem that needs to be resolved.

SUMMARY

This application provides a method for switching cameras and an electronic device, to improve stability of a photographing mode (for example, a super macro mode) in the electronic device and improve shooting experience of a user.

According to a first aspect, a method for switching cameras is provided, applicable to an electronic device, where the electronic device includes a camera module, the camera module includes a first camera and a second camera, and the method includes:

running a camera application in the electronic device;

displaying a first image, where the first image is obtained by collecting an image by using the first camera as a main camera;

determining whether a first distance and a second distance meet a first preset condition, where the first distance and the second distance indicate an object distance between the electronic device and a to-be-photographed object, the first distance is an object distance that is obtained based on a parameter of the first camera, and the second distance is an object distance that is obtained based on a parameter of the second camera; and displaying a second image when the first distance and the second distance meet the first preset condition, where the second image is obtained by collecting an image by using the second camera as the main camera.

In embodiments of this application, the second image is displayed when the first distance and the second distance meet the first preset condition, where the electronic device switches to the second camera and uses the second camera as the main camera; because the first distance is the object distance that is obtained based on the parameter of the first camera, the second distance is the object distance that is obtained based on the parameter of the second camera; therefore, in embodiments of this application, when it is determined whether to switch to the second camera and use the second camera as the main camera, it is determined whether to switch cameras based on a double-restriction condition; and compared with an existing solution, which determines whether to switch cameras based only on the parameter of the second camera, the method for switching cameras provided in embodiments of this application is more accurate, to be specific, stability of a photographing mode in the electronic device is better.

With reference to the first aspect, in some implementations of the first aspect, the first distance and the second distance meet the first preset condition, including:

determining that the first distance is greater than a first preset threshold, and the second distance is greater than a second preset threshold, where the first preset threshold is different from the second preset threshold.

With reference to the first aspect, in some implementations of the first aspect, the first preset threshold is a preset threshold that is obtained based on a first distance range, and the first distance range is used to represent an effective distance range for focusing by the first camera.

With reference to the first aspect, in some implementations of the first aspect, the second preset threshold is a preset threshold that is obtained based on a second distance range, and the second distance range is used to represent an effective distance range for focusing by the second camera.

With reference to the first aspect, in some implementations of the first aspect, the method further includes:

determining whether a brightness parameter of a photographing scene in which the electronic device is located is less than or equal to a first brightness threshold when the first distance and/or the second distance do not meet the first preset condition; and displaying the second image when the brightness parameter is less than or equal to the first brightness threshold.

In embodiments of this application, when the first distance and/or the second distance do not meet the preset condition, the electronic device may further determine whether to exit a super macro mode based on the brightness parameter of the photographing scene; because when the photographing scene in which the electronic device is located is dark, the parameter collected by the first camera and the parameter collected by the second camera are less accurate; because the parameter collected by the first camera and the parameter collected by the second camera are less accurate, accuracy of the first distance and accuracy of the second distance are low; and in this case, the electronic device may directly exit the super macro mode.

With reference to the first aspect, in some implementations of the first aspect, the first brightness threshold is a preset threshold obtained based on a first brightness range, and the first brightness range is used to represent an effective brightness range in which the first camera performs focusing.

With reference to the first aspect, in some implementations of the first aspect, a zoom ratio corresponding to a case that the electronic device displays the first image is a first zoom ratio, a current zoom ratio of the electronic device is a second zoom ratio, and the method further includes:

determining whether the second zoom ratio is the same as the first zoom ratio when the brightness parameter is greater than the first brightness threshold; and displaying the second image when the second zoom ratio is different from the first zoom ratio.

In embodiments of this application, it may be determined whether a zoom ratio of the electronic device changes when the first distance and/or the second distance do not meet a preset condition and the brightness parameter of the photographing scene in which the electronic device is located is greater than a first brightness threshold; if the zoom ratio of the electronic device changes, the electronic device exits the super macro mode; for example, if the zoom ratio of the electronic device changes, it may be that a user adjusts the zoom ratio of the electronic device; and in this case, the electronic device exits the super macro mode.

With reference to the first aspect, in some implementations of the first aspect, the displaying a first image includes:

displaying the first image when a brightness parameter of a photographing environment in which the electronic device is located is greater than a second brightness threshold, and the second distance is less than or equal to a third preset threshold.

In embodiments of this application, when the electronic device enters the super macro mode, whether the electronic device enters the super macro mode may be determined based on brightness of the photographing scene of the electronic device and the second distance; and compared with determining whether the electronic device enters the super macro mode based on the second distance, accuracy of entering the super macro mode in embodiments of this application is higher.

With reference to the first aspect, in some implementations of the first aspect, the second brightness threshold is a preset threshold that is obtained based on a second brightness range, and the second brightness range is used to represent an effective brightness range in which the second camera performs focusing.

With reference to the first aspect, in some implementations of the first aspect, when the first camera includes an open loop motor, the method further includes:

obtaining the parameter of the first camera;

performing compensation processing on the parameter of the first camera based on a calibration value of the first camera, to obtain a processed parameter; and obtaining the first distance based on the processed parameter.

With reference to the first aspect, in some implementations of the first aspect, the displaying a first image includes:

displaying the first image when the electronic device is in a super macro mode.

With reference to the first aspect, in some implementations of the first aspect, the displaying the first image when the electronic device is in a super macro mode includes:

displaying the first image on a first display interface of the electronic device, where the first display interface further includes a first icon, and the first icon indicates the super macro mode.

With reference to the first aspect, in some implementations of the first aspect, the first icon includes a first control, and the method further includes:

detecting a first operation on the first control; and exiting, by the electronic device, the super macro mode in response to the first operation.

With reference to the first aspect, in some implementations of the first aspect, the displaying a second image includes:

displaying the second image when the electronic device exits the super macro mode.

With reference to the first aspect, in some implementations of the first aspect, the first camera includes an ultra wide-angle camera or a telephoto camera, and/or the second camera includes a wide-angle camera.

In an example, the first camera is an ultra wide-angle camera, and the second camera is a wide-angle camera; when the electronic device is in the super macro mode, the electronic device uses the ultra wide-angle camera as a main camera, and the electronic device displays the first image; and when the electronic device exits the super macro mode, the electronic device uses the wide-angle camera as the main camera, and the electronic device displays the second image.

In an example, the first camera is a telephoto camera, and the second camera is a wide-angle camera; when the electronic device is in a super long shot mode, the electronic device uses the telephoto camera as the main camera, and the electronic device displays the first image; and when the electronic device exits the super long shot mode, the electronic device uses the wide-angle camera as the main camera, and the electronic device displays the second image.

With reference to the first aspect, in some implementations of the first aspect, the electronic device is at a same position when the electronic device displays the first image and the second image.

In embodiments of this application, a position of the electronic device may remain unchanged in a shooting process. If a focus object of the electronic device moves from a long shot to-be-photographed object to a close-up to-be-photographed object, the electronic device may automatically identify a distance between the electronic device and a to-be-photographed object and enter the super macro mode; if the focus object of the electronic device moves from the close-up to-be-photographed object to the long shot to-be-photographed object, the electronic device may automatically identify the distance between the electronic device and the to-be-photographed object and exit the super macro mode; and the electronic device may automatically switch different types of cameras and use the different types of cameras as the main camera, to ensure image quality of the collected images.

With reference to the first aspect, in some implementations of the first aspect, the first image includes a first to-be-photographed object, the second image includes a second to-be-photographed object, the first to-be-photographed object and the second to-be-photographed object are at a same position, a distance between the first to-be-photographed object and the electronic device is a third distance, a distance between the second to-be-photographed object and the electronic device is a fourth distance, and the third distance is less than the fourth distance.

In embodiments of this application, a position of electronic device may change in a shooting process; for example, the electronic device may move to shoot different to-be-photographed objects (for example, the first to-be-photographed object and the to-be-photographed second object); if the focus object of the electronic device moves from the close-up to-be-photographed object to the long shot to-be-photographed object, the electronic device may automatically identify the distance between the electronic device and the to-be-photographed object and exit the super macro mode; and the electronic device may automatically switch different types of cameras and use the different types of cameras as the main camera, to ensure image quality of the collected images.

With reference to the first aspect, in some implementations of the first aspect, the first image and the second image include a third to-be-photographed object, and the third to-be-photographed object is at a same position when the first image and the second image are displayed; a distance between the third to-be-photographed object and the electronic device is a fifth distance when the first image is collected; and a distance between the third to-be-photographed object and the electronic device is a sixth distance when the second image is collected, and the fifth distance is less than the sixth distance.

In embodiments of this application, a position of electronic device may change in a shooting process; for example, the electronic device may move to shoot a same to-be-photographed object (for example, a third to-be-photographed object); if the focus object of the electronic device moves from the close-up to-be-photographed object to the long shot to-be-photographed object, the electronic device may automatically identify the distance between the electronic device and the to-be-photographed object and exit the super macro mode; and the electronic device may automatically switch different types of cameras and use the different types of cameras as the main camera, to ensure image quality of the collected images.

According to a second aspect, an electronic device is provided, including modules or units configured to perform the first aspect or any method for switching cameras in the first aspect.

According to a third aspect, an electronic device is provided, where the electronic device includes one or more processors, a memory, and a camera module, where the camera module includes a first camera and a second camera; and the memory is coupled to the one or more processors, the memory is configured to store computer program code, the computer program code includes computer instructions, and the one or more processors invoke the computer instructions to enable the electronic device to perform:

running a camera application in the electronic device;

displaying a first image, where the first image is obtained by collecting an image by using the first camera as a main camera;

determining whether a first distance and a second distance meet a first preset condition, where the first distance and the second distance indicate an object distance between the electronic device and a to-be-photographed object, the first distance is an object distance that is obtained based on a parameter of the first camera, and the second distance is an object distance that is obtained based on a parameter of the second camera; and displaying a second image when the first distance and the second distance meet the first preset condition, where the second image is obtained by collecting an image by using the second camera as the main camera.

With reference to a third aspect, in some implementations of the third aspect, the one or more processors are further configured to invoke the computer instructions to enable the electronic device to perform:

determining that the first distance is greater than a first preset threshold, and the second distance is greater than a second preset threshold, where the first preset threshold is different from the second preset threshold.

With reference to a third aspect, in some implementations of the third aspect, the first preset threshold is a preset threshold that is obtained based on a first distance range, and the first distance range is used to represent an effective distance range for focusing by the first camera.

With reference to a third aspect, in some implementations of the third aspect, the second preset threshold is a preset threshold that is obtained based on a second distance range, and the second distance range is used to represent an effective distance range for focusing by the second camera.

With reference to a third aspect, in some implementations of the third aspect, the one or more processors are further configured to invoke the computer instructions to enable the electronic device to perform:

determining whether a brightness parameter of a photographing scene in which the electronic device is located is less than or equal to a first brightness threshold when the first distance and/or the second distance do not meet the first preset condition; and displaying the second image when the brightness parameter is less than or equal to the first brightness threshold.

With reference to a third aspect, in some implementations of the third aspect, the first brightness threshold is a preset threshold obtained based on a first brightness range, and the first brightness range is used to represent an effective brightness range in which the first camera performs focusing.

With reference to a third aspect, in some implementations of the third aspect, a zoom ratio corresponding to a case that the electronic device displays the first image is a first zoom ratio, a current zoom ratio of the electronic device is a second zoom ratio, and the one or more processors invoke the computer instructions to enable the electronic device to perform:

determining whether the second zoom ratio is the same as the first zoom ratio when the brightness parameter is greater than the first brightness threshold; and displaying the second image when the second zoom ratio is different from the first zoom ratio.

With reference to a third aspect, in some implementations of the third aspect, the one or more processors are further configured to invoke the computer instructions to enable the electronic device to perform:

displaying the first image when a brightness parameter of a photographing environment in which the electronic device is located is greater than a second brightness threshold, and the second distance is less than or equal to a third preset threshold.

With reference to a third aspect, in some implementations of the third aspect, the second brightness threshold is a preset threshold that is obtained based on a second brightness range, and the second brightness range is used to represent an effective brightness range in which the second camera performs focusing.

With reference to a third aspect, in some implementations of the third aspect, when the first camera includes an open loop motor, the one or more processors invoke the computer instructions to enable the electronic device to perform:

obtaining the parameter of the first camera;

performing compensation processing on the parameter of the first camera based on a calibration value of the first camera, to obtain a processed parameter; and obtaining the first distance based on the processed parameter.

With reference to a third aspect, in some implementations of the third aspect, the one or more processors are further configured to invoke the computer instructions to enable the electronic device to perform:

displaying the first image when the electronic device is in a super macro mode.

With reference to a third aspect, in some implementations of the third aspect, the one or more processors are further configured to invoke the computer instructions to enable the electronic device to perform:

displaying the first image on a first display interface of the electronic device, where the first display interface further includes a first icon, and the first icon indicates the super macro mode.

With reference to a third aspect, in some implementations of the third aspect, the first icon includes a first control, and the one or more processors invoke the computer instructions to enable the electronic device to perform:

detecting a first operation on the first control; and exiting, by the electronic device, the super macro mode in response to the first operation.

With reference to a third aspect, in some implementations of the third aspect, the one or more processors are further configured to invoke the computer instructions to enable the electronic device to perform:

displaying the second image when the electronic device exits the super macro mode.

With reference to a third aspect, in some implementations of the third aspect, the first camera includes an ultra wide-angle camera or a telephoto camera, and/or the second camera includes a wide-angle camera.

With reference to a third aspect, in some implementations of the third aspect, the electronic device is at a same position when the electronic device displays the first image and the second image.

With reference to a third aspect, in some implementations of the third aspect, the first image includes a first to-be-photographed object, the second image includes a second to-be-photographed object, the first to-be-photographed object and the second to-be-photographed object are at a same position, a distance between the first to-be-photographed object and the electronic device is a third distance, a distance between the second to-be-photographed object and the electronic device is a fourth distance, and the third distance is less than the fourth distance.

With reference to a third aspect, in some implementations of the third aspect, the first image and the second image include a third to-be-photographed object, and the third to-be-photographed object is at a same position when the first image and the second image are displayed; a distance between the third to-be-photographed object and the electronic device is a fifth distance when the first image is collected; and a distance between the third to-be-photographed object and the electronic device is a sixth distance when the second image is collected, and the fifth distance is less than the sixth distance.

According to a fourth aspect, an electronic device is provided, including one or more processors and a memory, where the memory is coupled to the one or more processors, the memory is configured to store computer program code, the computer program code includes computer instructions, and the one or more processors invoke the computer instructions to enable the electronic device to perform the first aspect or any method in the first aspect.

According to a fifth aspect, a chip system is provided. The chip system is applicable to an electronic device, and the chip system includes one or more processors, where the processors are configured to invoke computer instructions to enable the electronic device to perform the first aspect or any method in the first aspect.

According to a sixth aspect, a computer-readable storage medium is provided. The computer-readable storage medium stores a computer program; and when the computer program code is run by an electronic device, the electronic device is enabled to perform the first aspect or any method in the first aspect.

According to a seventh aspect, a computer program product is provided. The computer program product includes computer program code. When the computer program code is run by an electronic device, the electronic device is enabled to perform the first aspect or any method in the first aspect.

In embodiments of this application, when the first distance and the second distance meet the first preset condition, the electronic device switches to the second camera and uses the second camera as the main camera; because the first distance is the object distance that is obtained based on the parameter of the first camera, the second distance is the object distance that is obtained based on the parameter of the second camera; therefore, in embodiments of this application, when it is determined whether to switch to the second camera and use the second camera as the main camera, it is determined whether to switch cameras based on a double-restriction condition; and compared with an existing solution, which determines whether to switch cameras based only on the parameter of the second camera, stability of the method for switching cameras provided in embodiments of this application is higher.

DESCRIPTION OF EMBODIMENTS

Figure 1A:
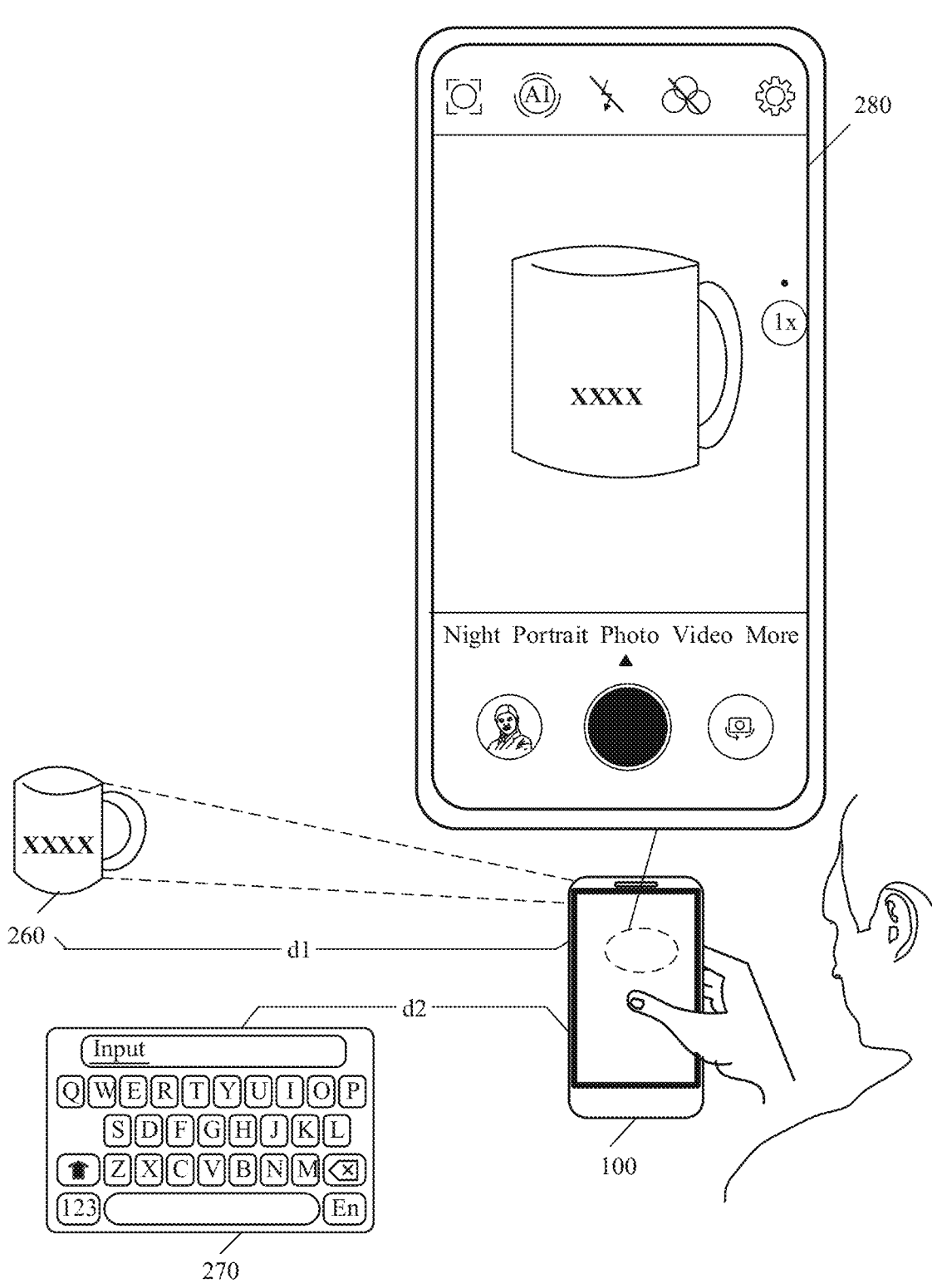
FIG. 1A and FIG. 1B are schematic diagrams of a photographing scene in a super macro mode applicable to this application.

In embodiments of this application, the terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In descriptions of this embodiment, unless otherwise stated, "a plurality of" means two or more.

For ease of understanding of embodiments of this application, first, a brief description of the related concepts involved in embodiments of this application is provided.

1. Field of View (Field of View, FOV)

The field of view is also referred to as the field of view in optical engineering. A size of the field of view determines a field of view of an optical instrument; and a field of view of an electronic device indicates a maximum angle that a camera may shoot in a process in which the electronic device shoots a to-be-photographed object.

It should be understood that the field of view may be further referred to as a "field of view range", a "field of view range", a "field of view area", or the like.

2. Distance Parameter

The distance parameter may be configured to represent distance information between a lens and a sensor in the electronic device; for example, the greater the distance parameter, the greater the distance between the lens and the sensor, which may represent that the closer the distance between the electronic device and the to-be-photographed object; and the less the distance parameter, the less the distance between the lens and the sensor, which may represent that the greater the distance between the electronic device and the to-be-photographed object. It should be understood that the distance parameter may be referred to as a "code value"; or the distance parameter may also be referred to as a lens position (lens position).

3. One Time Programmable (One Time Programmable, OTP) Data

The OTP is a memory type of MCU, configured to represent one-time programming; and the OTP mostly uses a fused wire structure, and the programming process is an irreversible destructive activity.

It should be understood that in embodiments of this application, OTP data is data stored in a component of a camera; and the OTP data does not change as a photographing scene or the to-be-photographed object changes.

Optionally, in embodiments of this application, the OTP data includes a mapping relationship between a code value of the camera and an object distance; the object distance refers to an object distance between the electronic device and the to-be-photographed object; and the code value is used to represent a movement distance of a motor that is output when the camera in the electronic device performs focusing.

4. Zoom Ratio (Zoom)

The zoom ratio is used to represent a zoom size of the electronic device when shooting.

5. Main Camera and Auxiliary Camera

The electronic device may include a plurality of cameras; for example, the plurality of cameras may include the main camera and the auxiliary camera; when the electronic device collects an image, the image collected by the main camera is usually used as a benchmark, to perform processing on the image collected by the main camera; and in a process of processing, a part of image information collected by the auxiliary camera may be extracted to compensate for the image collected by the main camera, images collected by the two cameras may be fused, and a displayed image is obtained after processing, to implement functions such as improving shooting quality, background blur, optical zoom, and the like.

For example, if the electronic device is in a single-camera mode when collecting the image, to be specific, the electronic device turns on one camera to collect the image, the camera is the main camera.

For example, if the electronic device is in a dual-camera mode when collecting the image, to be specific, the electronic device turns on two cameras to collect images, where one camera is the main camera and the other camera is the auxiliary camera; when the electronic device collects an image, the image collected by the main camera is usually used as a benchmark, to perform processing on the image collected by the main camera; and in a process of processing, a part of image information collected by the auxiliary camera may be extracted to compensate for the image collected by the main camera, images collected by the two cameras may be fused, and the displayed image is obtained after processing, to implement functions such as improving shooting quality, background blur, optical zoom, and the like.

In an example, dual cameras in the electronic device may be a wide-angle camera and a telephoto camera, where the wide-angle camera may be used as the main camera, and the telephoto camera may be used as the auxiliary camera; the image collected by the wide-angle camera is used as a benchmark, in a process of performing processing on the image collected by the wide-angle camera, image information of a distant to-be-photographed object collected by the telephoto camera may be extracted, to implement fusion of the image collected by the wide-angle camera and the image collected by the telephoto camera, and detailed information of the distant to-be-photographed object may be supplemented through the telephoto camera; and the displayed image is obtained after processing, so that the electronic device has a further optical zoom when shooting.

For example, the dual camera mode in the electronic device may further include: a wide-angle camera and an ultra wide-angle camera, a color camera and a black-and-white camera, a color camera and a depth camera, and the like.

For example, if the electronic device is in a multi-camera mode when collecting an image, for example, when the electronic device is in a three-camera mode when collecting an image, the electronic device may turn on three cameras when collecting an image; the three cameras include one main camera and two auxiliary cameras; when the electronic device collects an image, the image collected by the main camera is usually used as a benchmark, to perform processing on the image collected by the main camera; and in a process of processing, a part of image information collected by two auxiliary cameras may be extracted to compensate for the image collected by the main camera, images collected by the three cameras may be fused, and the displayed image is obtained after processing, to implement functions such as improving shooting quality, background blur, optical zoom, and the like.

For example, the multi-camera mode in the electronic device may include a wide-angle camera, a black-and-white camera, and a near-infrared camera, where the wide-angle camera may be the main camera, and the black-and-white camera and the near-infrared camera may be the auxiliary cameras. A main image is obtained through the wide-angle camera, detailed information of an image in a dark area of a to-be-photographed object may be supplemented through the black-and-white camera, and detailed information of distant scenery of the to-be-photographed object may be supplemented through the near-infrared camera.

It should be understood that the foregoing is an example description of the single-camera mode, the dual-camera mode, and the multi-camera mode of the electronic device; and this application does not place any limitation on types of cameras in the single-camera mode, the dual-camera mode, or the multi-camera mode.

6. Super Macro Mode

The super macro mode refers to a photographing mode in which the electronic device automatically switches to the ultra wide-angle camera and uses the ultra wide-angle camera as the main camera when the electronic device is between a 1-fold zoom ratio (1×) and a 2-fold zoom ratio (2×).

For example, the electronic device is in a photographing scene from far to near; for example, when a position of the electronic device remains unchanged, a zoom center of the electronic device at a first moment is a first to-be-photographed object; a zoom center of the electronic device is a second to-be-photographed object at a second moment, a distance between the first to-be-photographed object and the electronic device is great, and a distance between the second to-be-photographed object and the electronic device is less; and when the electronic device shoots the second to-be-photographed object, the electronic device may automatically use the ultra wide-angle camera as the main camera and enter the super macro mode to increase a field of view of the electronic device when shooting.

Figure 1B:
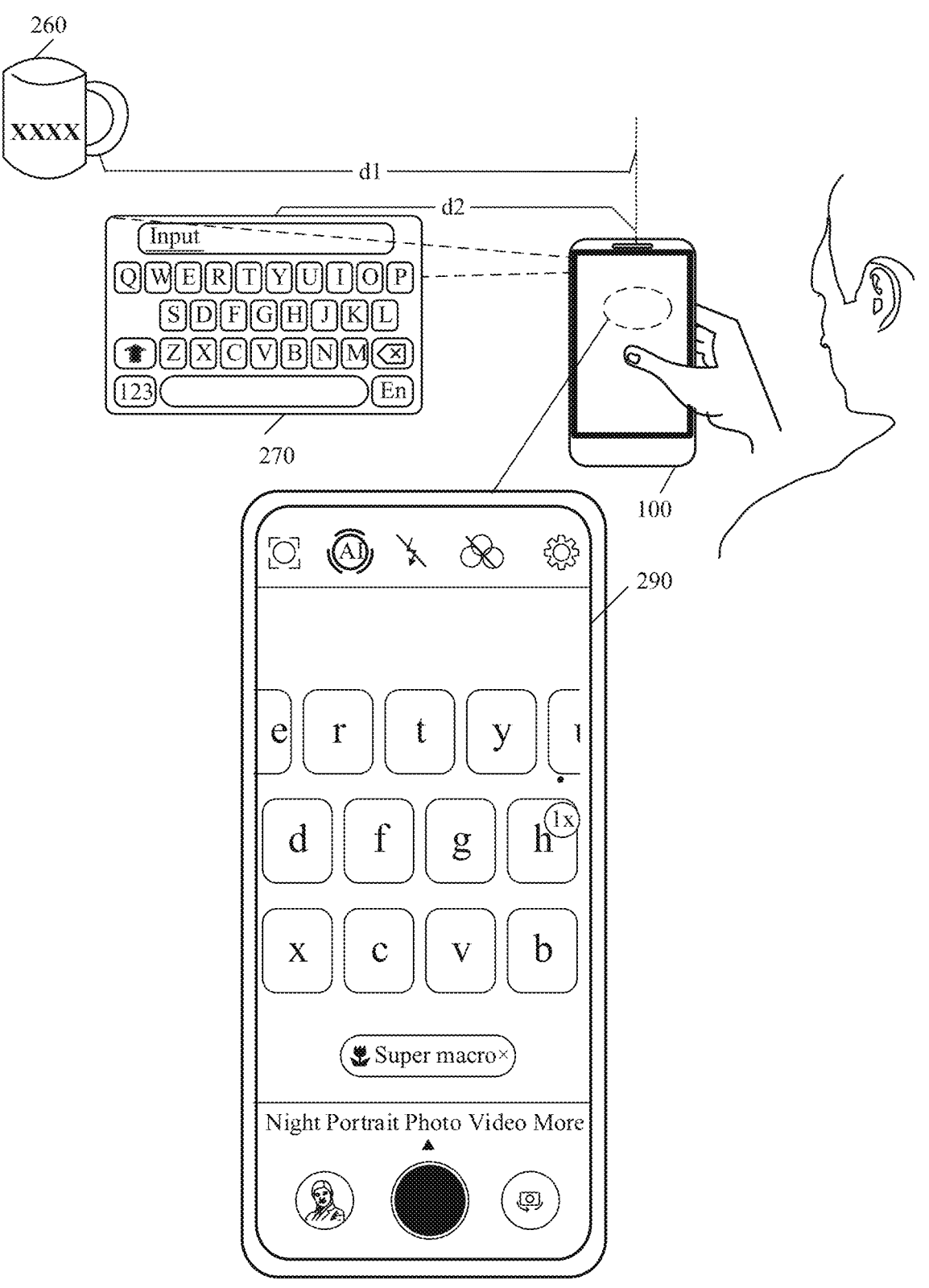
Figure 2:
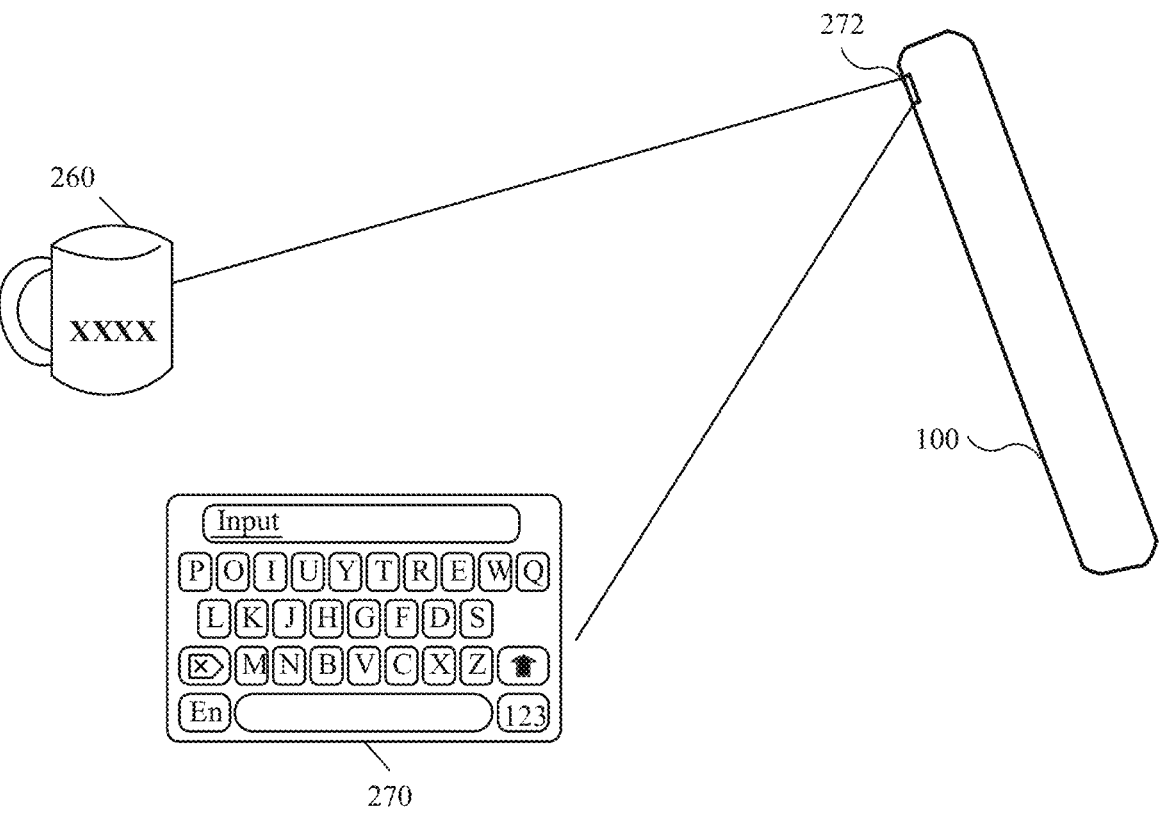
FIG. 2 is a side view of a photographing scene in a super macro mode applicable to this application.

For example, as shown in (a) in FIG. 1, the same photographing scene includes a first to-be-photographed object 260 and a second to-be-photographed object 270. A distance between the first to-be-photographed object and the electronic device is d1, a distance between the second to-be-photographed object and the electronic device is d2, and d2 is less than d1; FIG. 2 is a side view of the photographing scene, and the electronic device 100 includes a camera module 272; the electronic device remains at a same position in a shooting process; the electronic device opens a camera application, the electronic device performs focusing on the first to-be-photographed object 260 at a first moment, and the electronic device may display a display interface 280; in this case, a zoom ratio of the electronic device is 1× (it may be understood that the zoom ratio may also be any value between 1× and 2×, or may be another value, which is not limited in embodiments of this application); as shown in (b) in FIG. 1A and FIG. 1B, at a second moment, a zoom ratio of the electronic device is kept at 1× (it may be understood that the zoom ratio may also be any value between 1× and 2×, or may be another value, which is not limited in embodiments of this application) and a to-be-photographed object is changed; and for example, the electronic device performs focusing on the second to-be-photographed object 270, in this case, the electronic device identifies that the distance between the second to-be-photographed object 270 and the electronic device is less, and the electronic device may enter the super macro mode and automatically switch to the ultra wide-angle camera and use the ultra wide-angle camera as the main camera to perform focusing, and display a display interface 290.

Optionally, the photographing scene of the electronic device from far to near may also mean that the electronic device shoots the same to-be-photographed object, the electronic device moves, and the distance between the electronic device and the to-be-photographed object gradually becomes less.

For example, the electronic device 100 is in a photographing scene from far to near; for example, when a position of the to-be-photographed object remains unchanged, the electronic device 100 moves in a shooting process; and the distance between the to-be-photographed object and the electronic device 100 is from great to less, and when the electronic device 100 identifies that the distance between the electronic device and the to-be-photographed object is less based on a parameter of the camera module, the electronic device may automatically use the ultra wide-angle camera as the main camera, and enter the super macro mode to increase the field of view of the electronic device when shooting.

Figure 3:
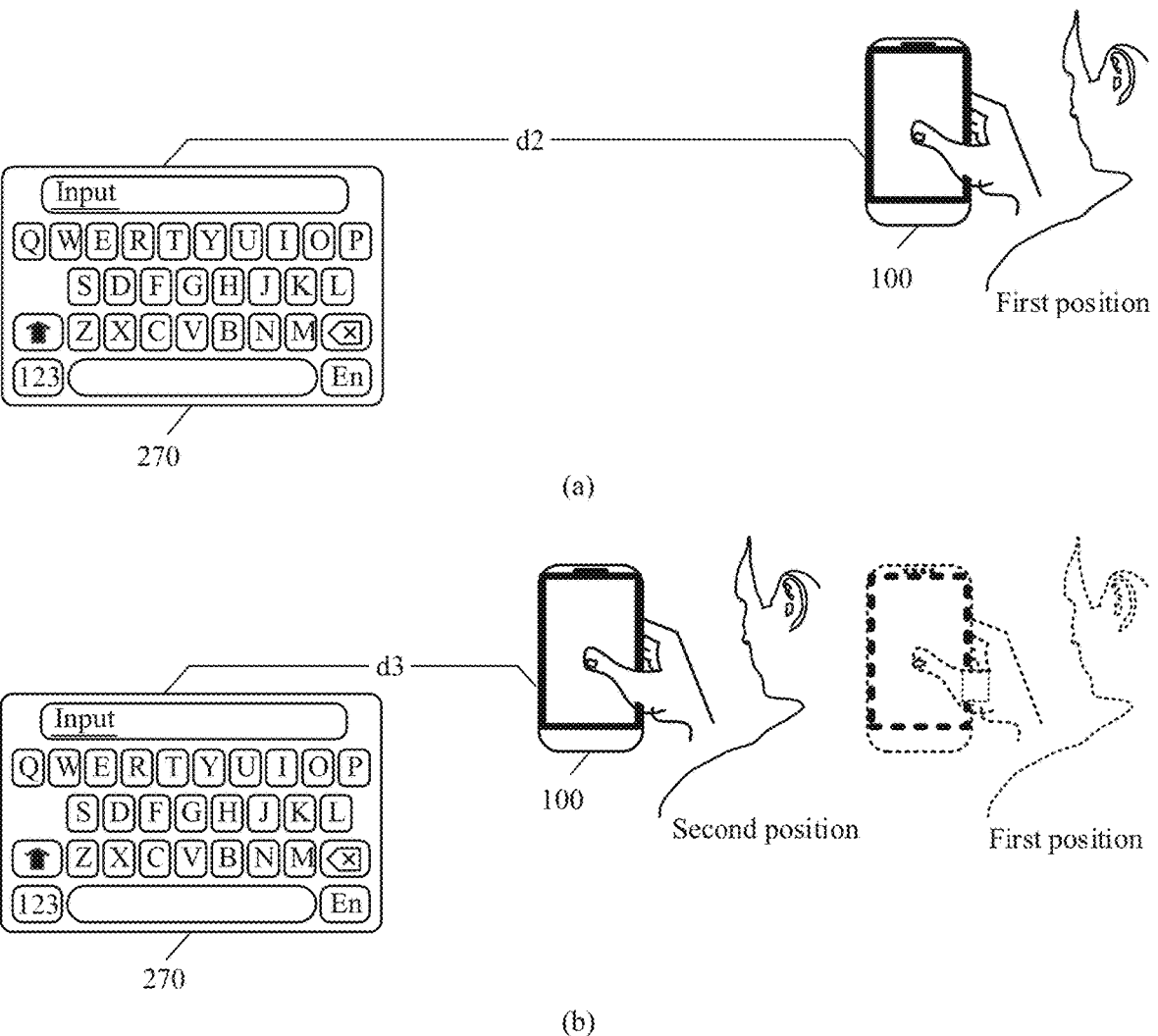
FIG. 3 is another schematic diagram of a photographing scene in a super macro mode applicable to this application.

For example, as shown in (a) in FIG. 3, a position of the second to-be-photographed object 270 remains unchanged in a shooting process; at the first moment, the electronic device 100 performs shooting at the first position, and the distance between the electronic device and the second to-be-photographed object 270 is d2; as shown in (b) in FIG. 3, the electronic device 100 moves from the first position to the second position for shooting; in this case, the distance between the electronic device 100 and the second to-be-photographed object 270 is d3, and d3 is less than d2; and the electronic device 100 identifies that the distance between the second to-be-photographed object 270 and the electronic device 100 is less, and the electronic device 100 may automatically use the ultra wide-angle camera as the main camera, and enter the super macro mode to increase the field of view of the electronic device when shooting.

For example, the electronic device is in a photographing scene from far to near; for example, when a position of the electronic device remains unchanged, a to-be-photographed object of the electronic device is a moving to-be-photographed object; and the distance between the moving to-be-photographed object and the electronic device 100 is from great to less, and when the electronic device 100 identifies that the distance between the electronic device and the to-be-photographed object is less based on a parameter of the camera module, the electronic device 100 may automatically switch to the ultra wide-angle camera and use the ultra wide-angle camera as a photographing mode of the main camera.

Figure 4:
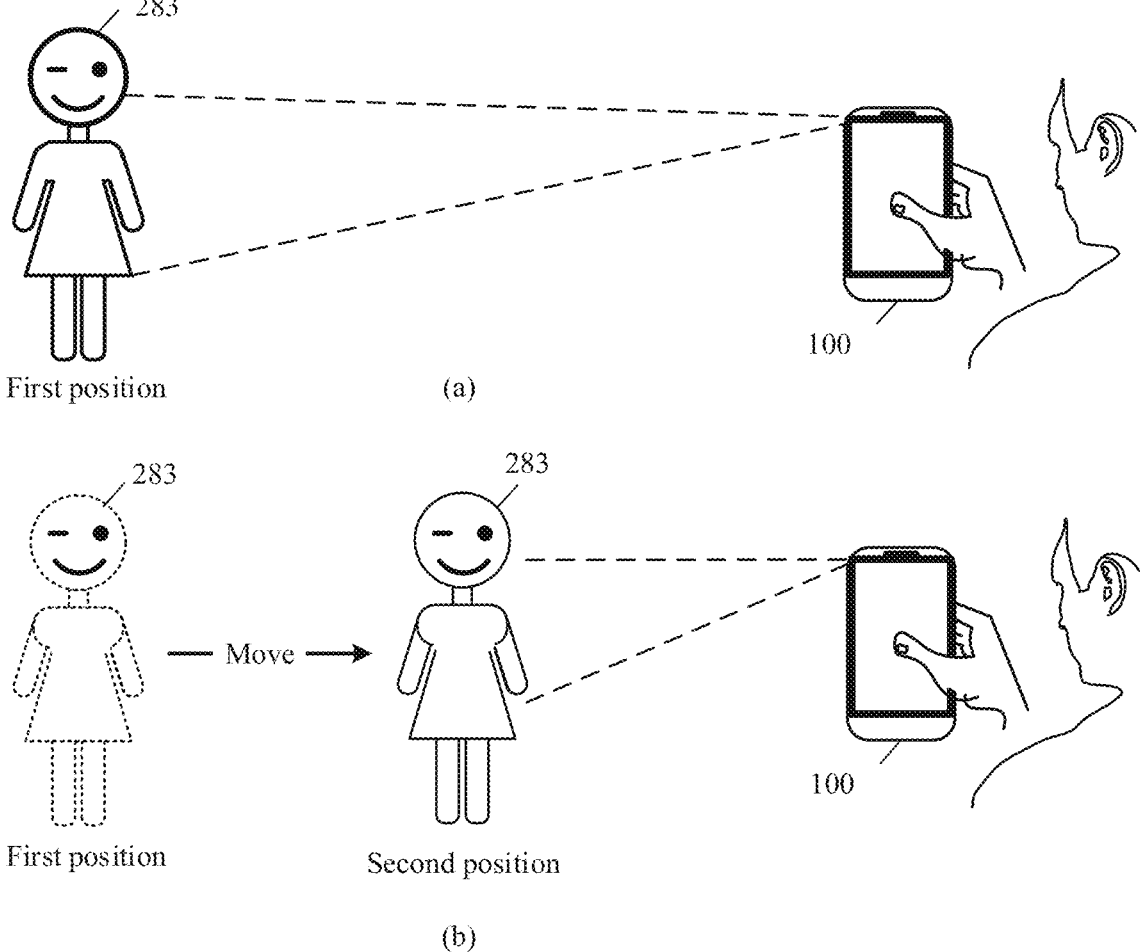
FIG. 4 is still another schematic diagram of a photographing scene in a super macro mode applicable to this application.

For example, as shown in (a) in FIG. 4, when the position of the electronic device remains unchanged, at a first moment, a third to-be-photographed object 283 is located at a first position, and the electronic device 100 shoots the third to-be-photographed object 283; and as shown in (b) in FIG. 4, at a second moment, the electronic device 100 identifies that the third to-be-photographed object 283 moves to a second position based on a parameter of a shooting module, the electronic device 100 identifies that the distance between the third to-be-photographed object 283 and the electronic device 100 is less, and the electronic device 100 may automatically use the ultra wide-angle camera as the main camera, and enter the super macro mode to increase the field of view of the electronic device when shooting.

7. Super Long Shot Mode

The super long shot mode refers to a photographing mode in which the electronic device automatically uses a telephoto camera as a main camera to collect images.

For example, the electronic device is in a photographing scene from near to far; for example, when a position of the electronic device remains unchanged, a zoom center of the electronic device at a first moment is a first to-be-photographed object; a zoom center of the electronic device is a fourth to-be-photographed object at a second moment, a distance between the first to-be-photographed object and the electronic device is less, and a distance between the fourth to-be-photographed object and the electronic device is less; and when the electronic device shoots the third to-be-photographed object, the electronic device may automatically use the telephoto camera as the main camera, and enter the super long shot mode to add detailed information of a long shot to-be-photographed object.

Figure 5A:
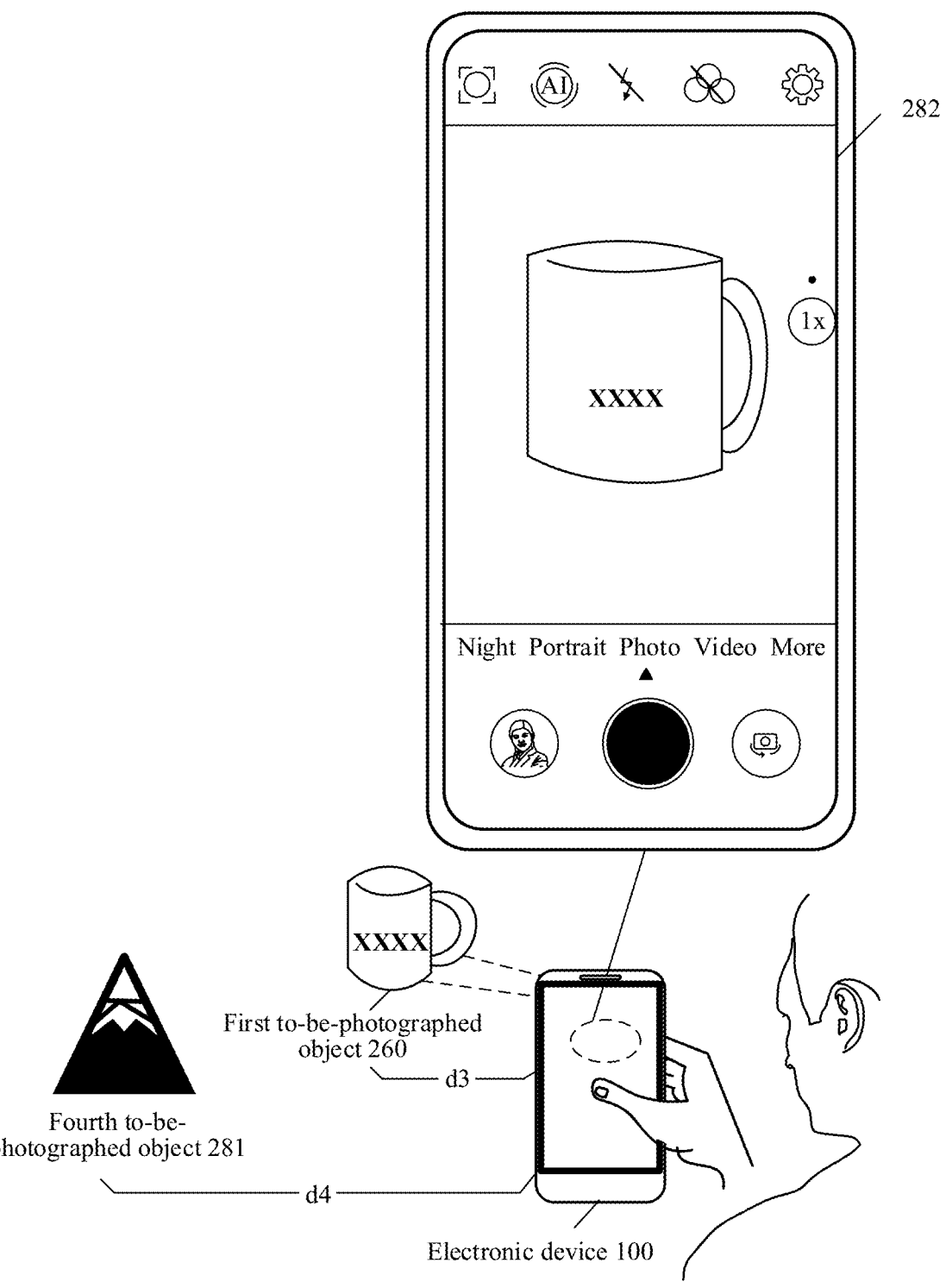
FIG. 5A and FIG. 5B are schematic diagrams of a photographing scene in a super long shot mode applicable to this application.
Figure 5B:
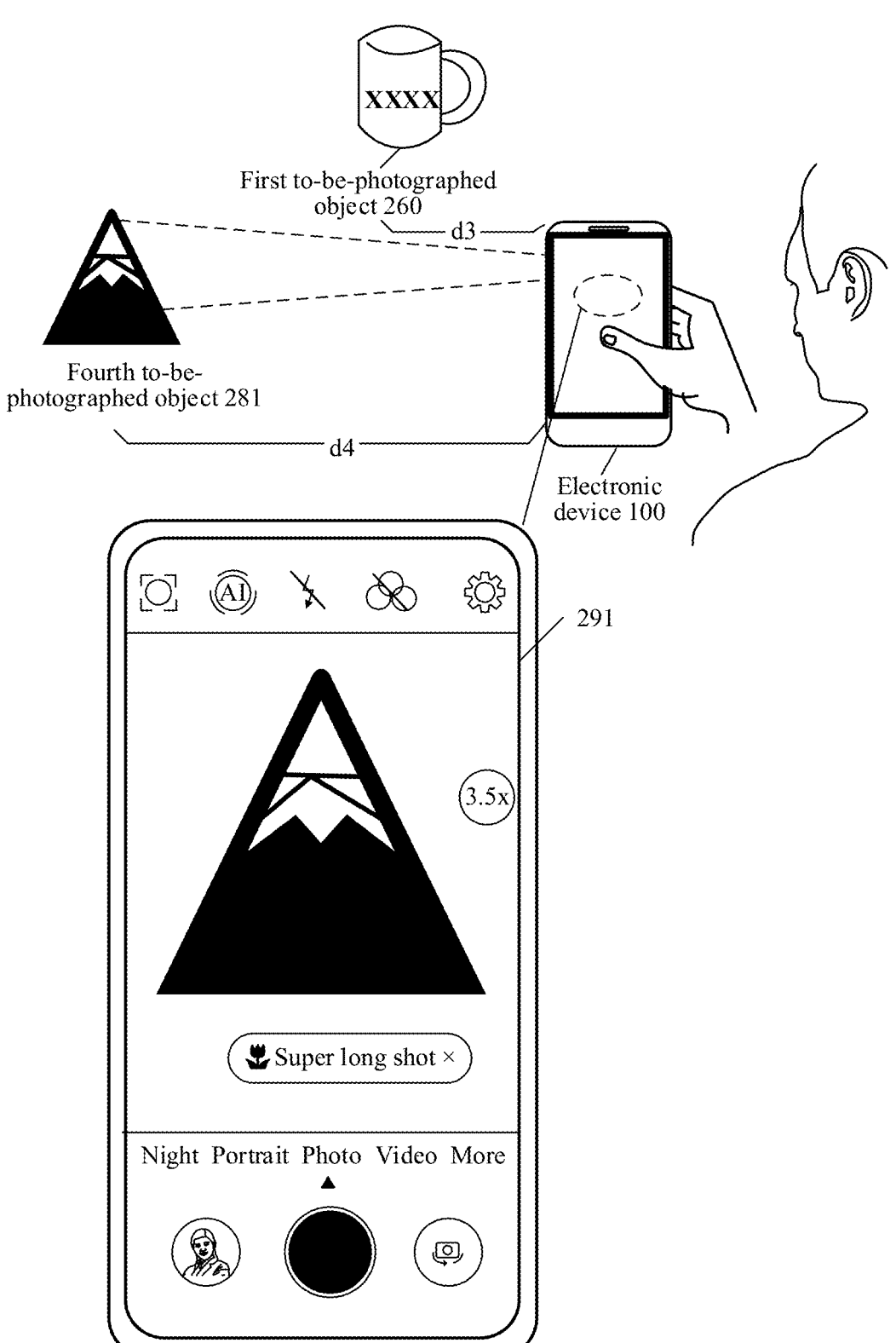
Figure 6:
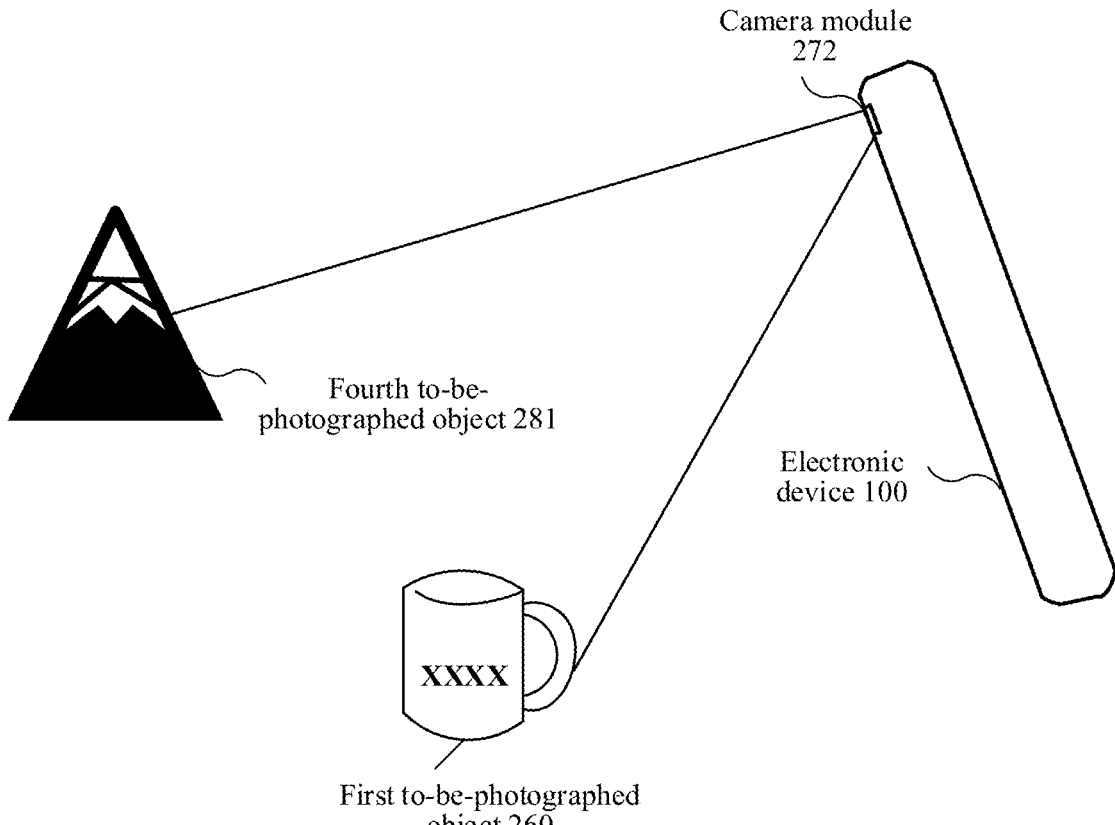
FIG. 6 is a side view of a photographing scene in a super long shot mode applicable to this application.

For example, as shown in (a) in FIG. 5A and FIG. 5B, the same photographing scene includes a first to-be-photographed object 260 and a fourth to-be-photographed object 281. A distance between the first to-be-photographed object 260 and the electronic device 100 is d3, a distance between the fourth to-be-photographed object 281 and the electronic device 100 is d4, and d3 is less than d4; FIG. 6 is a side view of the photographing scene, and the electronic device 100 includes a camera module 272; the electronic device 100 remains at a same position in a shooting process; the electronic device 100 opens a camera application, the electronic device 100 performs focusing on the first to-be-photographed object 260 at a first moment, and the electronic device 100 may display a display interface 282; in this case, a zoom ratio of the electronic device 100 is a 1-fold zoom ratio; as shown in (b) in FIG. 5A and FIG. 5B, the electronic device 100 changes a to-be-photographed object at a second moment; and for example, the electronic device 100 performs focusing on the fourth to-be-photographed object 281. In this case, the electronic device 100 identifies that the distance between the fourth to-be-photographed object 281 and the electronic device 100 is great, and the electronic device 100 may enter the super long shot mode. In other words, the electronic device 100 may automatically switch to an ultra telephoto camera and use the ultra telephoto camera as the main camera to perform focusing, and display a display interface 291.

For example, the electronic device 100 is in a photographing scene from far to near; for example, when a position of the to-be-photographed object remains unchanged, the electronic device 100 moves in a shooting process; and the distance between the to-be-photographed object and the electronic device 100 is from less to great, and when the electronic device 100 identifies that the distance between the electronic device and the to-be-photographed object is great based on a parameter of the camera module, the electronic device may automatically use the ultra telephoto camera as the main camera, and enter the super long shot mode to add detailed information of a long shot to-be-photographed object.

Figure 7:
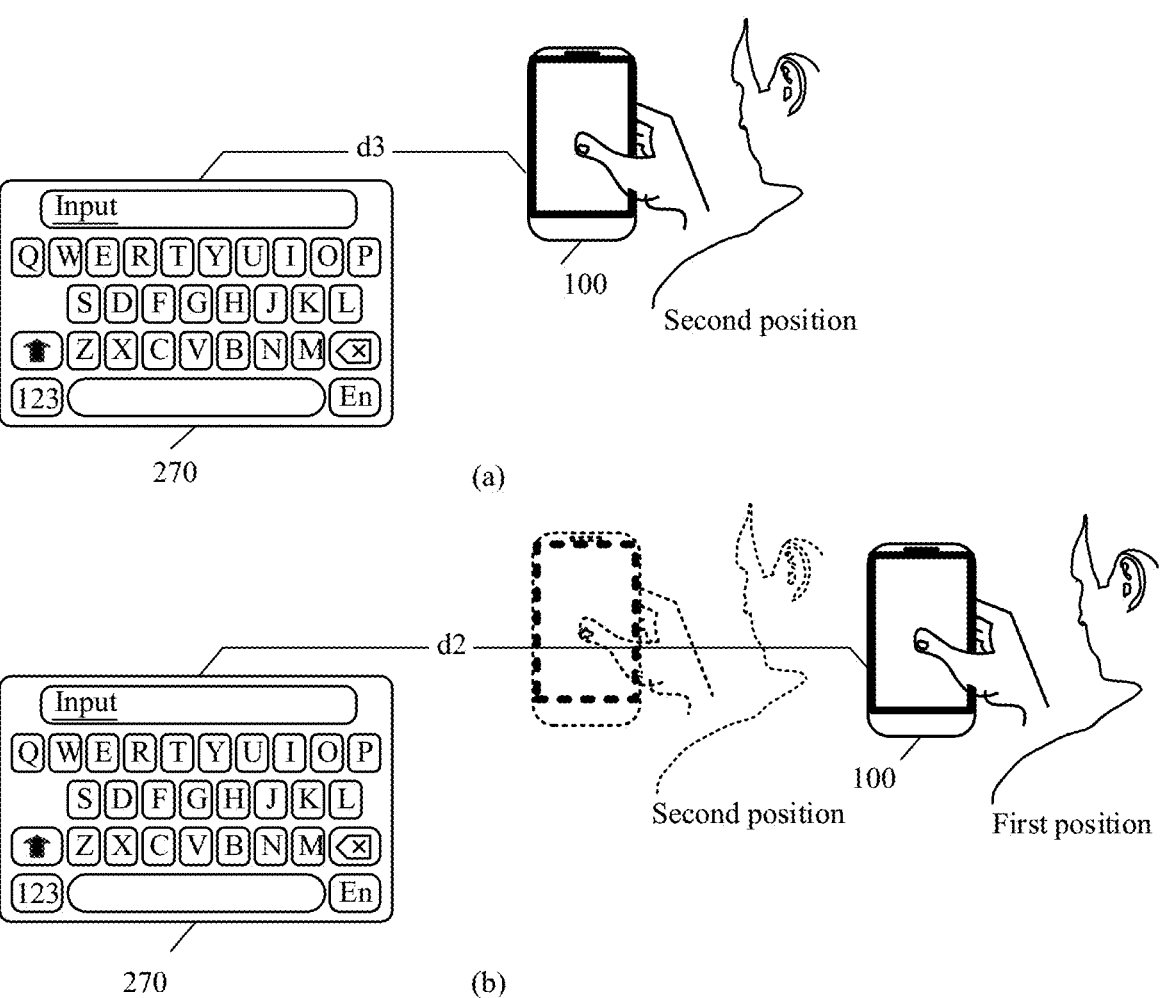
FIG. 7 is another schematic diagram of a photographing scene in a super macro mode applicable to this application.

For example, as shown in (a) in FIG. 7, a position of the second to-be-photographed object 270 remains unchanged in a shooting process; at the first moment, the electronic device 100 performs shooting at the second position, and the distance between the electronic device 100 and the second to-be-photographed object 270 is d3; as shown in (b) in FIG. 7, the electronic device 100 moves from the second position to the first position for shooting at a second moment; in this case, the distance between the electronic device 100 and the second to-be-photographed object 270 is d2, and d2 is greater than d3; and the electronic device 100 identifies that the distance between the second to-be-photographed object 270 and the electronic device 100 is great, the electronic device may automatically use the telephoto camera as the main camera, and enter the super long shot mode to add detailed information of a long shot to-be-photographed object.

For example, the electronic device is in a photographing scene from near to far; for example, when a position of the electronic device remains unchanged, a to-be-photographed object of the electronic device is a moving to-be-photographed object; and the distance between the moving to-be-photographed object and the electronic device 100 is from less to great, and when the electronic device 100 identifies that the distance between the electronic device and the to-be-photographed object is great based on a parameter of the camera module, the electronic device may automatically use the telephoto camera as the main camera, and enter the super long shot mode to add detailed information of a long shot to-be-photographed object.

Figure 8:
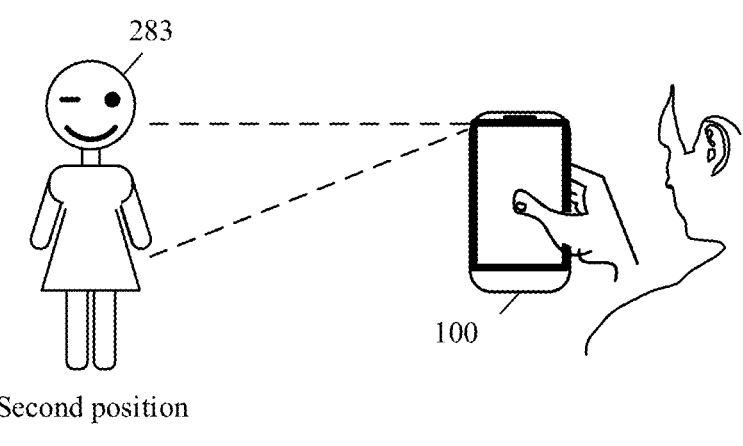
FIG. 8 is still another schematic diagram of a photographing scene in a super macro mode applicable to this application.
Figure 8:
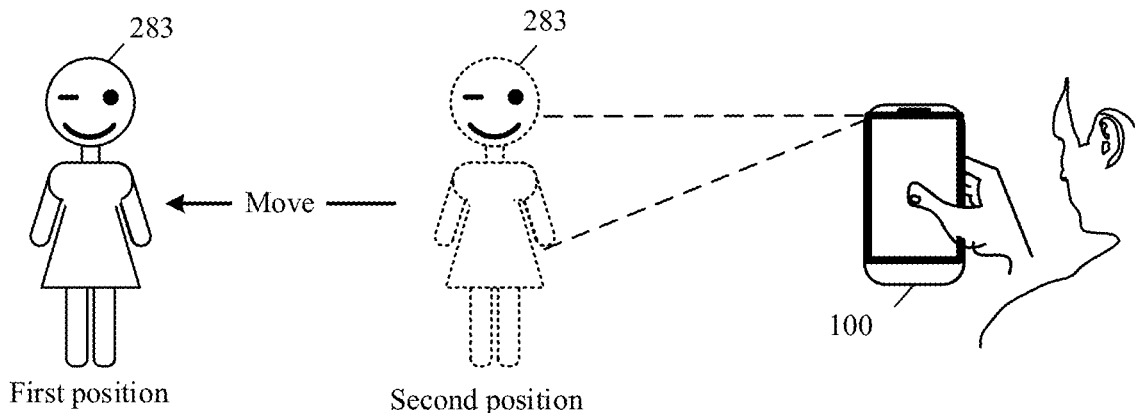

For example, as shown in (a) in FIG. 8, when the position of the electronic device remains unchanged, at a first moment, a third to-be-photographed object 283 is located at a second position, and the electronic device 100 shoots the third to-be-photographed object 283; and as shown in (b) in FIG. 8, the third to-be-photographed object 283 moves to the first position at a second moment, the electronic device 100 identifies that the distance between the third to-be-photographed object 283 and the electronic device 100 is great, and the electronic device may automatically use the telephoto camera as the main camera, and enter the super long shot mode to add detailed information of a long shot to-be-photographed object.

8. Autofocus System

A photographing apparatus (for example, a camera) on an electronic device usually performs focusing by using the autofocus system. The autofocus system mainly includes a lens, a motor, a motor driver chip, and a photosensitive chip. The lens and the photosensitive chip are main components of imaging, and the motor and the motor drive chip are main components of autofocus. A distance between the lens and the photosensitive chip is also referred to as a focal length. When a to-be-photographed object and a camera are at different positions, and a corresponding imaging position is different, the distance (focal length) between the lens and the photosensitive chip needs to be adjusted, so that a clear image may be obtained on the photosensitive chip. The autofocus system usually drives the lens to move to adjust the focal length through a motor.

9. Open Loop Motor (Open Loop)

The open loop motor means that a motor that drives the lens to move determines a moving distance of the lens based on an input current. There is no feedback signal to correct the moved distance in a process of moving the lens. It is equivalent to inputting a current value into the motor driver chip of the open loop motor, and outputting a movement distance of the lens. The motor driver chip does not adjust a movement distance that is output based on an actual movement distance of the lens. Therefore, precision of fixed focus using the open loop motor is usually not high.

10. Close Loop Motor (Close Loop)

Compared with the open loop motor, the close loop motor mounts a Hall chip on the lens, and senses a magnetic flux of the surrounding magnets through the Hall chip, and then calculates an actual position of the lens. The close loop motor may input the actual position of the lens as a feedback signal into the motor driver chip, and the motor driver chip adjusts the movement distance that is output based on the feedback signal. In other words, the close loop motor may use an actual moving position of the lens as a feedback signal, to accurately adjust a position of the lens, resulting in high imaging quality.

The method for switching cameras and an electronic device in embodiments of this application will be described below with reference to the accompanying drawings.

Figure 9:
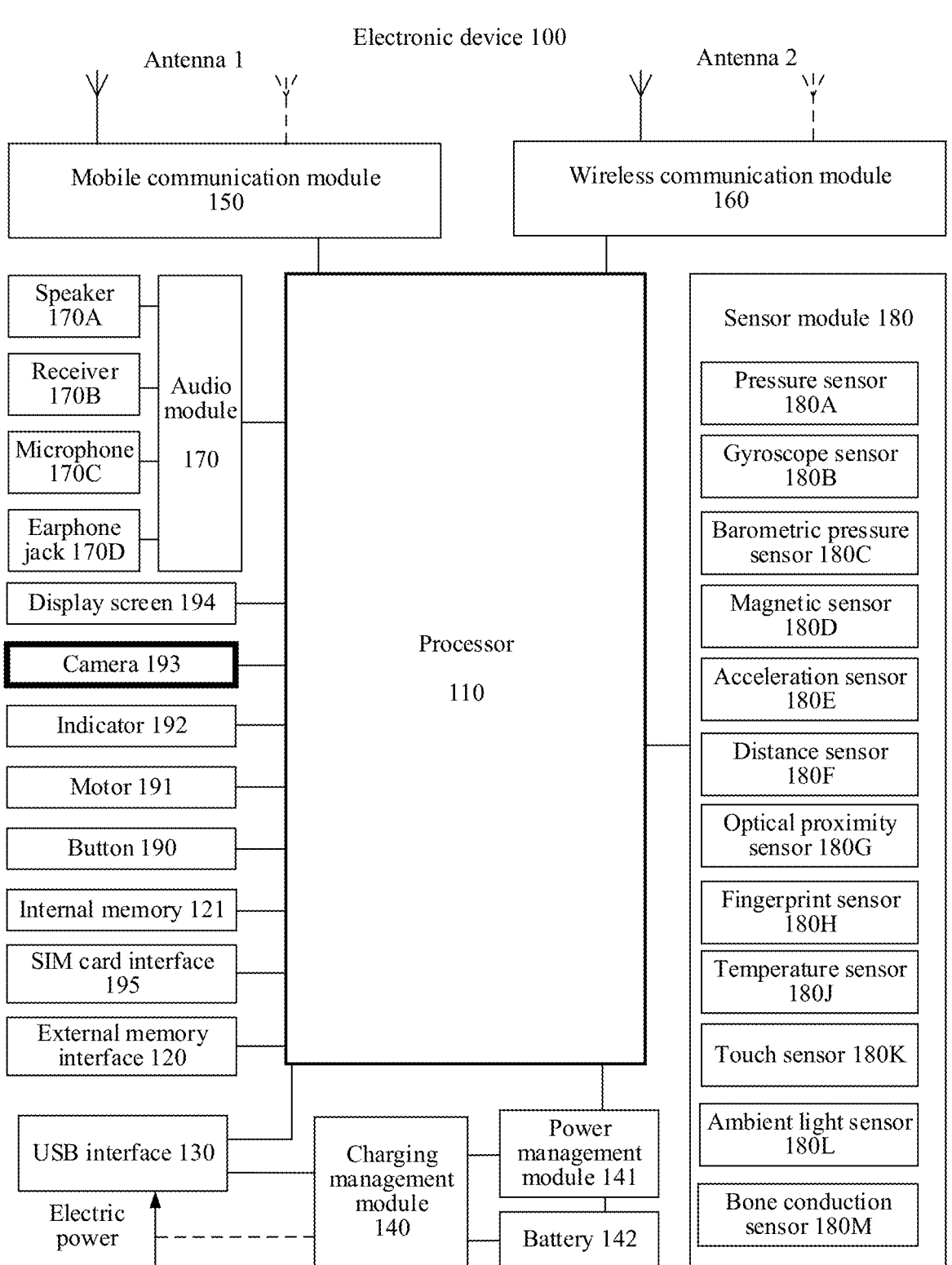
FIG. 9 is a schematic diagram of a hardware system applicable to an electronic device of this application.

FIG. 9 shows a hardware system applicable to an electronic device of this application.

The electronic device 100 may be a mobile phone, a smart screen, a tablet computer, a wearable electronic device, an in-vehicle electronic device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in embodiments of this application.

The electronic device 100 may include a processor 110, an external memory interface 120, an internal memory 121, a universal serial bus (universal serial bus, USB) interface

130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It should be noted that the structure shown in FIG. 9 does not constitute a specific limitation on the electronic device 100. In some other embodiments of this application, the electronic device 100 may include more or fewer components than the components shown in FIG. 9, the electronic device 100 may include a combination of some of the components shown in FIG. 9, or the electronic device 100 may include subcomponents of some of the components shown in FIG. 9. The components shown in FIG. 9 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components or integrated components. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

For example, the processor 110 may be configured to perform the method for switching cameras according to an embodiment of this application; for example, run a camera application in the electronic device; display a first image, where the first image is obtained by collecting an image by using the first camera as a main camera; determine whether a first distance and a second distance meet a first preset condition, where the first distance and the second distance indicate an object distance between the electronic device and a to-be-photographed object, the first distance is an object distance that is obtained based on a parameter of the first camera, and the second distance is an object distance that is obtained based on a parameter of the second camera; and display a second image when the first distance and the second distance meet the first preset condition, where the second image is obtained by collecting an image by using the second camera as the main camera.

A connection relationship among the modules shown in FIG. 9 is merely an example for description, and constitutes no limitation on the connection relationship between modules of the electronic device 100. Optionally, a combination of a plurality of connection manners may also be used in each module of the electronic device 100 in the foregoing embodiments.

A wireless communication function of the electronic device 100 may be implemented through components such as the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused, to improve antenna utilization. For example, the antenna 1 may be multiplexed as a diversity antenna of a wireless local area network. In some other embodiments, the antennas may be used in combination with a tuning switch.

The electronic device 100 may implement a display function through the GPU, the display screen 194, the application processor, and the like. The GPU is a microprocessor for image processing, and is connected to the display screen 194 and the application processor. The GPU is configured to perform mathematical and geometric computation, and render an image. The processor 110 may include one or more GPUs, which execute program instructions to generate or change display information.

The display screen 194 may be configured to display an image or a video.

For example, in embodiments of this application, the display screen 194 may be configured to display a second image.

The electronic device 100 may implement a shooting function through the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a camera, and an optical signal is converted into an electrical signal. The photosensitive element of the camera transfers the electrical signal to the ISP for processing, and therefore, the electrical signal is converted into an image visible to a naked eye. The ISP may perform algorithm optimization on noise, brightness, and color of the image. The ISP may further optimize parameters such as exposure and color temperature of the photographing scene. In some embodiments, the ISP may be disposed in the camera 193.

The camera 193 (also referred to as a lens) is configured to capture a static image or a video. The camera 193 may be triggered to turn on through an application instruction, to implement a shooting function, such as obtaining images of any scene by shooting. The camera may include components such as an imaging lens, a filter, an image sensor, and the like. Light emitted or reflected by an object enters the imaging lens, passes through the filter, and finally converges on the image sensor. The imaging lens is mainly configured to collect and image light emitted or reflected by all objects (which may also be referred to as a to-be-photographed scene, a target scene, or a scene image that a user expects to shoot) in a shooting angle; The filter is mainly used to filter out excess light waves in light (such as light waves other than visible light, such as infrared); and the image sensor may be a charge coupled device (charge coupled device, CCD) or a complementary metal-oxide-semiconductor (complementary metal-oxide-semiconductor, CMOS) phototransistor. The image sensor is mainly configured to perform photoelectric conversion on the received optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV.

In some embodiments, the electronic device 100 may include one or N cameras 193, where N is a positive integer greater than 1.

The camera 193 may be located in front of the electronic device 100 or may be located at the back of the electronic device 100. A specific quantity of cameras and an arrangement manner may be set as required. This is not limited in this application.

For example, the electronic device 100 includes a front-facing camera and a rear-facing camera. For example, the front-facing camera or the rear-facing camera may include one or more cameras. An example of the electronic device 100 having four rear-facing cameras is used. In this way, when the electronic device 100 activates the four rear-facing cameras for shooting, the method for switching cameras provided in embodiments of this application may be used.

Alternatively, the camera is disposed on an external accessory of the electronic device 100. The external accessory is rotatably connected to a frame of the mobile phone. An angle formed between the external accessory and the display screen 194 of the electronic device 100 is any angle between 0 and 360 degrees. For example, when the electronic device 100 takes a selfie, the external accessory drives the camera to rotate to a position facing the user. Certainly, when the mobile phone has a plurality of cameras, only a part of cameras may be disposed on the external accessory, and the remaining cameras may be disposed on a body of the electronic device 100. This is not limited in embodiments of this application.

The digital signal processor is configured to process a digital signal, and may process another digital signal in addition to the digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, MPEG 4, or the like.

The gyroscope sensor 180B may be configured to determine a moving posture of the electronic device 100. In some embodiments, an angular velocity of the electronic device 100 around three axes (namely, x axis, y axis, and z axis) may be determined through the gyroscope sensor 180B. The gyroscope sensor 180B may be used for image stabilization during shooting. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scene and a somatic game scene.

The acceleration sensor 180E may detect an acceleration value of the electronic device 100 in all directions (generally x axis, y axis, and z axis). When the electronic device 100 is still, a magnitude and a direction of gravity may be detected. The acceleration sensor 180E may be further configured to identify a posture of the electronic device 100, and is used as an input parameter in an application such as switching between a landscape mode and a portrait mode or a pedometer.

The distance sensor 180F is configured to measure a distance. The electronic device 100 may measure the distance in an infrared manner or a laser manner. In some embodiments, for example, in a photographing scene, the electronic device 100 may measure a distance through the distance sensor 180F to implement quick focusing.

The ambient light sensor 180L is configured to sense ambient light brightness. The electronic device 100 may adaptively adjust a luminance of the display screen 194 according to perceived brightness of the ambient light. The ambient light sensor 180L may be further configured to automatically adjust white balance during photo taking. The ambient light sensor 180L may further cooperate with an optical proximity sensor 180G to detect whether the electronic device 100 is in a pocket, so as to prevent an accidental touch.

The fingerprint sensor 180H is configured to collect a fingerprint. The electronic device 100 may use a feature of the collected fingerprint to implement functions such as unlocking, application lock access, photographing, call answering, and the like.

The touch sensor 180K is also referred to as a "touch component". The touch sensor 180K may be disposed on the display screen 194, and the touch sensor 180K and the display screen 194 constitute a touchscreen, which is also referred to as a "touchscreen". The touch sensor 180K is configured to detect a touch operation performed on or near the touch sensor. The touch sensor 180K may transfer the detected touch operation to the application processor to determine a type of the touch event. A visual output related to the touch operation may be provided through the display screen 194. In some other embodiments, the touch sensor 180K may also be disposed on a surface of the electronic device 100 and disposed at a position different from the display screen 194.

The hardware system of the electronic device 100 is described in detail above, and the software system of the electronic device 100 is introduced below.

Figure 10:
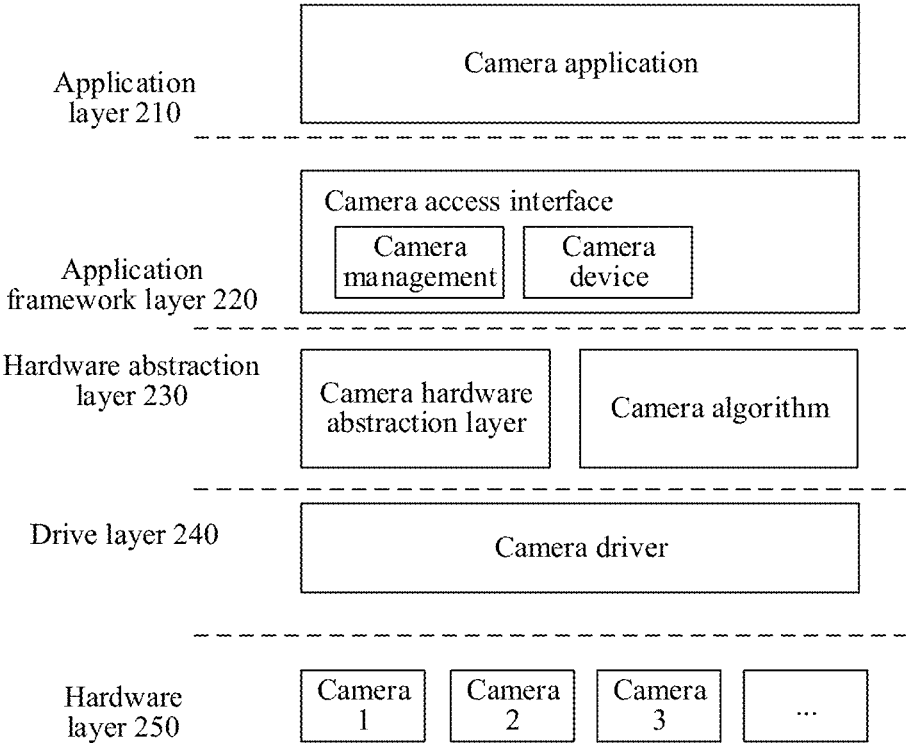
FIG. 10 is a schematic diagram of a software system applicable to an electronic device of this application.

FIG. 10 is a schematic diagram of a software system of an electronic device according to an embodiment of this application.

As shown in FIG. 10, a system architecture may include an application layer 210, an application framework layer 220, a hardware abstraction layer 230, a driver layer 240, and a hardware layer 250.

The application layer 210 may include applications such as Camera, Gallery, Calendar, Phone, Map, Navigation, WLAN, Bluetooth, Music, Videos, and Messages.

The application framework layer 220 provides an application programming interface (application programming interface, API) and a programming framework for an application at the application layer; and the application framework layer may include some predefined functions.

For example, the application framework layer 220 may include a camera access interface; and the camera access interface may include camera management and a camera device. The camera management may be used to provide an access interface for managing cameras; and the camera device may be configured to provide an interface to access a camera.

The hardware abstraction layer 230 is used to abstract hardware. For example, the hardware abstraction layer may include a camera abstraction layer and other hardware device abstraction layers.

For example, the hardware abstraction layer 230 includes a camera hardware abstraction layer and a camera algorithm. The camera hardware abstraction layer may invoke the camera algorithm; and the camera algorithm may include a software algorithm for image processing.

For example, a camera algorithm library may include an algorithm corresponding to the method for switching cameras provided in embodiments of this application.

For example, the algorithm in the camera algorithm may refer to implementation that does not rely on specific hardware, for example, code that may usually run in a CPU, and the like.

The driver layer 240 is used to provide drivers for different hardware devices. For example, the driver layer may include a camera driver.

The hardware layer 250 is located at a lowest layer of an operating system; and as shown in FIG. 10, the hardware layer 250 may include a camera 1, a camera 2, a camera 3, and the like. The camera 1, the camera 2, and the camera 3 may correspond to a plurality of cameras on the electronic device.

For ease of understanding, an example in which the electronic device 100 includes a mobile phone having the foregoing software structure and hardware structure is used below. A camera and an interface on the electronic device 100 to which the method for switching cameras provided in embodiments of this application is applicable will first be described in detail.

The electronic device to which the method for switching cameras provided in embodiments of this application is applicable has at least a plurality of cameras 193, for example, three types of cameras 193; the three types of cameras are a main camera (for example, a wide-angle camera), an ultra wide-angle camera, and a telephoto camera respectively; and the three types of cameras may be configured to shoot the same to-be-photographed scene.

Optionally, the electronic device 100 may further have other cameras 193. Types of cameras 193 and a quantity of each type of cameras 193 may be set as required. This is not limited in embodiments of this application.

Figure 11:
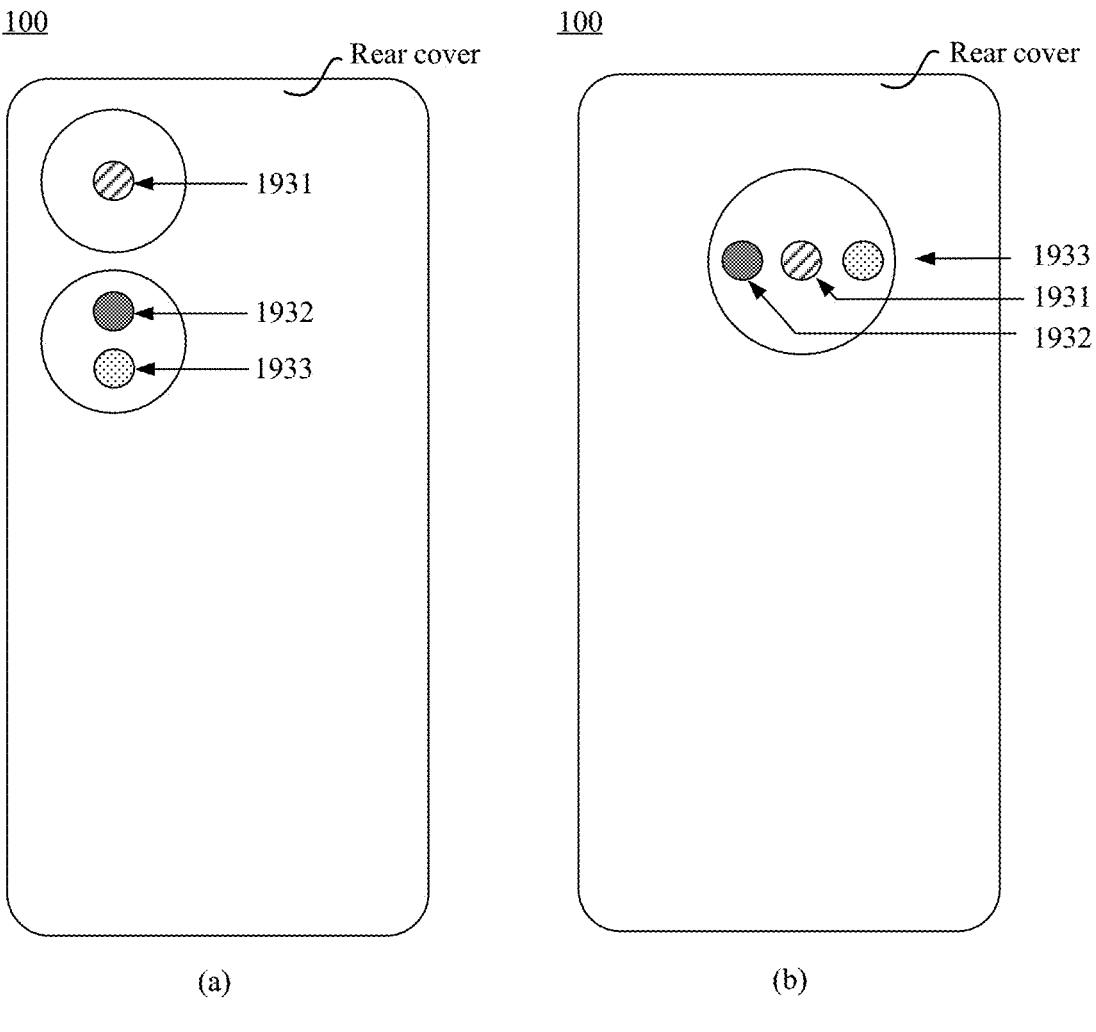
FIG. 11 is a schematic diagram of arrangement of a plurality of cameras on an electronic device according to an embodiment of this application.

For example, as shown in FIG. 11, an example in which the electronic device 100 may have three cameras 193 is used for description; an arrangement manner of the three cameras may be as shown in (a) in FIG. 11, or as shown in (b) in FIG. 11; and for example, the three cameras 193 may be a main camera 1931 (for example, a wide-angle camera), an ultra wide-angle camera 1932, and a telephoto camera 1933.

It should be understood that the foregoing are only examples of two arrangement manners, and may also be other arrangement manners; and a specific arrangement manner may be designed and changed as required. This is not limited in embodiments of this application.

It should be noted that when the three cameras perform shooting, a field of view range corresponding to the main camera 1931 is usually greater than a field of view range corresponding to the telephoto camera 1933; a field of view range corresponding to the ultra wide-angle camera 1932 is greater than the field of view range corresponding to the main camera 1931; the field of view of the ultra wide-angle camera 1932 may overlap with the field of view of the main camera 1931; and in other words, the ultra wide-angle camera 1932 may shoot scene content shot by the main camera 1931 and surrounding scene content of the main camera 1931.

It should be understood that the field of view range corresponding to the telephoto camera 1933 is less than the field of view range corresponding to the main camera 1931, and the field of view of the main camera 1931 may overlap with the field of view of the telephoto camera 1933; and in other words, the main camera 1931 may shoot scene content shot by the telephoto camera 1933 and surrounding scene content of the telephoto camera 1933. The field of view of the ultra wide-angle camera 1932 may overlap with the field of view of the telephoto camera 1933; and in other words, the ultra wide-angle camera 1932 may shoot scene content shot by the telephoto camera 1933 and surrounding scene content of the telephoto camera 1933.

The ultra wide-angle camera 1932 is suitable for shooting a close-up due to a less focus distance; as the name suggests, the ultra wide-angle camera 1932 is suitable for shooting a scene with a great field of view; and the main camera 1931 is more suitable for shooting a portrait due to high resolution, while the telephoto camera 1933 is more suitable for shooting a long shot and a close-up.

Figure 12:
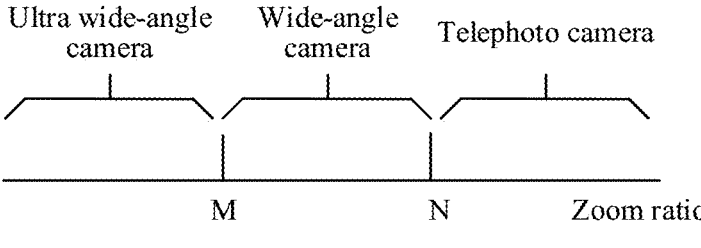
FIG. 12 is a schematic diagram of zoom ratios corresponding to different types of cameras according to an embodiment of this application.

For example, as shown in FIG. 12, a zoom ratio of the ultra wide-angle camera may be less than an M-fold zoom ratio; a zoom ratio range of the wide-angle camera, namely, the main camera, may be [M, N); and a zoom ratio of the telephoto camera may be greater than or equal to an N-fold zoom ratio.

For example, M may be 1 and N nay be 3.5; a zoom ratio of the ultra wide-angle camera is less than a 1-fold zoom ratio (1×); the zoom ratio range of the wide-angle camera is a 1-fold zoom ratio to a 3.5-fold zoom ratio, namely [1×, 3.5×); and the zoom ratio of the telephoto camera is greater than or equal to the 3.5-fold zoom ratio.

It should be understood that in a process of shooting by the electronic device, the greater the zoom ratio, the less the corresponding field of view.

Figure 13A:
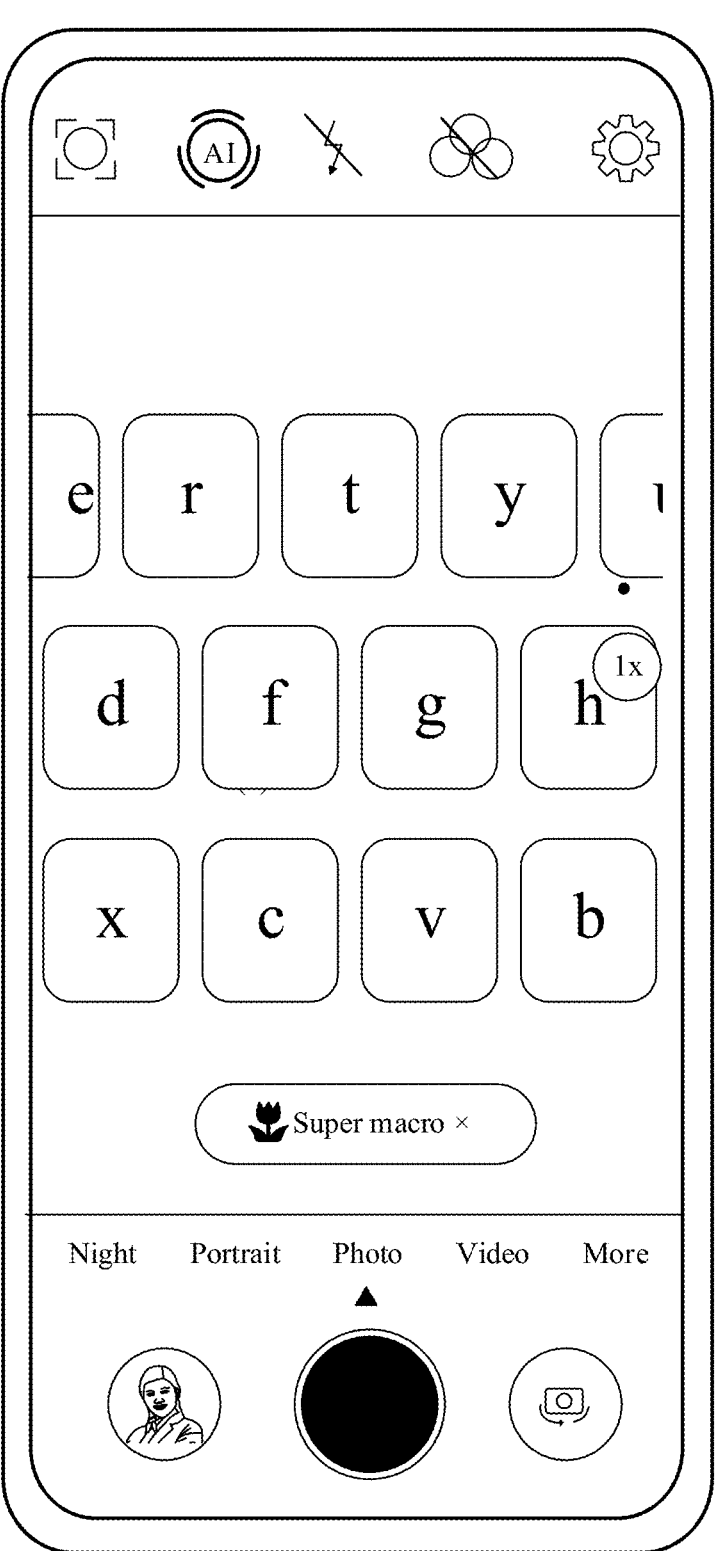
FIG. 13 is a schematic diagram of a graphical user interface that automatically exits a super macro mode.
Figure 13B:
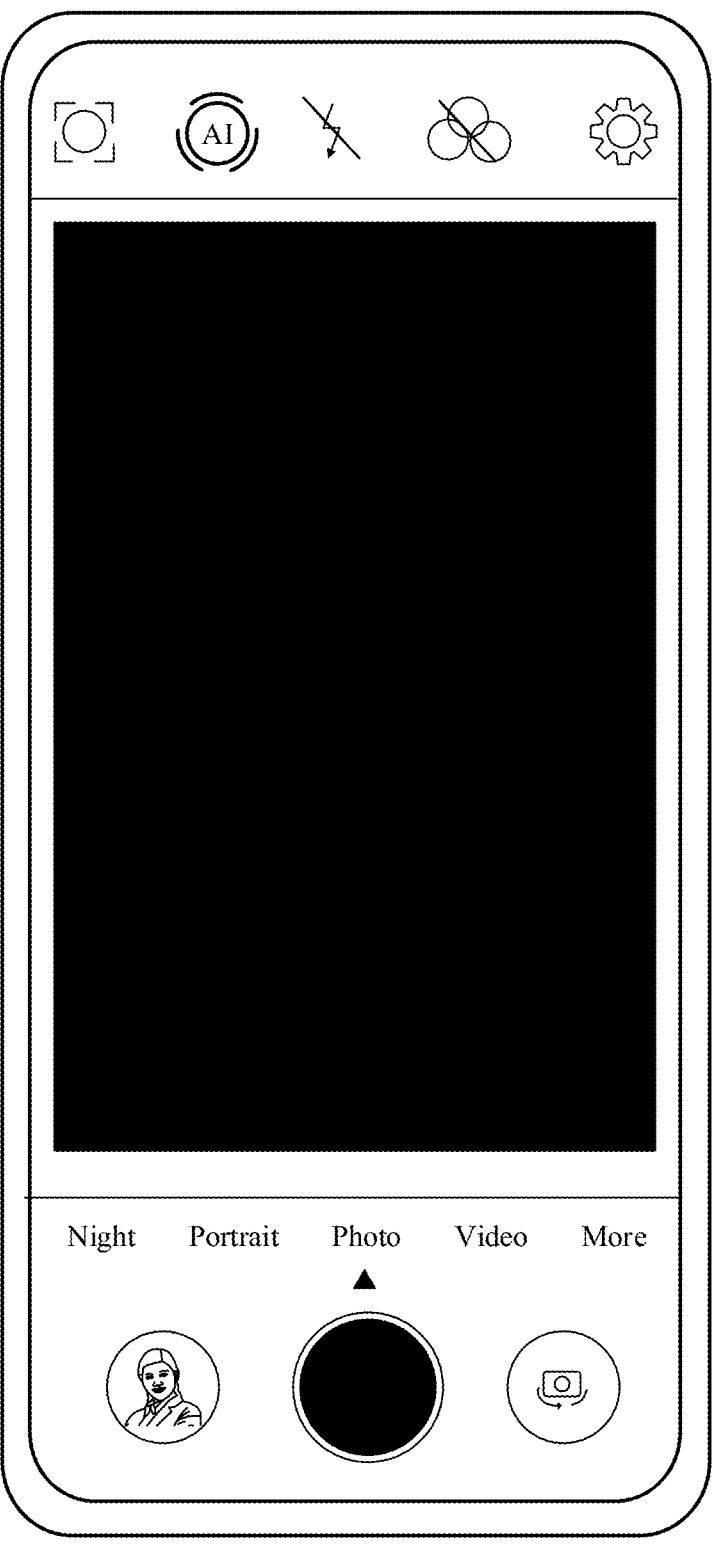

Currently, when the electronic device does not include a laser sensor, the electronic device may automatically switch between different cameras based on a parameter of a wide-angle camera; for example, when identifying, based on the parameter of the wide-angle camera, that a distance between the electronic device and a to-be-photographed object is less, the electronic device may automatically switch to the ultra wide-angle camera and use the ultra wide-angle camera as a main camera, to enter a super macro photographing mode; but when the distance between the electronic device and the to-be-photographed object is less, an actual object distance between the electronic device and the to-be-photographed object is not in a valid range of distance parameters collected by the wide-angle camera, and as a result, accuracy of the parameter of the wide-angle camera is reduced, causing the electronic device to automatically exit the super macro photographing mode when shooting in the super macro photographing mode, and resulting in poor stability of the super macro photographing mode. For example, an effective object distance range mapped based on the parameter of the wide-angle camera is 8 cm to 5 m; if the actual object distance between the electronic device and the to-be-photographed object is less than 8 cm, the distance that is between the electronic device and the to-be-photographed object and that is obtained based on the parameter collected by the wide-angle camera is inaccurate or unstable; therefore, when the electronic device is close to the to-be-photographed object, there may be an error in the parameter collected by the wide-angle camera, causing the electronic device to be prone to automatically exiting the super macro photographing mode when shooting in the super macro photographing mode; as shown in (a) in FIG. 13A and FIG. 13B, the electronic device is in the super macro mode; if the to-be-photographed object moves closer to the electronic device, the electronic device may crash due to a specific error in the parameter collected by the wide-angle camera; and as shown in (b) in FIG. 13A and FIG. 13B, the electronic device may automatically exit the super macro mode.

In view of this, embodiments of this application provide a method for switching cameras and an electronic device. The method is applicable to an electronic device, the electronic device includes a camera module, the camera module includes a first camera (for example, an ultra wide-angle camera) and a second camera (for example, a wide-angle camera), and the method includes: running a camera application in the electronic device; display a first image, where the first image is obtained by collecting an image by using the first camera as a main camera; determine whether a first distance and a second distance meet a first preset condition, where the first distance and the second distance indicate an object distance between the electronic device and a to-be-photographed object, the first distance is an object distance that is obtained based on a parameter of the first camera, and the second distance is an object distance that is obtained based on a parameter of the second camera; and display a second image when the first distance and the second distance meet the first preset condition, where the second image is obtained by collecting an image by using the second camera as the main camera. In embodiments of this application, when the first distance and the second distance meet the first preset condition, the electronic device switches to the second camera and uses the second camera as the main camera; because the first distance is the object distance that is obtained based on the parameter of the first camera, the second distance is the object distance that is obtained based on the parameter of the second camera; therefore, in embodiments of this application, when it is determined whether to switch to the second camera and use the second camera as the main camera, it is determined whether to switch cameras based on a double-restriction condition; and compared with an existing solution, which determines whether to switch cameras based only on the parameter of the second camera, stability of the method for switching cameras provided in embodiments of this application is higher.

Application scenes of the method for switching cameras provided in embodiments of this application are described below with examples.

The method for switching cameras in embodiments of this application may be applied to a photo-taking scene (for example, single-view photo taking, dual-view photo taking, or the like), a preview scene, a video recording scene, or a video call scene; and through the method for switching cameras in embodiments of this application, automatic switching of different cameras in the electronic device may be implemented based on the obtained lens position and a zoom value without relying on a laser sensor in the electronic device, thereby implementing automatic switching of different cameras in the electronic device, and improving shooting experience of the user and image quality.

For example, the preview scene includes but is not limited to the following scenes:

photo preview, aperture preview, night view preview, portrait preview, video preview, or professional preview.

It should be understood that the preview scene may refer to a scene in which the electronic device collects an image in a specific photographing mode before a button instructing shooting is tapped.

In an example, after the electronic device enters a camera application, a default photographing camera mode may be turned on; in the photographing camera mode, the electronic device may enter a default photographing mode. The default photographing mode may refer to a photographing mode in which the wide-angle camera is used as the main camera and a zoom ratio is a 1-fold zoom ratio (1×); and the default photographing mode is a non-super macro mode. In the non-super macro mode, a distance parameter (for example, a code value) and a zoom ratio (for example, a zoom value) of the electronic device may be obtained. When the distance parameter meets a first preset threshold and the zoom ratio meets a second preset range, the electronic device may switch to the ultra wide-angle camera to collect images.

For example, the method for switching cameras in embodiments of this application may be further applied to a video recording scene, or a video call scene, where the video call scene may include but is not limited to the following scenes:

portrait photographing scenes such as a video call, a video conference application, a long and short video application, a live video application, a video online class application, a portrait intelligent camera movement application scenario, a system camera recording function recording video, video surveillance, or a photographing scene intelligent peephole, and the like.

It should be understood that the foregoing is an example for description of an application scene, and does not constitute any limitation on the application scene of this application.

The method for switching cameras provided in embodiments of this application is described in detail below with reference to FIG. 14 to FIG. 25A and FIG. 25B.

Figure 14:
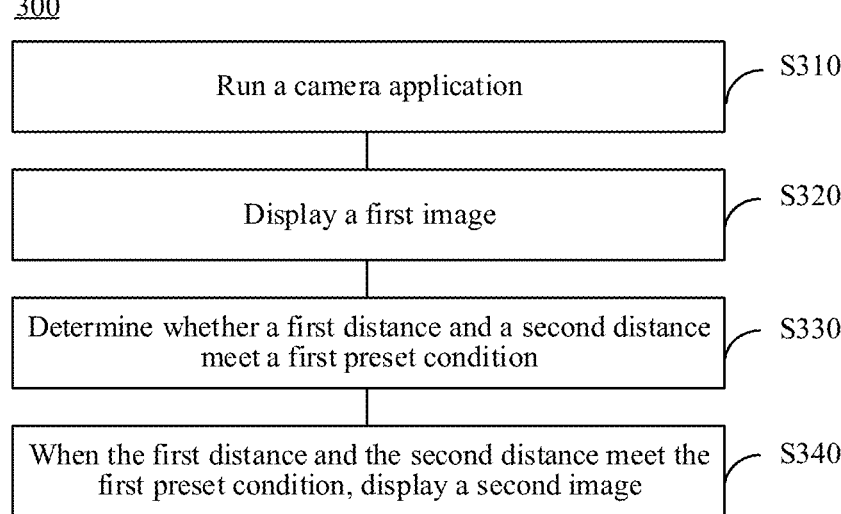
FIG. 14 is a schematic flowchart of a method for switching cameras according to an embodiment of this application.

FIG. 14 is a schematic flowchart of a method for switching cameras according to an embodiment of this application. The method may be performed by the electronic device shown in FIG. 14. The method 300 includes step S310 to step S340. Step S310 to step S340 are respectively described in detail below.

Step S310: Run a camera application.

For example, a user may indicate the electronic device to run the camera application by tapping an icon of the "Camera" application.

For example, when the electronic device is in a lock screen state, the user may indicate the electronic device to run the camera application by sliding to the right on a display screen of the electronic device. Alternatively, the electronic device is in a lock screen state, and a lock screen interface includes the icon of the camera application, and the user indicates the electronic device to run the camera application by tapping the icon of the camera application. Alternatively, when the electronic device runs other applications, the application has a permission to invoke the camera application; and the user may indicate the electronic device to run the camera application by tapping a corresponding control. For example, when the electronic device runs an instant messaging application, the user may indicate the electronic device to run the camera application by selecting a control of a camera function.

It should be understood that the foregoing is an example description of an operation of running the camera application; and the camera application may be further run by the electronic device through a voice instruction operation or instructions of other operations. This is not limited in this application.

It should be further understood that running the camera application may refer to starting the camera application.

Step S320: Display a first image.

The first image is obtained by collecting an image by using a first camera as a main camera.

Optionally, the displaying a first image includes: displaying the first image when the electronic device is in a super macro mode.

In embodiments of this application, the first image is an image that is displayed when the electronic device is in the super macro mode; and when the electronic device is in the super macro mode, an ultra wide-angle camera in the electronic device is used as the main camera.

It should be understood that The super macro mode refers to a photographing mode in which the electronic device automatically switches to the ultra wide-angle camera and uses the ultra wide-angle camera as the main camera when the electronic device is between a 1-fold zoom ratio (1×) and a 2-fold zoom ratio (2×).

Optionally, the displaying the first image when the electronic device is in a super macro mode includes:

displaying the first image on a first display interface of the electronic device, where the first display interface further includes a first icon, and the first icon indicates the super macro mode.

For example, the first display interface is shown in (d) in FIG. 20A, FIG. 20B, FIG. 20C, and FIG. 20D; and the first icon may be an icon 606 shown in (d) in FIG. 20A, FIG. 20B, FIG. 20C, and FIG. 20D.

Optionally, the first icon includes a first control, and the method further includes:

detecting a first operation on the first control; and exiting, by the electronic device, the super macro mode in response to the first operation.

For example, the first operation may refer to turning off the super macro mode; for example, as shown in (d) in FIG. 20A, FIG. 20B, FIG. 20C, and FIG. 20D, the first icon may refer to the icon 606. The first control may refer to "×" in the icon 606. The first operation may refer to tapping "×" in "super macrox", and the electronic device may turn off the super macro mode; and optionally, after turning off the super macro mode, the electronic device may no longer push the super macro mode on the preview display interface.

Optionally, the displaying a first image includes:

displaying the first image when a brightness parameter of a photographing environment in which the electronic device is located is greater than a second brightness threshold, and the second distance parameter is less than or equal to a third preset threshold.

For example, when the electronic device does not enter the super macro mode, the wide-angle camera in the electronic device is used as a main camera; when the electronic device detects that a brightness parameter of a photographing environment is greater than a second brightness threshold, it indicates that a photographing environment in which the electronic device is located is not a dark photographing scene; when the second distance parameter is less than or equal to a third preset threshold, a distance that is between the electronic device and the to-be-photographed object and that is obtained based on the parameter collected by the wide-angle camera is less; and in this case, the electronic device may enter the super macro mode and display the first image.

In embodiments of this application, when the electronic device enters the super macro mode, whether the electronic device enters the super macro mode may be determined based on brightness of the photographing scene of the electronic device and the second distance; and compared with determining whether the electronic device enters the super macro mode based on the first distance, accuracy of entering the super macro mode in embodiments of this application is higher.

Optionally, the second brightness threshold is a preset threshold that is obtained based on a second brightness range, and the second brightness range is used to represent an effective brightness range in which the second camera performs focusing.

For example, if a brightness range for performing effective focusing of the second camera is [L1, L2], the second brightness threshold is greater than or equal to L1.

Step S330: Determine whether a first distance and a second distance meet a first preset condition.

The first distance and the second distance indicate an object distance between the electronic device and a to-be-photographed object, the first distance is an object distance that is obtained based on a parameter of the first camera, and the second distance is an object distance that is obtained based on a parameter of the second camera.

Optionally, the first distance and the second distance meet the first preset condition, including:

determining that the first distance is greater than a first preset threshold, and the second distance is greater than a second preset threshold, where the first preset threshold is different from the second preset threshold.

It should be understood that in embodiments of this application, the electronic device includes a camera module, and the camera module includes a first camera and a second camera; the first distance between the electronic device and the to-be-photographed object may be obtained based on the parameter of the first camera parameter; and the second distance between the electronic device and the to-be-photographed object may be obtained based on the parameter collected by the second camera.

Optionally, the first distance may be the distance that is between the electronic device and the to-be-photographed object and that is obtained based on a code value collected by the ultra wide-angle camera.

Optionally, the second distance may be a code value that is between the electronic device and the to-be-photographed object and that is obtained based on a code value collected by the wide-angle camera.

It should be understood that the code value is used to represent a movement distance of a motor that is output when the camera in the electronic device performs focusing. An object distance between the electronic device and the to-be-photographed object may be obtained by mapping based on the code value.

Optionally, the first preset threshold is a preset threshold that is obtained based on a first distance range, and the first distance range is used to represent an effective distance range for focusing by the first camera.

For example, if an effective focus distance range of the first camera is [X1, X2], the first preset threshold is greater than or equal to X1.

Optionally, the second preset threshold is a preset threshold that is obtained based on a second distance range, and the second distance range is used to represent an effective distance range for focusing by the second camera.

For example, if an effective focus distance range of the second camera is [X3, X4], the second preset threshold is greater than or equal to X3.

Optionally, when the first camera includes an open loop motor, the method further includes:

obtaining the parameter of the first camera; performing compensation processing on the parameter of the first camera based on a calibration value of the first camera, to obtain a processed parameter; and obtaining the first distance based on the processed parameter. For a specific implementation, refer to the related descriptions of S432 and S433 in FIG. 15 subsequently; or refer to the related descriptions in FIG. 17 and FIG. 18 subsequently; or refer to the related descriptions of S532 and S533 in FIG. 19A and FIG. 19B subsequently, and the details are not described herein again.

In embodiments of this application, when the first camera (for example, an ultra wide-angle camera) of the electronic device includes an open loop motor, compensation processing may be performed on the parameter of the first camera; for example, compensation processing may be performed on a code value output by the ultra wide-angle camera, to cause accuracy of the code value to be higher; and when the accuracy of the code value is higher, the obtained first distance between the electronic device and the to-be-photographed object is more accurate.

Step S340: When the first distance and the second distance meet the first preset condition, display a second image.

The second image is obtained by collecting an image by using the second camera as a main camera.

In embodiments of this application, the second image is displayed when the first distance and the second distance meet the first preset condition, where the electronic device uses the second camera as the main camera; because the first distance is the object distance that is obtained based on the parameter of the first camera, the second distance is the object distance that is obtained based on the parameter of the second camera; therefore, in embodiments of this application, when it is determined whether to switch to the second camera and use the second camera as the main camera, it is determined whether to switch cameras based on a double-restriction condition; and compared with an existing solution, which determines whether to switch cameras based only on the parameter of the second camera, stability of the method for switching cameras provided in embodiments of this application is higher.

For example, when the electronic device is in the super macro mode, the electronic device may use the ultra wide-angle camera (an example of the first camera) as the main camera to display the first image; the electronic device determines the first distance between the electronic device and the to-be-photographed object based on the parameter of the ultra wide-angle camera, and when the second distance between the electronic device and the to-be-photographed object that is obtained based on the parameter of the wide-angle camera (an example of the second camera) meets a preset condition, the electronic device exits the super macro mode; for example, when the electronic device determines that the distance between the electronic device and the to-be-photographed object is great based on the first distance and the second distance, the electronic device exits the super macro mode; if the first distance and/or the second distance do not meet the preset condition, the electronic device remains in the super macro mode; in embodiments of this application, the electronic device may determine whether to exit the super macro mode based on the parameter of the ultra wide-angle camera and the parameter of the wide-angle camera, and to a certain extent, may avoid a specific error in the parameter collected by the wide-angle camera, and consequently, the electronic device may crash in the super macro mode, thereby improving stability of the super macro mode, to be specific, improving stability of switching cameras by the electronic device.

Optionally, the method further includes:

determining whether a brightness parameter of a photographing scene in which the electronic device is located is less than or equal to a first brightness threshold when the first distance and/or the second distance do not meet the first preset condition; and displaying the second image when the brightness parameter is less than or equal to the first brightness threshold.

In embodiments of this application, when the first distance and/or the second distance do not meet the preset condition, the electronic device may further determine whether to exit a super macro mode based on the brightness parameter of the photographing scene; because when the photographing scene in which the electronic device is located is dark, the parameter collected by the first camera and the parameter collected by the second camera are less accurate; because the parameter collected by the first camera and the parameter collected by the second camera are less accurate, accuracy of the first distance and accuracy of the second distance are low; and in this case, the electronic device may directly exit the super macro mode.

Optionally, the first brightness threshold is a preset threshold obtained based on a first brightness range, and the first brightness range is used to represent an effective brightness range in which the first camera performs focusing.

For example, the first brightness threshold is located in an effective brightness range in which the first camera performs focusing.

Optionally, a zoom ratio corresponding to a case that the electronic device displays the first image is a first zoom ratio, a current zoom ratio of the electronic device is a second zoom ratio, and the method further includes:

determining whether the second zoom ratio is the same as the first zoom ratio when the brightness parameter is greater than the first brightness threshold; and displaying the second image when the second zoom ratio is different from the first zoom ratio.

In embodiments of this application, it may be determined whether a zoom ratio of the electronic device changes when the first distance and/or the second distance do not meet a preset condition and the brightness parameter of the photographing scene in which the electronic device is located is greater than a first brightness threshold; if the zoom ratio of the electronic device changes, the electronic device exits the super macro mode; for example, if the zoom ratio of the electronic device changes, it may be that a user adjusts the zoom ratio of the electronic device; and in this case, the electronic device exits the super macro mode.

Optionally, the first camera includes an ultra wide-angle camera or a telephoto camera, and/or the second camera includes a wide-angle camera.

In an example, the first camera is an ultra wide-angle camera, and the second camera is a wide-angle camera; when the electronic device is in the super macro mode, the electronic device uses the ultra wide-angle camera as a main camera, and the electronic device displays the first image; and when the electronic device exits the super macro mode, the electronic device uses the wide-angle camera as the main camera, and the electronic device displays the second image.

In an example, the first camera is a telephoto camera, and the second camera is a wide-angle camera; when the electronic device is in a super long shot mode, the electronic device uses a telephoto camera as the main camera, and the electronic device displays the first image; and when the electronic device exits the super long shot mode, the electronic device uses the wide-angle camera as the main camera, and the electronic device displays the second image.

Optionally, the electronic device is at a same position when the electronic device displays the first image and the second image.

For example, the scene shown in (a) and the scenario shown (b) in FIG. 1 are not described herein again.

In embodiments of this application, a position of the electronic device may remain unchanged in a shooting process. If a focus object of the electronic device moves from a long shot to-be-photographed object to a close-up to-be-photographed object, the electronic device may automatically identify a distance between the electronic device and a to-be-photographed object and enter the super macro mode; if the focus object of the electronic device moves from the close-up to-be-photographed object to the long shot to-be-photographed object, the electronic device may automatically identify the distance between the electronic device and the to-be-photographed object and exit the super macro mode; and the electronic device may automatically switch different types of cameras and use the different types of cameras as the main camera, to ensure image quality of the collected images.

Optionally, the first image includes a first to-be-photographed object, the second image includes a second to-be-photographed object, the first to-be-photographed object and the second to-be-photographed object are at a same position, a distance between the first to-be-photographed object and the electronic device is a third distance, a distance between the second to-be-photographed object and the electronic device is a fourth distance, and the third distance is less than the fourth distance.

In embodiments of this application, a position of electronic device may change in a shooting process; for example, the electronic device may move to shoot different to-be-photographed objects (for example, the first to-be-photographed object and the to-be-photographed second object); if the focus object of the electronic device moves from the close-up to-be-photographed object to the long shot to-be-photographed object, the electronic device may automatically identify the distance between the electronic device and the to-be-photographed object and exit the super macro mode; and the electronic device may automatically switch different types of cameras and use the different types of cameras as the main camera, to ensure image quality of the collected images.

Optionally, the first image and the second image include a third to-be-photographed object, and the third to-be-photographed object is at a same position when the first image and the second image are displayed; a distance between the third to-be-photographed object and the electronic device is a fifth distance when the first image is collected; and a distance between the third to-be-photographed object and the electronic device is a sixth distance when the second image is collected, and the fifth distance is less than the sixth distance.

In embodiments of this application, a position of electronic device may change in a shooting process; for example, the electronic device may move to shoot a same to-be-photographed object (for example, a third to-be-photographed object); if the focus object of the electronic device moves from the close-up to-be-photographed object to the long shot to-be-photographed object, the electronic device may automatically identify the distance between the electronic device and the to-be-photographed object and exit the super macro mode; and the electronic device may automatically switch different types of cameras and use the different types of cameras as the main camera, to ensure image quality of the collected images.

In embodiments of this application, the second image is displayed when the first distance and the second distance meet the first preset condition, where the electronic device switches to the second camera and uses the second camera as the main camera; because the first distance is the object distance that is obtained based on the parameter of the first camera, the second distance is the object distance that is obtained based on the parameter of the second camera; therefore, in embodiments of this application, when it is determined whether to switch to the second camera and use the second camera as the main camera, it is determined whether to switch cameras based on a double-restriction condition; and compared with an existing solution, which determines whether to switch cameras based only on the parameter of the second camera, the method for switching cameras provided in embodiments of this application is more accurate, to be specific, stability of a photographing mode in the electronic device is better.

Figure 15:
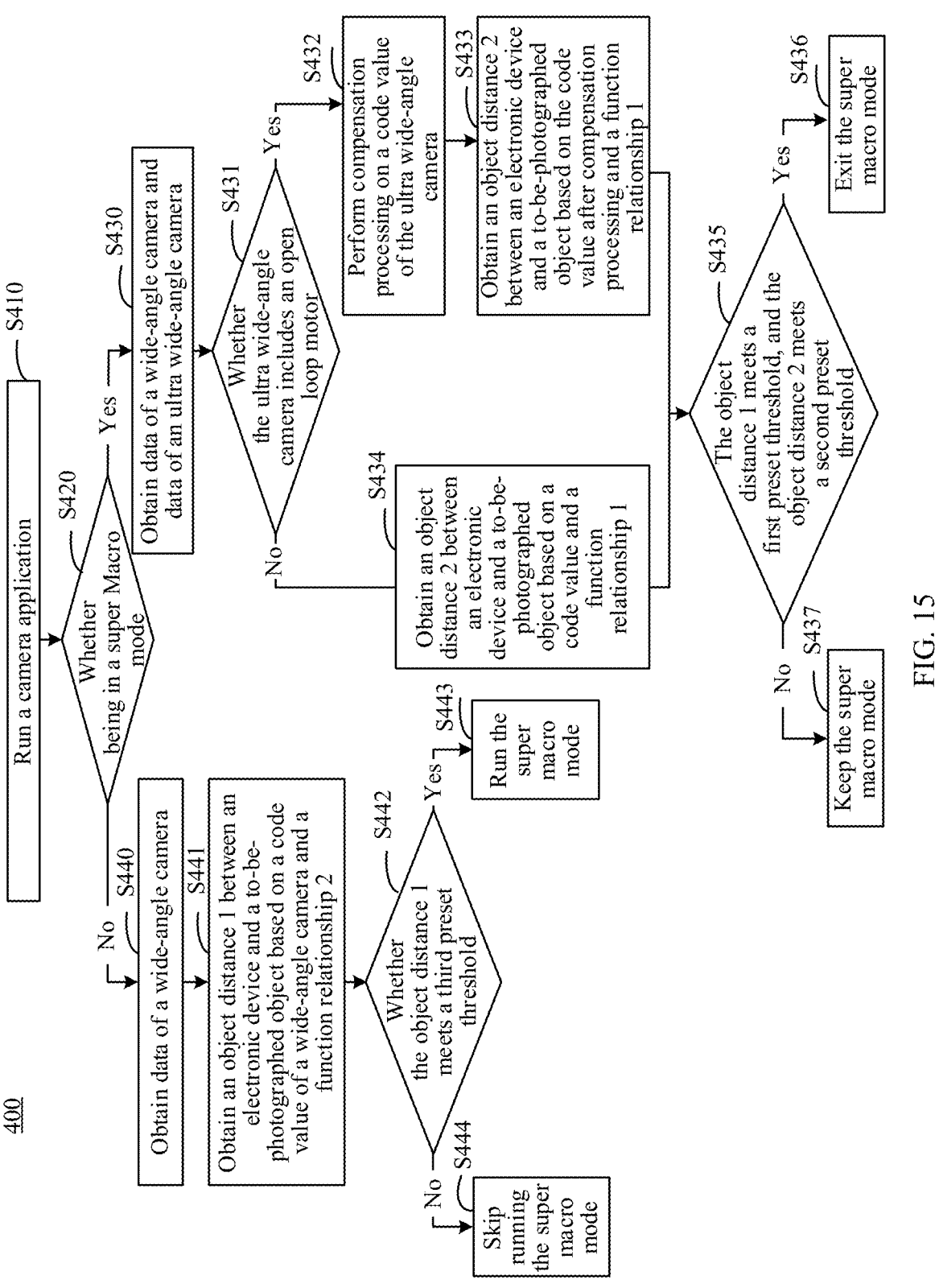
FIG. 15 is a schematic flowchart of another method for switching cameras according to an embodiment of this application.

FIG. 15 is a schematic flowchart of a method for switching cameras according to an embodiment of this application. The method may be performed by the electronic device shown in FIG. 9. The method 400 includes step S410 to step S444. Step S410 to step S444 are respectively described in detail below.

Step S410: Run a camera application.

For example, a user may indicate the electronic device to run the camera application by tapping an icon of the "Camera" application. Alternatively, when the electronic device is in a lock screen state, the user may indicate the electronic device to run the camera application by sliding to the right on a display screen of the electronic device. Alternatively, the electronic device is in a lock screen state, and a lock screen interface includes the icon of the camera application, and the user indicates the electronic device to run the camera application by tapping the icon of the camera application. Alternatively, when the electronic device runs other applications, the application has a permission to invoke the camera application; and the user may indicate the electronic device to run the camera application by tapping a corresponding control. For example, when the electronic device runs an instant messaging application, the user may indicate the electronic device to turn on the camera application by selecting a control of a camera function.

It should be understood that the foregoing is an example description of an operation of running the camera application; and the camera application may be further run by the electronic device through a voice instruction operation or instructions of other operations. This is not limited in this application.

Step S420: Determine whether an electronic device is in a super macro mode; if the electronic device is in the super macro mode, perform step S430; and if the electronic device is not in the super macro mode, perform step S440.

It should be understood that the super macro mode may be a photographing mode of the electronic device; and the super macro photographing mode refers to a photographing mode in which the electronic device automatically switches to the ultra wide-angle camera and uses the ultra wide-angle camera as the main camera when the electronic device is between 1-fold zoom ratio (1×) and 2-fold zoom ratio (2×).

Optionally, a label of a current photographing mode of the electronic device may be obtained, and whether the electronic device is in the super macro mode is determined based on the label of the photographing mode.

For example, a label corresponding to a non-super macro mode may be flag=1, and a label corresponding to the super macro mode may be flag=0. After the electronic device switches to the ultra wide-angle camera and uses the ultra wide-angle camera as a main camera, a label corresponding to the photographing mode may be updated to flag=0.

Step S430: Obtain data of an ultra wide-angle camera and a wide-angle camera.

It should be understood that in the super macro mode, the ultra wide-angle camera is used as the main camera for shooting; and in this case, the wide-angle camera may also be in a running state, but the data collected by the wide-angle camera is not used for display.

Optionally, data of the ultra wide-angle camera may include a function relationship 1 and a code value, where the function relationship 1 is used to represent a mapping relationship between a parameter 1 (an object distance 2) and a parameter 2 (a code value collected by the ultra wide-angle camera).

Figures 16, 17:
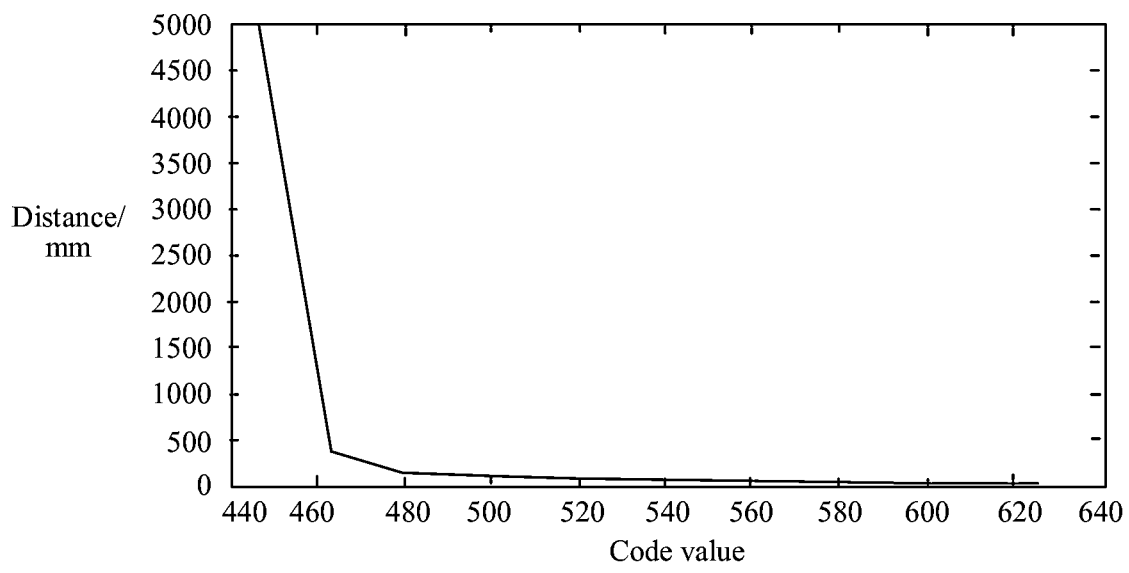
FIG. 16 is a schematic diagram of a function relationship according to an embodiment of this application.
FIG. 17 is a schematic diagram of a camera at different poses according to an embodiment of this application.

Optionally, OTP data of the ultra wide-angle camera may be obtained, the OTP data is the data stored in the ultra wide-angle camera component, and the OTP data includes the function relationship 1; for example, the function relationship 1 is shown in FIG. 16; and FIG. 16 is a schematic diagram of a curve relationship between a distance (an object distance) and a code value.

Optionally, data of the wide-angle camera may include a function relationship 2 and a code value, where the function relationship 2 is used to represent a mapping relationship between a parameter 3 (an object distance 1) and a parameter 4 (a code value collected by the wide-angle camera).

Optionally, the OTP data of the ultra wide-angle camera may be obtained, the OTP data of the ultra wide-angle camera is the data stored in the ultra wide-angle camera component, and the OTP data includes the function relationship 1.

Optionally, the OTP data of the wide-angle camera may be obtained, the OTP data of the wide-angle camera is the data stored in the wide-angle camera component, and the OTP data includes the function relationship 1.

Optionally, in embodiments of this application, the code value may include a voice coil motor (Voice Coil Motor, VCM) code value.

It should be understood that the OTP data is data of a memory type, namely, data stored in the device that cannot be changed.

Step S431: Determine whether the ultra wide-angle camera includes an open loop motor; if the ultra wide-angle camera includes the open loop motor, perform step S432; and if the ultra wide-angle camera does not include the open loop motor, perform step S434.

It should be understood that because a driver chip in the open loop motor does not adjust a movement distance that is output based on an actual movement distance of the lens, accuracy of the movement distance of the lens output by the open loop motor is low; when the accuracy of the movement distance of the lens is low, accuracy of the obtained object distance between the electronic device and the to-be-photographed object is also low; in embodiments of this application, if the camera includes the open loop motor, a lens distance output by the open loop motor may be corrected, to be specific, step S442 is performed; and the accuracy of the object distance between the electronic device and the to-be-photographed object is improved.

Step S432: Perform compensation processing on a code value of the ultra wide-angle camera.

Figure 18:
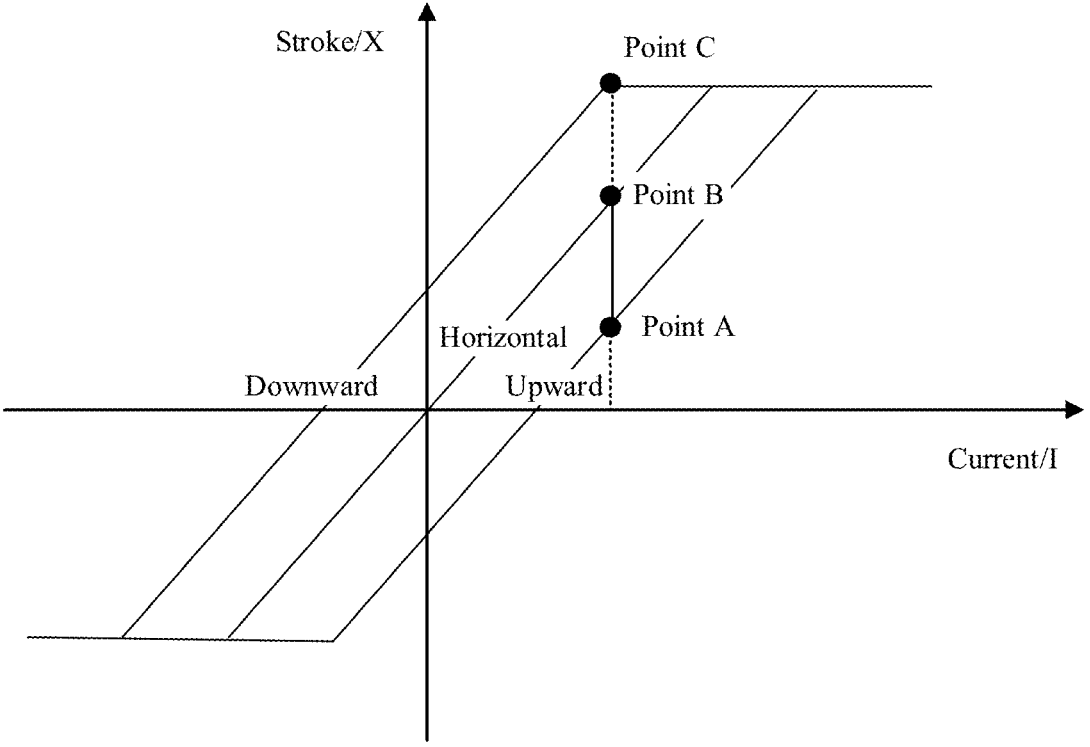
FIG. 18 is a schematic diagram of a pose difference based on different positions of a camera according to an embodiment of this application.

For example, as shown in (a) in FIG. 17, a lens in the camera is in an upward pose; as shown in (b) in FIG. 17, a lens in the camera is in a horizontal pose; as shown in (c) in FIG. 17, a lens in the camera is in a downward pose; for example, for the same object distance between the electronic device and the to-be-photographed object, a distance that the lens moves in (a) in FIG. 17, a distance that the lens moves in (b) in FIG. 17, and a distance that the lens moves in (c) in FIG. 17 are the same; however, due to the action of gravity, there is a difference between the horizontal pose, the upward pose, or the downward pose of the lens at the same object distance, as shown in FIG. 18. Therefore, when the camera includes the open loop motor, compensation processing may be performed on a parameter of the camera based on different poses of the camera.

For example, F1 shown in FIG. 17 is used to represent an electromagnetic force; F2 is used to represent gravity; F3 is used to represent a shrapnel force; for the camera in the pose shown in (a) in FIG. 17, $NBI_1L=K*X_1+mg$; for the camera in the pose shown in (b) in FIG. 17, $NBI_2L=K*X_2$; for the camera in the pose shown in (c) in FIG. 17, $NBI_3L=K*X_3-mg$; let $I_1=I_2=I_3$, and $X_2-X_1=X_3-X_2=mg/K$, indicating that for the camera in different poses, there is a difference in a stroke (for example, a movement distance) of the camera when currents are the same; as shown in FIG. 18, for the same current, if the camera is in the horizontal pose, the camera corresponds to a point B in the curve; if the camera is in the downward pose, the camera corresponds to a point C in the curve; and if the camera is in the upward pose, the camera corresponds to a point A in the curve.

For example, if the position of the camera is as shown in (a) in FIG. 17, one positive compensation value is superimposed on the movement distance of the lens output by the camera; and if the position of the camera is as shown in (b) in FIG. 17, one negative compensation value is superimposed on the movement distance of the lens output by the camera, where for the positive compensation value or the negative compensation value, a plurality of sets of pre-calibrated compensation values may be obtained by pre-calibrating data of different object distances for the same camera; and in an actual shooting process, compensation processing may be performed on the movement distance, namely, the code value, of the lens output by the ultra wide-angle camera based on the position of the camera (for example, the camera facing upward or the camera facing downward).

In an example, calibration data includes $\Delta 1$ and $\Delta 2$, where $\Delta 1$ is used for a difference in lens movement processing when the lens is in the horizontal position and the lens is in the upward position at the same object distance; $\Delta 2$ is used for a difference in lens movement processing when the lens is the horizontal position and the lens is in the downward position at the same object distance; if the lens of the electronic device is in the upward position when shooting, the code value is compensated for by $\Delta 1$; and if the lens of the electronic device is in the downward position when shooting, the code value is compensated for by $\Delta 2$, where $\Delta 1$ is a positive number and $\Delta 2$ may be a negative number.

Step S433: Obtain an object distance 2 between an electronic device and a to-be-photographed object based on a code value after compensation processing and a function relationship 1.

In embodiments of this application, when the ultra wide-angle camera of the electronic device includes the open loop motor, compensation processing may be performed on the parameter of the ultra wide-angle camera; for example, compensation processing may be performed on a code value output by the ultra wide-angle camera, to cause accuracy of the code value to be higher; and when the accuracy of the code value is higher, the obtained object distance 2 between the electronic device and the to-be-photographed object is more accurate.

Optionally, when the ultra wide-angle camera includes the open loop motor, compensation processing may be performed on the code value of the ultra wide-angle camera based on the following formula:

$$code_2 = code_1 + \cos q * x = code_1 + \frac{g_z}{\sqrt{g_x^2 + g_y^2 + g_z^2}} * x,$$

where code$_2$ represents a code value after compensation processing; code$_1$ represents a code value of an ultra wide-angle camera; cos q is used to determine a pose of a camera; x is used to represent a calibration value; $g_x$ represents data of a gravity sensor on an x axis; g, represents data of a gravity sensor on a y axis; and $g_z$ represents data of a gravity sensor on a z axis;

For example, x may represent Lens Sag Compensation (Lens Sag Compensation); Lens Sag Compensation refers to a difference with Code in a horizontal direction when the device is vertically upward and vertically downward; if $g_z<0$, Lens Sag Compensation that is vertically upward is used; to be specific, compensation is performed by using the positive compensation value; and if $g_z\ddagger 0$, Lens Sag Compensation that is vertically downward is used; to be specific, compensation is performed by using the negative compensation value.

For example, cos q is greater than 0, indicating that the camera is in the upward pose; and cos q is less than 0, indicating that the camera is in the downward pose.

Step S434: When the ultra wide-angle camera does not include the open loop motor, obtain the object distance 2 between the electronic device and the to-be-photographed object based on the code value and the function relationship 1.

For example, when the ultra wide-angle camera includes the close loop motor, compensation processing does not need to be performed on the code value of the ultra wide-angle camera; and the object distance 2 between the electronic device and the to-be-photographed object may be directly obtained based on the code value of the ultra wide-angle camera and the function relationship 1.

It should be noted that the close loop motor may input the actual position of the lens as a feedback signal into the motor driver chip, and the motor driver chip adjusts the movement distance that is output based on the feedback signal. In other words, the close loop motor may use an actual moving position of the lens as a feedback signal, to accurately adjust a position of the lens; and therefore, when the ultra wide-angle camera includes the close loop motor, accuracy of the code value of the ultra wide-angle camera is high, and compensation processing does not need to be performed on the code value of the ultra wide-angle camera.

Step S435: Determine whether an object distance 1 meets a first preset threshold, and whether the object distance 2 meets a second preset threshold; if the object distance 1 meets the first preset threshold, and the object distance 2 meets the second preset threshold, perform step S436; and if the object distance 1 does not meet the first preset threshold, and the object distance 2 does not meet the second preset threshold, perform step S437.

Optionally, the first preset threshold may be a threshold corresponding to the wide-angle camera; and the second preset threshold may be a threshold corresponding to the ultra wide-angle camera.

For example, whether the object distance 1 meets the first preset threshold, and whether the object distance 2 meets the second preset threshold may mean that the object distance 1 is greater than the first preset threshold, and the object distance 2 is greater than the second preset threshold.

Step S436: Exit a super macro mode.

It should be understood that exiting the super macro mode may mean switching the super wide-angle camera that is used as the main camera to another camera and use the another camera as the main camera.

For example, when the object distance 1 meets the first preset threshold, and the object distance 2 meets the second preset threshold, the electronic device may exit the super macro mode; and for example, when the object distance 1 is greater than the first preset threshold, and the object distance 2 is greater than the second preset threshold, the electronic device exits the super macro mode.

It should be noted that when the object distance between the electronic device and the to-be-photographed object is less, the accuracy of the code value obtained by the wide-angle camera reduces. Therefore, in embodiments of this application, to avoid a crash problem caused by determining whether to exit the super macro mode based on the code value of the wide-angle camera, when determining whether to exit the super macro mode, a first preset threshold related to the wide-angle camera and a second preset threshold related to the ultra wide-angle camera are used to simultaneously perform determining, thereby further improving accuracy of exiting the super macro mode, avoiding the crash problem of the super macro mode, and improving stability and robustness of the super macro mode.

Optionally, it may be determined whether to exit the super macro mode based on one frame of image; and for example, for one frame of image, if the object distance 1 meets the first preset threshold, and the object distance 2 meets the second preset threshold, the electronic device switches cameras to exit the super macro mode.

Optionally, to ensure stability of images collected by the electronic device, the electronic device may perform determining based on a plurality of frames of images before switching cameras; for example, it may be determined, for at least two consecutive frames of images, whether the object distance 1 meets the first preset threshold, and the object distance 2 meets the second preset threshold; and for at least two consecutive frames of images, if the object distance 1 meets the first preset threshold, and the object distance 2 meets the second preset threshold, the electronic device switches cameras to exit the super macro mode.

In embodiments of this application, through the first preset threshold and the second preset threshold, to more accurately determine that the object distance between the electronic device and the to-be-photographed object is great; when the object distance between the electronic device and the to-be-photographed object is great, the electronic device may exit the super macro mode; because in embodiments of this application, when exiting the super macro mode, dual thresholds such as the first preset threshold and the second preset threshold are used, where the first preset threshold is a threshold of the wide-angle camera, and the second preset threshold is a threshold of the ultra wide-angle camera; and it is determined whether to exit the super macro mode through the two preset thresholds, compared with determining whether to exit the super macro mode by using a single preset threshold of the wide-angle camera, in embodiments of this application, stability of the super macro mode is better.

Optionally, after the electronic device exits the super macro mode, the electronic device may determine whether to run the super macro mode again based on step S440 to step S444 as shown in FIG. 15.

Step S437: Keep the super macro mode.

For example, when the object distance 1 does not meet the first preset threshold, and/or the object distance 2 does not meet the second preset threshold, the electronic device may keep the super macro mode; and for example, when the object distance 1 is less than or equal to the first preset threshold, and/or the object distance 2 is less than or equal to the second preset threshold, the electronic device keeps the super macro mode.

It should be understood that keeping the super macro mode may mean not exiting the super macro mode.

Step S440: Obtain data of a wide-angle camera.

Optionally, data of the wide-angle camera may include a function relationship 2 and a code value, where the function relationship 2 is used to represent a mapping relationship between a parameter 3 (an object distance 1) and a parameter 4 (a code value collected by the wide-angle camera).

Optionally, the OTP data of the wide-angle camera may be obtained, the OTP data of the wide-angle camera is the data stored in the wide-angle camera component, and the OTP data includes the function relationship 2.

It should be understood that the OTP data is data of a memory type, namely, data stored in the device that cannot be changed.

Step S441: Obtain an object distance 1 between an electronic device and a to-be-photographed object based on a code value of a wide-angle camera and a function relationship 2.

For example, based on the code value of the wide-angle camera and the function relationship 2, an object distance 1 corresponding to the code value may be determined.

Step S442: Determine whether the object distance 1 meets a third preset threshold; if the object distance 1 meets the third preset threshold, perform step S443; and if the object distance 1 does not meet the third preset threshold, perform step S444.

Optionally, the third preset threshold may be 10 centimeters. For example, that the object distance 1 meets the third preset threshold may mean that the object distance 1 is greater than the third preset threshold, and that the object distance 1 does not meet the preset threshold may mean that the object distance 1 is less than or equal to the third preset threshold.

In embodiments of this application, because the electronic device does not include a laser sensor, distance information between the electronic device and the to-be-photographed object cannot be obtained through the laser sensor; the object distance 1 between the electronic device and the to-be-photographed object may be obtained through the code value of the wide-angle camera; based on the object distance 1 between the electronic device and the to-be-photographed object, it may be determined whether to switch a camera of the electronic device; and for example, if a distance between the electronic device and the to-bephotographed object is less, the electronic device may use the ultra wide-angle camera as a main camera.

Optionally, in embodiments of this application, when the electronic device determines whether to run the super macro mode, based on the object distance 1 and a brightness value of a photographing scene, and if the object distance 1 is greater than the third preset threshold and the brightness value of the photographing scene is greater than a preset brightness threshold, the electronic device may perform step S443; and if the object distance 1 is less than or equal to the third preset threshold, and/or the brightness value of the photographing scene is less than or equal to the preset brightness value, the electronic device performs step S444.

In embodiments of this application, when determining whether to run the super macro mode, the electronic device may further determine whether to run the super macro mode based on the brightness value of the photographing scene; in a dark photographing scene, accuracy of focus is low, to be specific, accuracy of the code value of the wide-angle camera is low. In this case, the electronic device may determine to skip running the super macro mode, thereby improving accuracy of running the super macro mode.

Optionally, in embodiments of this application, when the electronic device determines whether to run the super macro mode, based on the object distance 1 and a brightness value of a photographing scene, and if the object distance 1 is greater than the third preset threshold, the brightness value of the photographing scene is greater than the preset brightness threshold, and a current zoom ratio is a 1-fold zoom ratio, the electronic device may perform step S443; and if the object distance 1 is less than or equal to the third preset threshold, and/or the brightness value of the photographing scene is less than or equal to the preset brightness value, and/or when the current zoom ratio is not the 1-fold zoom ratio, the electronic device performs step S444. For a specific implementation, refer to step S552 shown in FIG. 19A and FIG. 19B.

Step S443: Run the super macro mode.

For example, when the object distance 1 meets the third preset threshold, the super macro mode is run.

It should be understood that the super macro mode refers to a photographing mode in which the electronic device automatically switches to the ultra wide-angle camera and uses the ultra wide-angle camera as the main camera when the electronic device is between a 1-fold zoom ratio (1×) and a 2-fold zoom ratio (2×).

For example, when the electronic device does not detect an operation performed by the user, the electronic device may switch from the wide-angle camera that is used as the main camera to the ultra wide-angle camera and use the ultra wide-angle camera as the main camera; and in other words, the electronic device may automatically use the ultra wide-angle camera as the main camera without detecting any operation.

It should be understood that The electronic device may include a plurality of cameras; for example, the plurality of cameras may include the main camera and the auxiliary camera; when the electronic device collects an image, the image collected by the main camera is usually used as a benchmark, to perform processing on the image collected by the main camera; and in a process of processing, a part of image information collected by the auxiliary camera may be extracted to compensate for the image collected by the main camera, images collected by the two cameras may be fused, and a displayed image is obtained after processing, to implement functions such as improving shooting quality, background blur, optical zoom, and the like. For example, if the electronic device is in a single-camera mode when collecting the image, to be specific, the electronic device turns on one camera to collect the image, the camera is the main camera.

For example, if the electronic device is in a dual-camera mode when collecting the image, to be specific, the electronic device turns on two cameras to collect images, where one camera is the main camera and the other camera is the auxiliary camera; when the electronic device collects an image, the image collected by the main camera is usually used as a benchmark, to perform processing on the image collected by the main camera; and in a process of processing, a part of image information collected by the auxiliary camera may be extracted to compensate for the image collected by the main camera, images collected by the two cameras may be fused, and the displayed image is obtained after processing, to implement functions such as improving shooting quality, background blur, optical zoom, and the like.

For example, if the electronic device is in a multi-camera mode when collecting an image, for example, when the electronic device is in a three-camera mode when collecting an image, the electronic device may turn on three cameras when collecting an image; the three cameras include one main camera and two auxiliary cameras; when the electronic device collects an image, the image collected by the main camera is usually used as a benchmark, to perform processing on the image collected by the main camera; and in a process of processing, a part of image information collected by two auxiliary cameras may be extracted to compensate for the image collected by the main camera, images collected by the three cameras may be fused, and the displayed image is obtained after processing, to implement functions such as improving shooting quality, background blur, optical zoom, and the like.

Case 1 if the electronic device is in a single-camera mode, the electronic device may turn off the wide-angle camera; and turn on the ultra wide-angle camera, and use the ultra wide-angle camera as the main camera.

Case 2 if the electronic device is in a multi-camera mode (for example, including a dual-camera mode or a three-camera mode), the electronic device may use the ultra wide-angle camera as the main camera, and auxiliary cameras may be fully or partially turned on.

Optionally, after running the super macro mode, the electronic device may determine whether to exit the super macro mode based on step S430 to step S437 as shown in FIG. 15.

Step S444: Skip running the super macro mode.

Optionally, skipping running the super macro mode may include the electronic device continuing to run the current photographing mode and skipping entering the super macro mode.

In embodiments of this application, when the object distance 1 meets the first preset threshold, and the object distance 2 meets the second preset threshold, the electronic device switches to the wide-angle camera and uses the wide-angle camera as the main camera, and exits the super macro mode; because the object distance 2 is the object distance that is obtained based on the parameter of the ultra wide-angle camera, the object distance 1 is the object distance that is obtained based on the parameter of the wide-angle camera; Therefore, in embodiments of this application, when determining whether to exit the super macro mode, it is determined whether to switch cameras based on a double-restriction condition; and compared with an existing solution, which determines whether to switch cameras based only on the parameter of the wide-angle camera, the method for switching cameras provided in embodiments of this application is more accurate, to be specific, stability of a photographing mode in the electronic device is better.

It should be understood that step S401 to step S444 are described by using switching between the wide-angle camera and the ultra wide-angle camera as an example; and step S401 to step S444 may be further applied to switching between other types of cameras, and types of cameras are not limited in this application. Optionally, step S401 to step S444 may be further applied to switching between the wide-angle camera and the telephoto camera. In other words, the method shown in FIG. 15 may also be applied to running a super long shot mode, exiting the super long shot mode, or maintaining the super long shot mode. This is not described herein again.

For example, for switching between the wide-angle camera and the telephoto camera, "whether being in the super macro mode" in step S420 shown in FIG. 15 may be changed to "determining whether being in the super long shot mode". A display interface of the super long shot mode may be as shown in (b) in FIG. 25A and FIG. 25B subsequently; "whether the object distance 1 meets a sixth preset threshold" in step S442 may be changed to "whether the object distance 1 meets a fourth preset threshold"; "running the super macro mode" in step S443 may be changed to "running a super long shot mode"; "skipping running the super macro mode" in step S444 may be changed to "skipping running a super long shot mode"; "obtaining data from the wide-angle camera and the ultra wide-angle camera" in step S430 may be changed to "obtaining data from the wide-angle camera and a telephoto camera"; "the object distance 1 meets the first preset threshold, and the object distance 2 meets the second preset threshold" in step S435 may be changed to "the object distance 1 meets a fourth preset threshold, and the object distance 2 meets a fifth preset threshold"; "exiting the super macro mode" in step S436 may be changed to "exiting a super long shot mode"; and "keeping the super macro mode" in step S437 is changed to "keeping a super long shot mode".

The super long shot mode refers to a photographing mode in which the electronic device automatically switches to a telephoto camera and uses the telephoto camera as a main camera to collect images; the fourth preset threshold and the fifth preset threshold are used to determine whether the object distance between the electronic device and the to-be-photographed object is less, thereby determining to exit the super long shot mode, or to keep the super long shot mode; the fourth preset threshold may not be equal to the first preset threshold; and similarly, the fifth preset range is not equal to the second preset range. In addition, the third preset threshold is not equal to the sixth preset threshold. Based on the object distance 1 and the sixth preset threshold, it may be determined whether to use the telephoto camera as the main camera; and for example, if a value of the object distance 1 is greater than the sixth preset threshold, the electronic device may switch the telephoto camera that is used as the main camera to the wide-angle camera and use the wide-angle camera as the main camera to collect images.

It should be understood that the super macro mode is suitable for close-up shooting; the super long shot mode is suitable for long-shot shooting; based on the method for switching cameras in embodiments of this application, a problem that when the electronic device is in the super macro mode, because the object distance between the electronic device and the to-be-photographed object is less, the electronic device crashes in the super macro mode may be avoided; or a problem that the electronic device crashes in the super long shot mode, because the object distance between the electronic device and the to-be-photographed object is great, the electronic device crashes in the super long shot mode is avoided, thereby improving stability of the super macro mode or the super long shot mode.

Optionally, in embodiments of this application, it may be further determined whether to exit the super macro mode based on a brightness value of the photographing scene and/or a current zoom ratio of the electronic device, thereby further improving stability of the super macro mode.

Figure 19A:
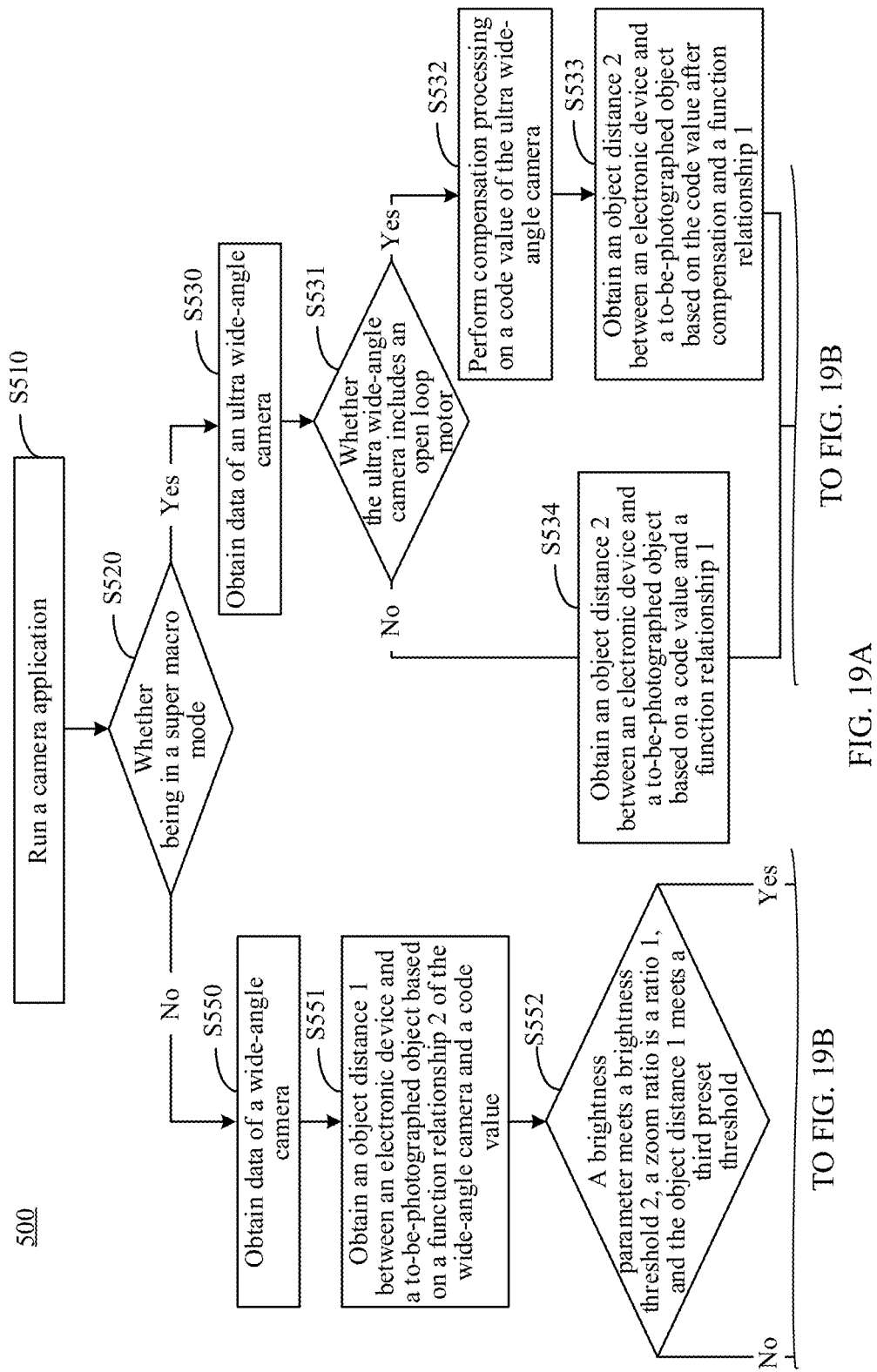
FIG. 19A and FIG. 19B are still another schematic flowcharts of a method for switching cameras according to an embodiment of this application.
Figure 19B:
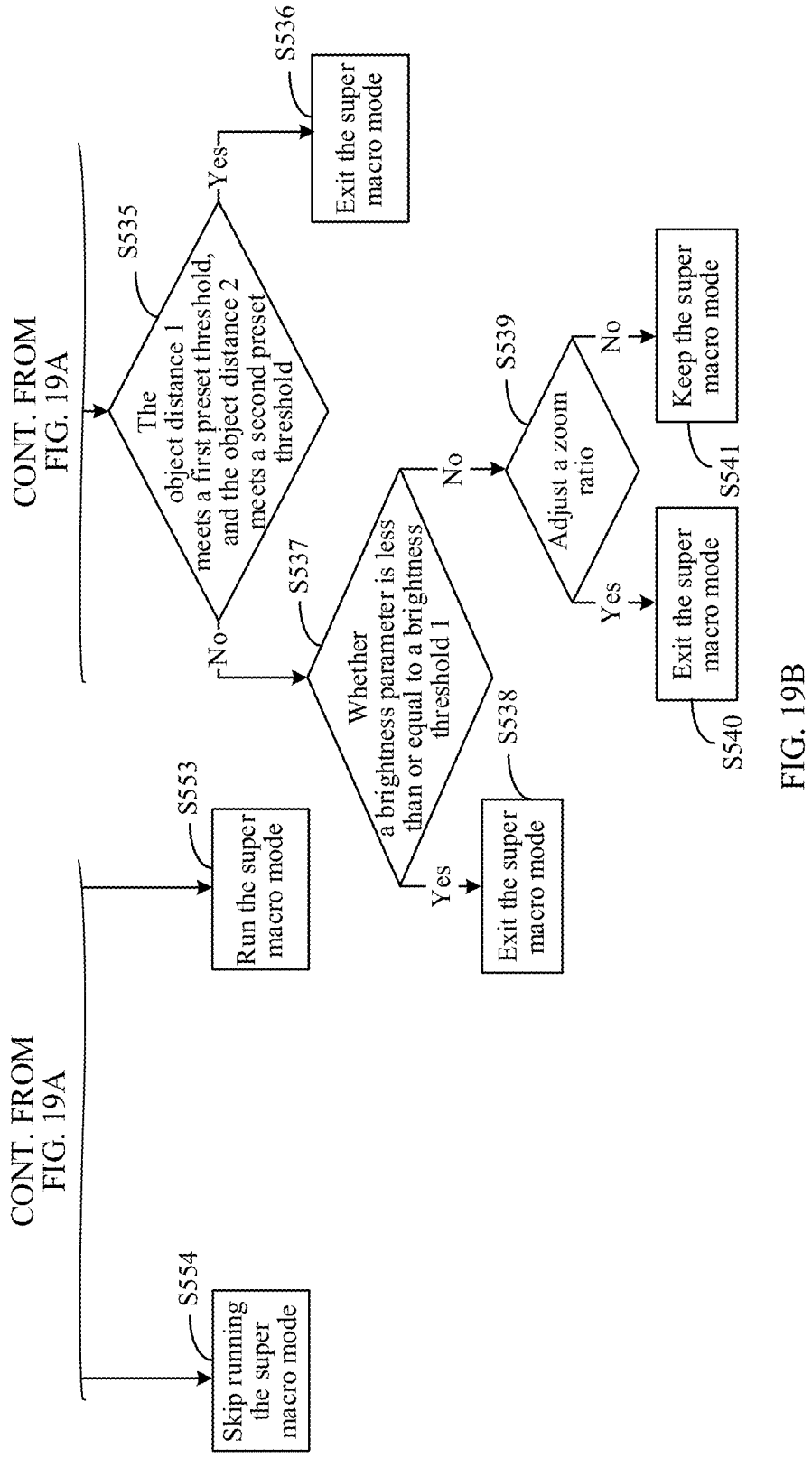
Figure 20A:
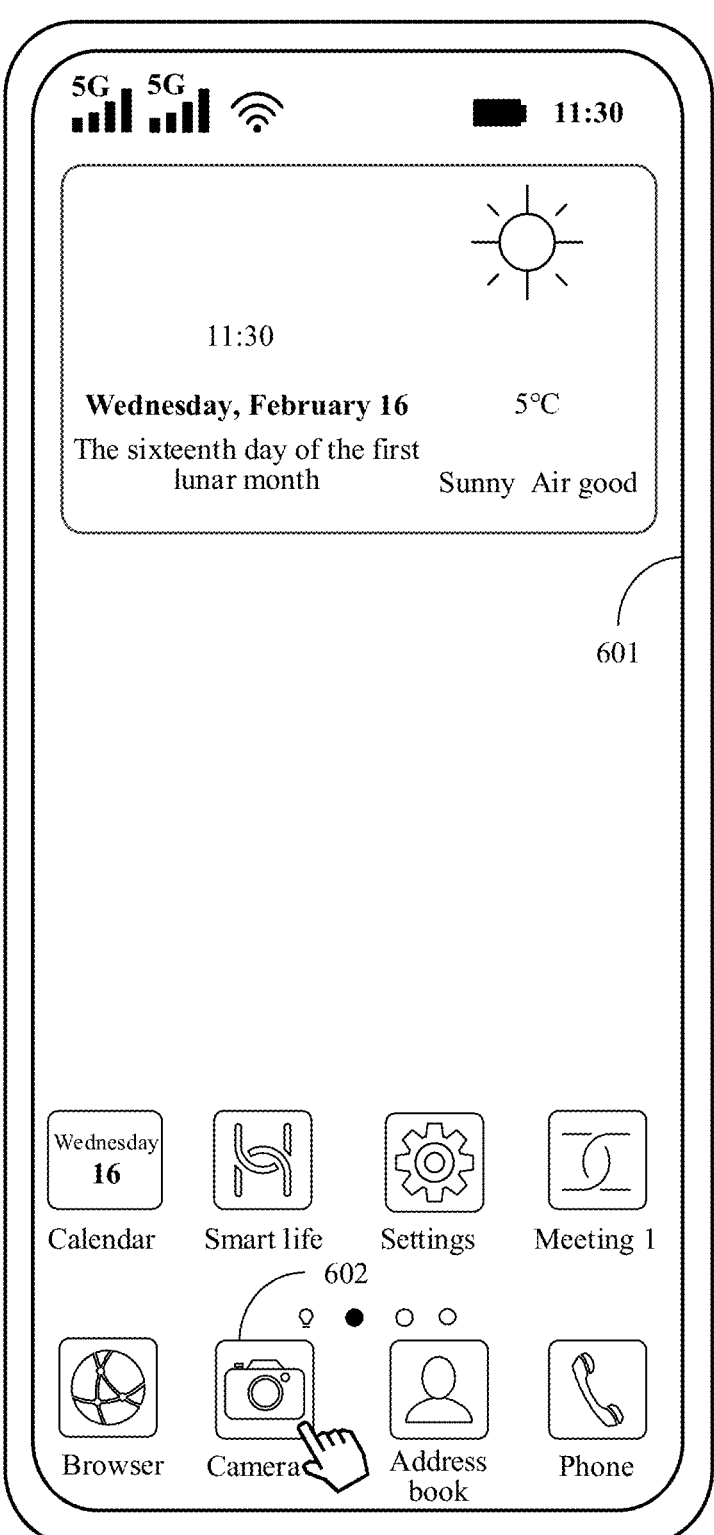
FIG. 20A, FIG. 20B, FIG. 20C, and FIG. 20D are schematic diagrams of a graphical user interface according to an embodiment of this application.
Figure 20B:
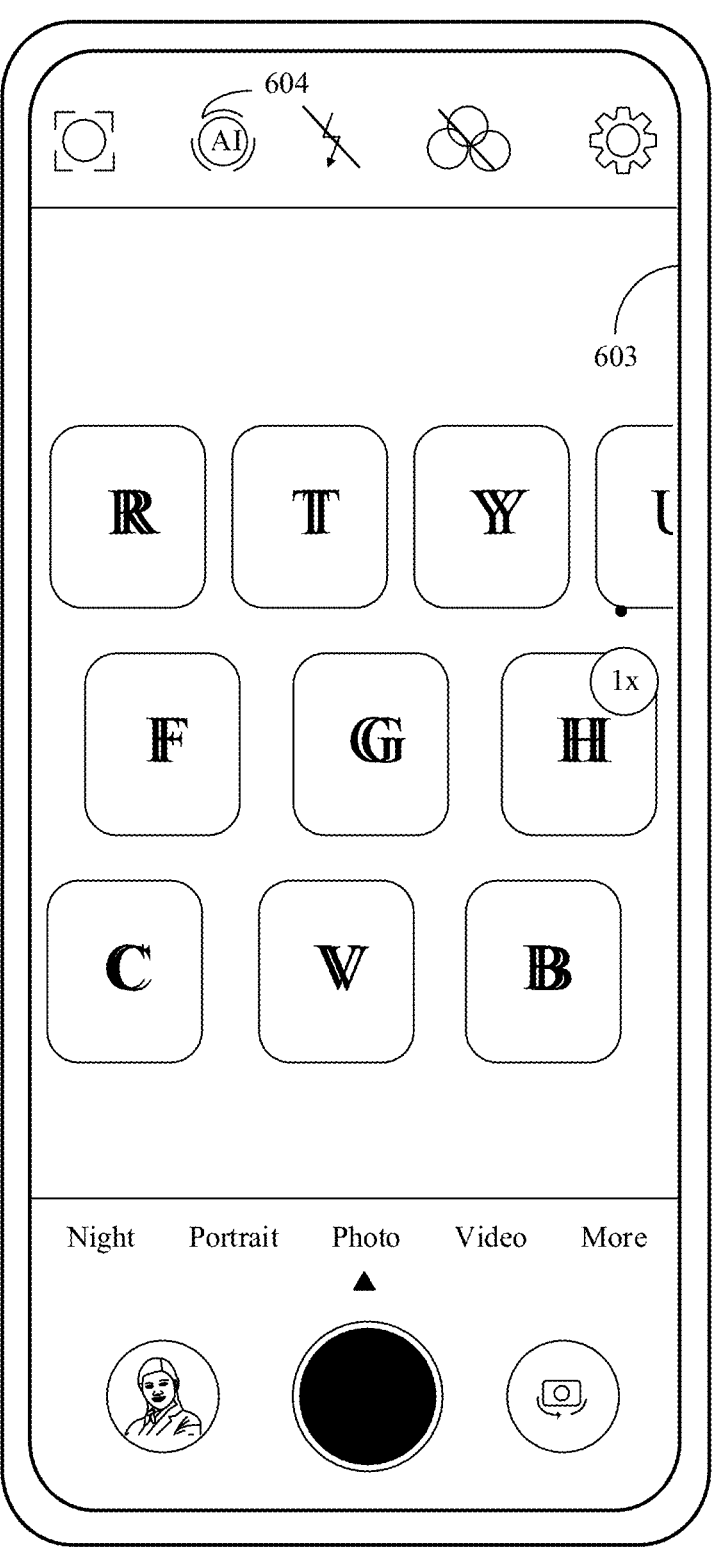
Figure 20C:
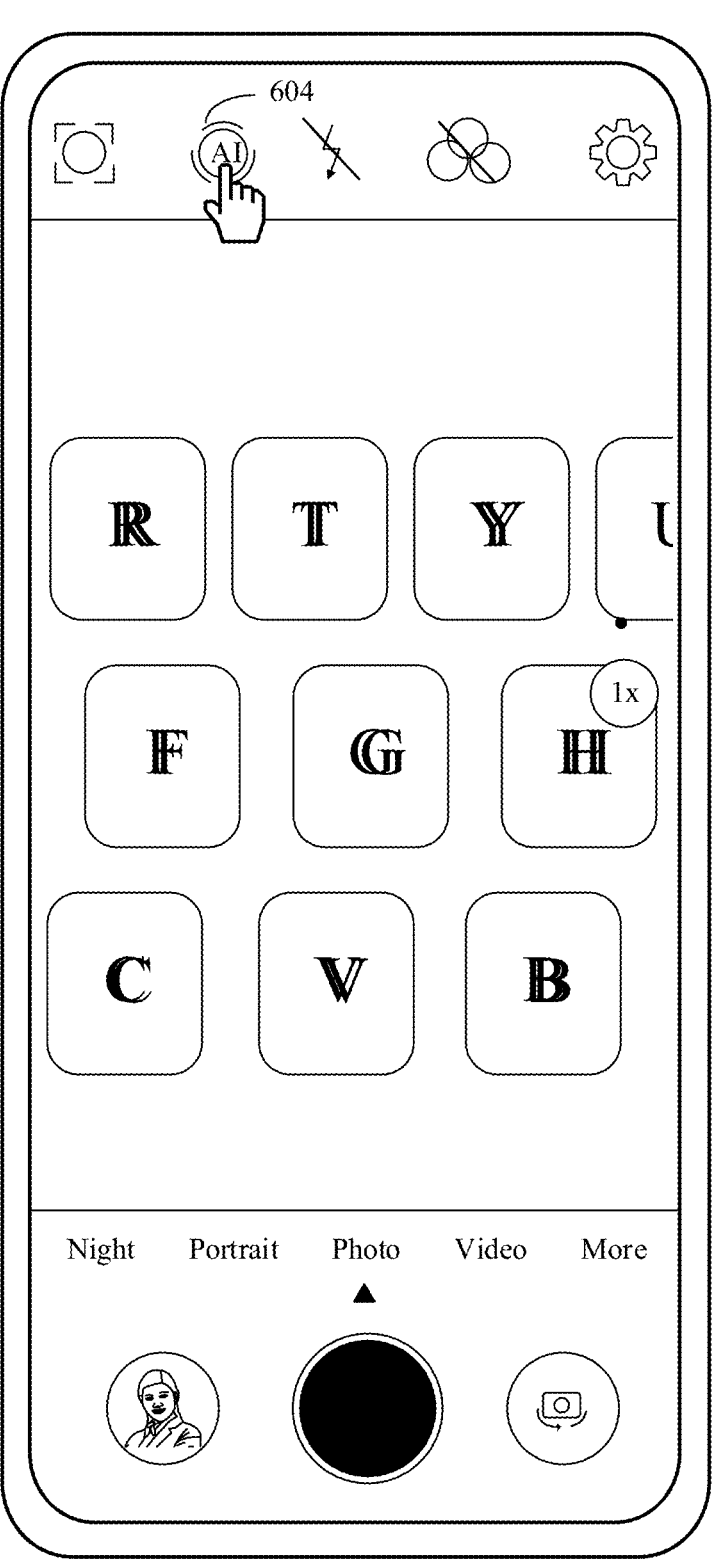
Figure 20D:
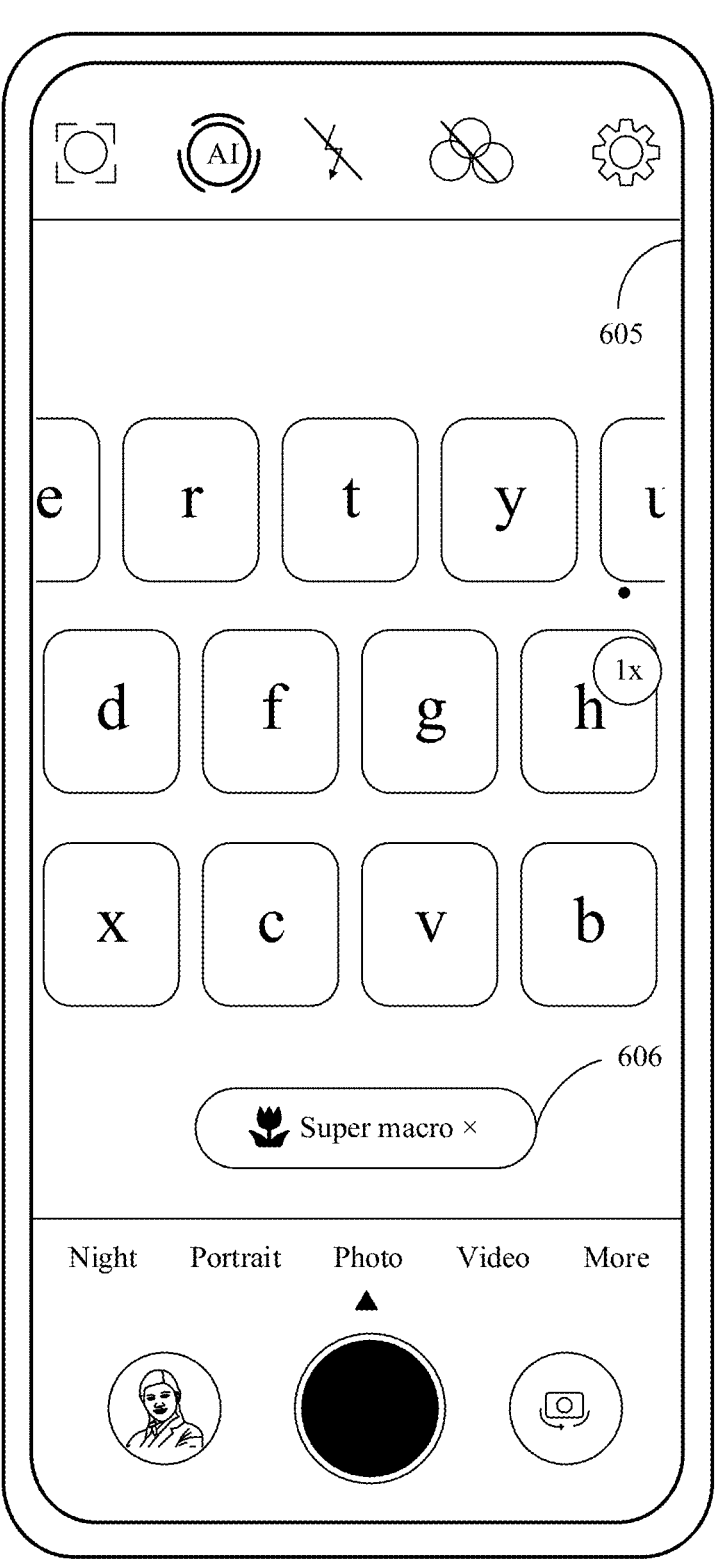
Figure 21A:
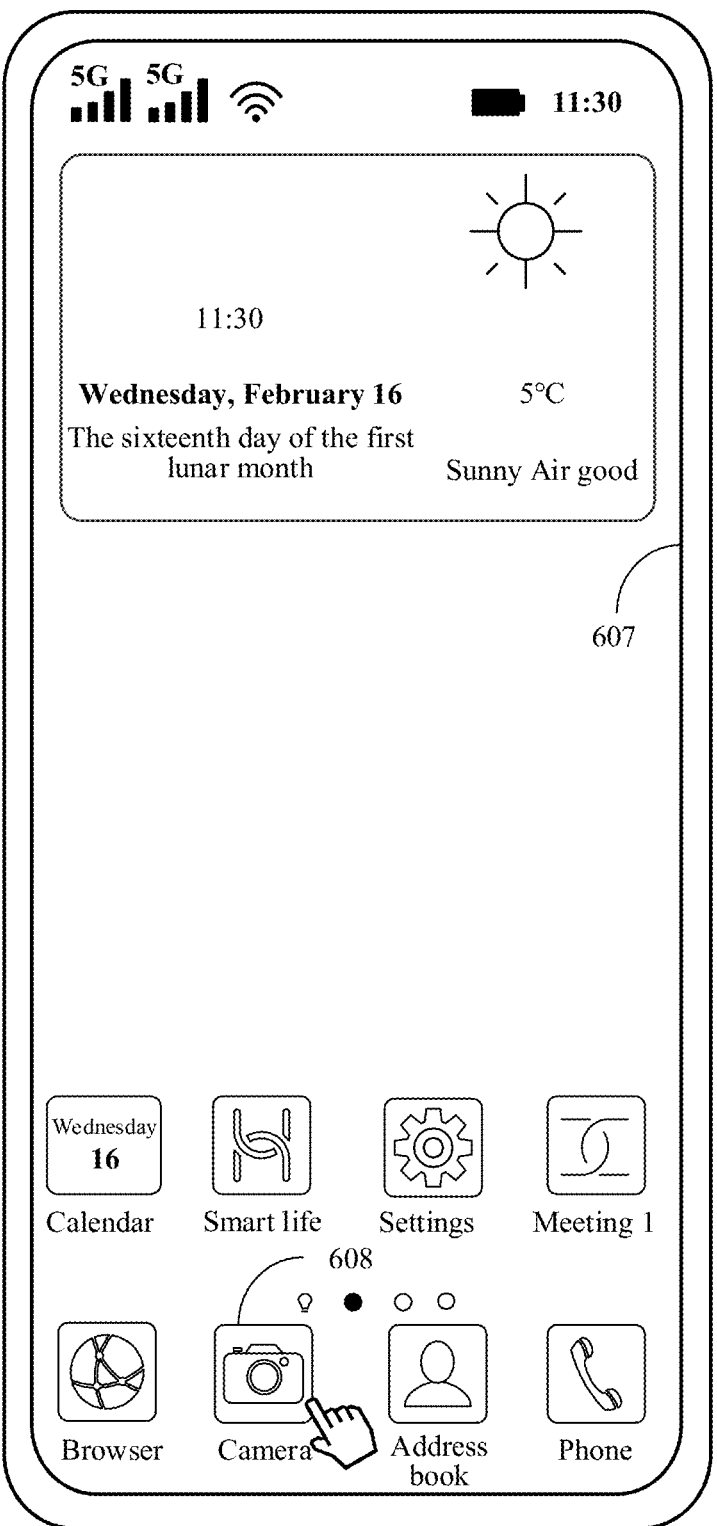
FIG. 21A, FIG. 21B, FIG. 21C, and FIG. 21D, FIG. 21E, and FIG, 21F are another schematic diagrams of a graphical user interface according to an embodiment of this application.
Figure 21B:
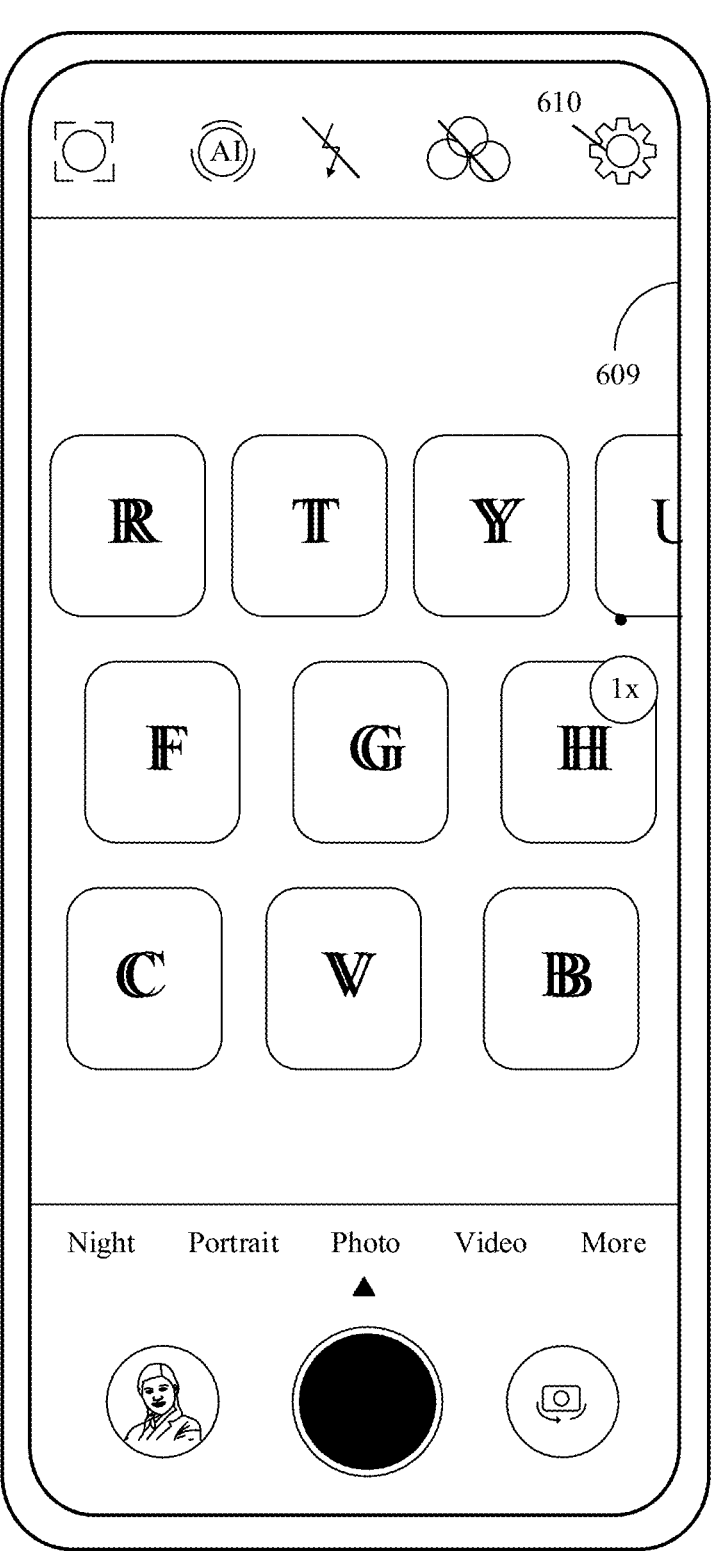
Figure 21C:
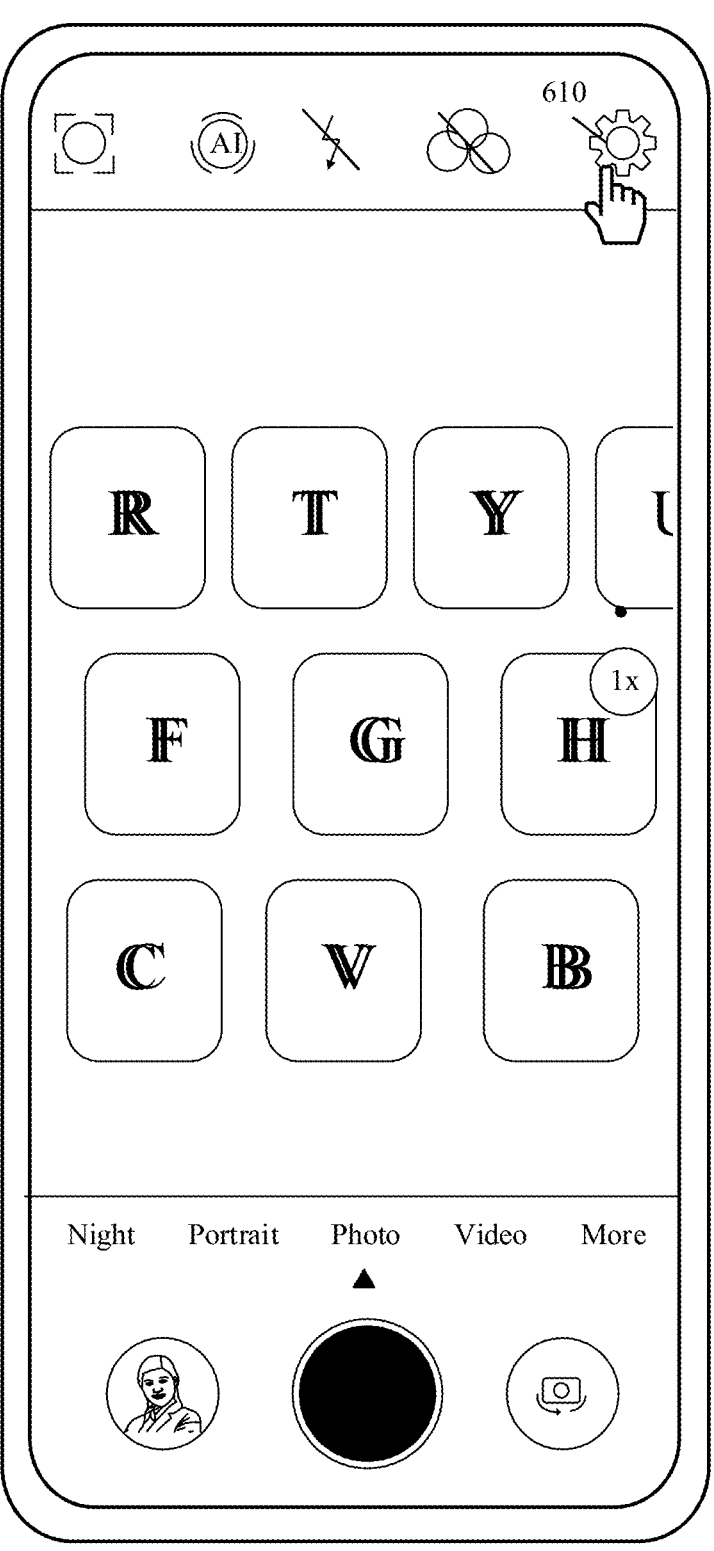
Figure 21D:
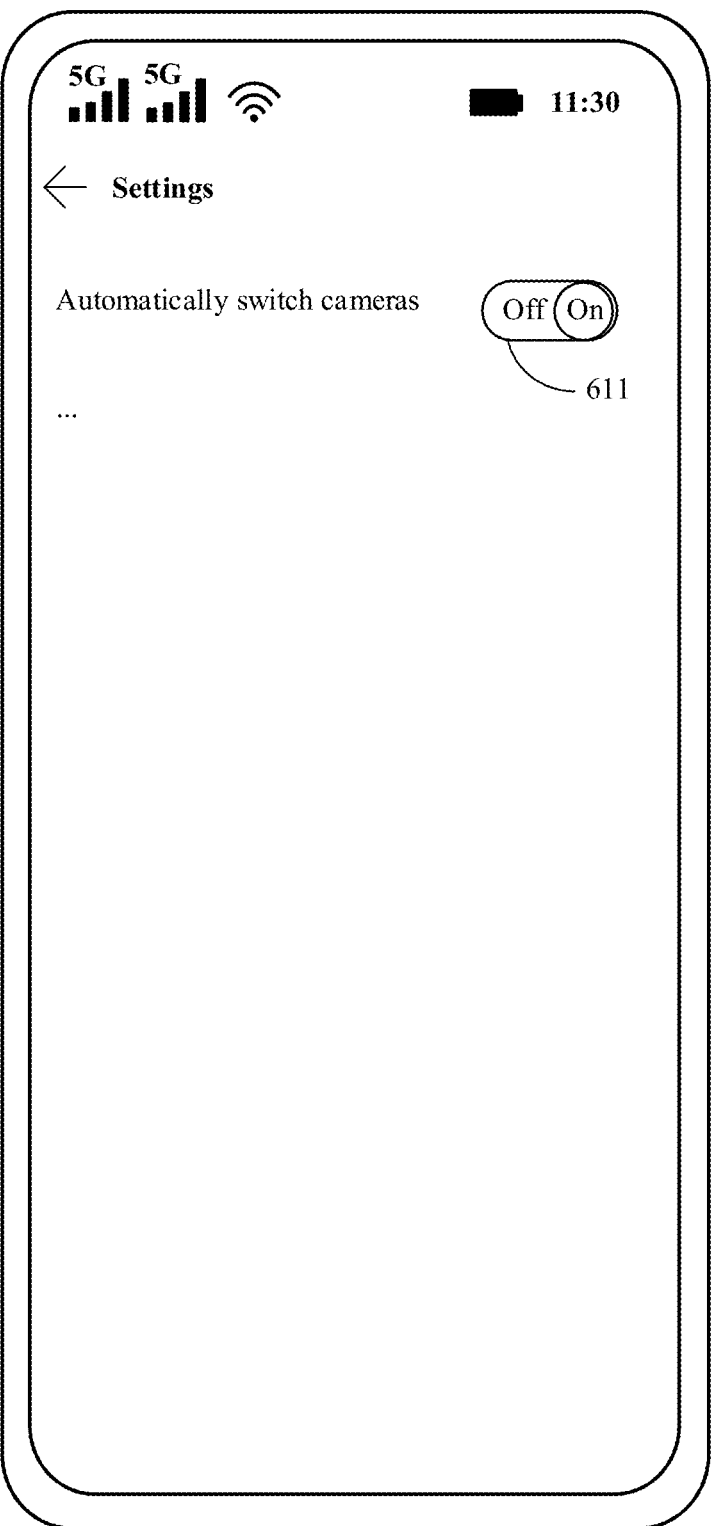
Figure 21E:
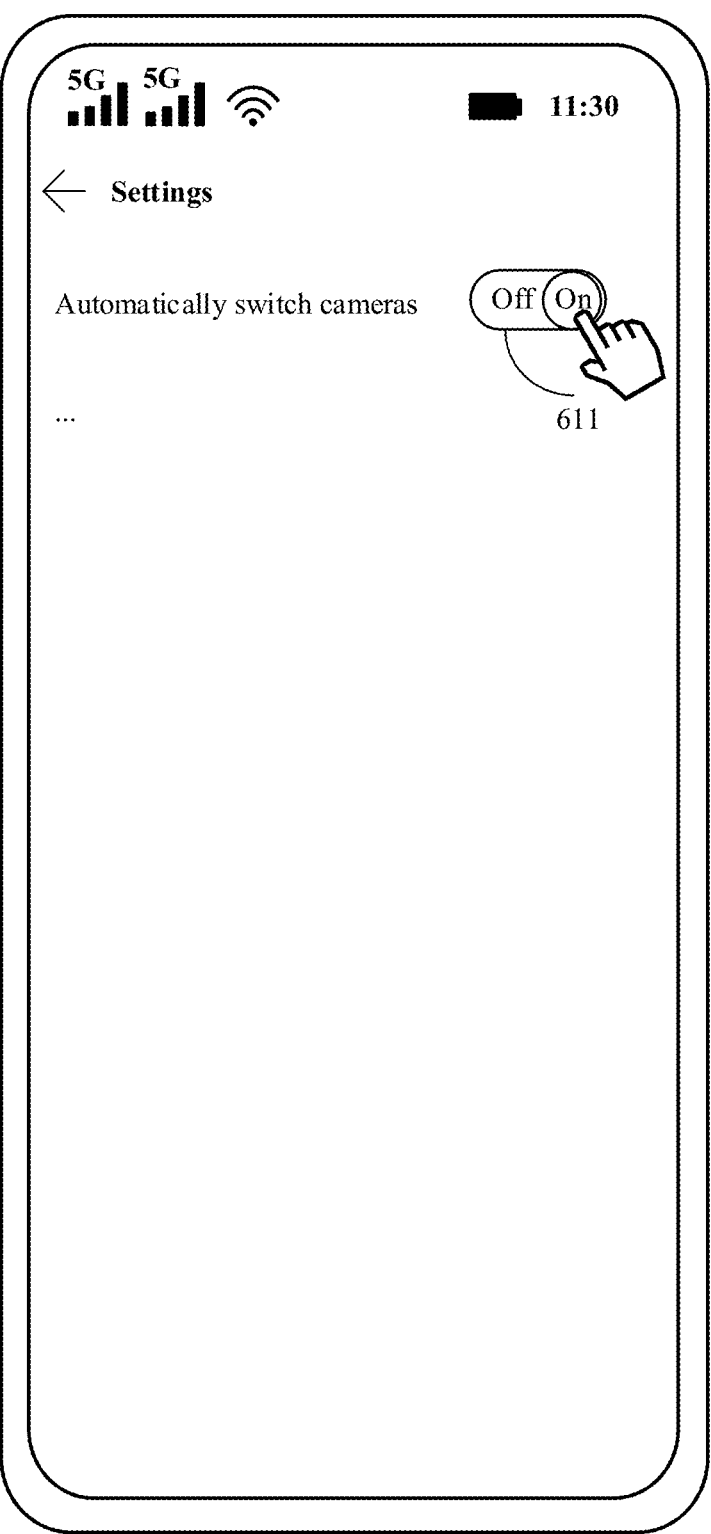
Figure 21F:
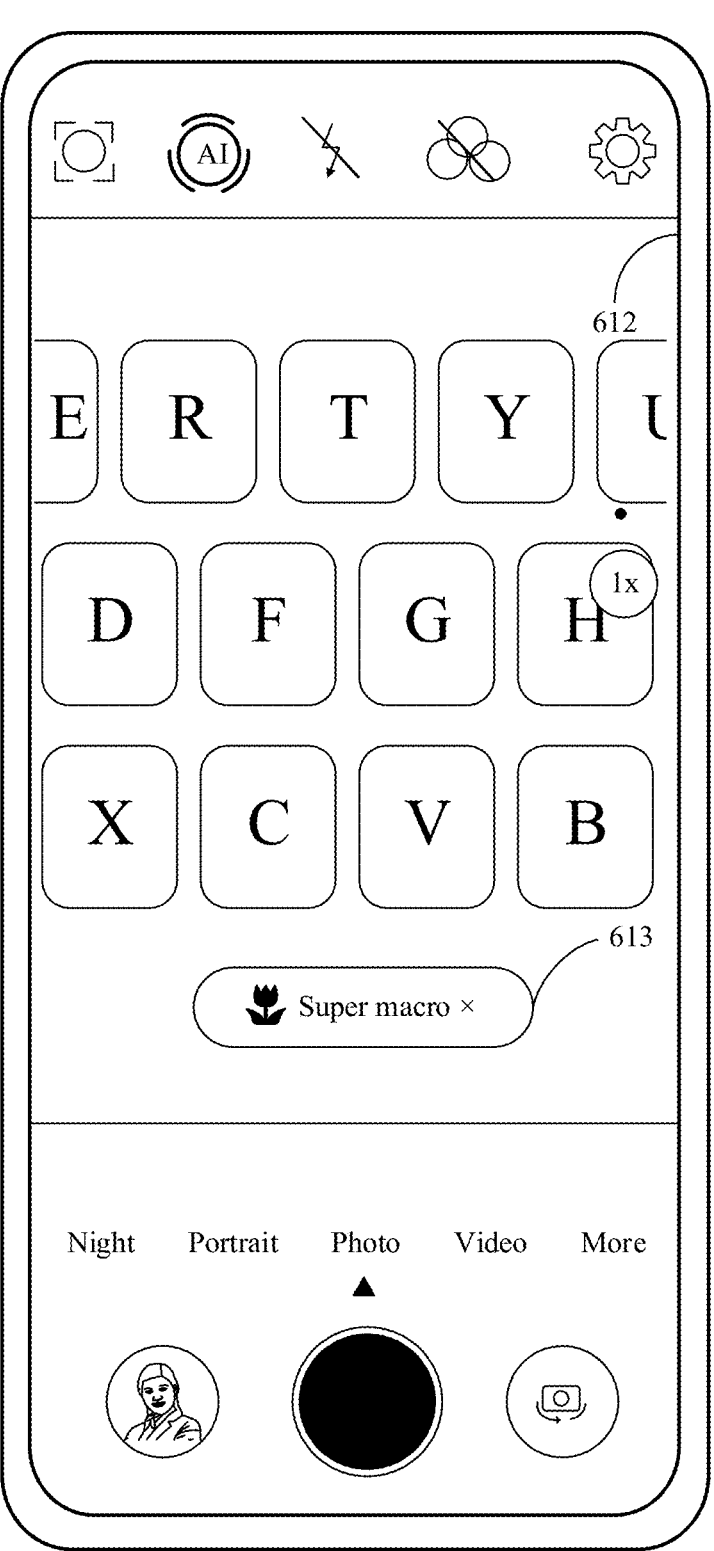
Figure 22A:
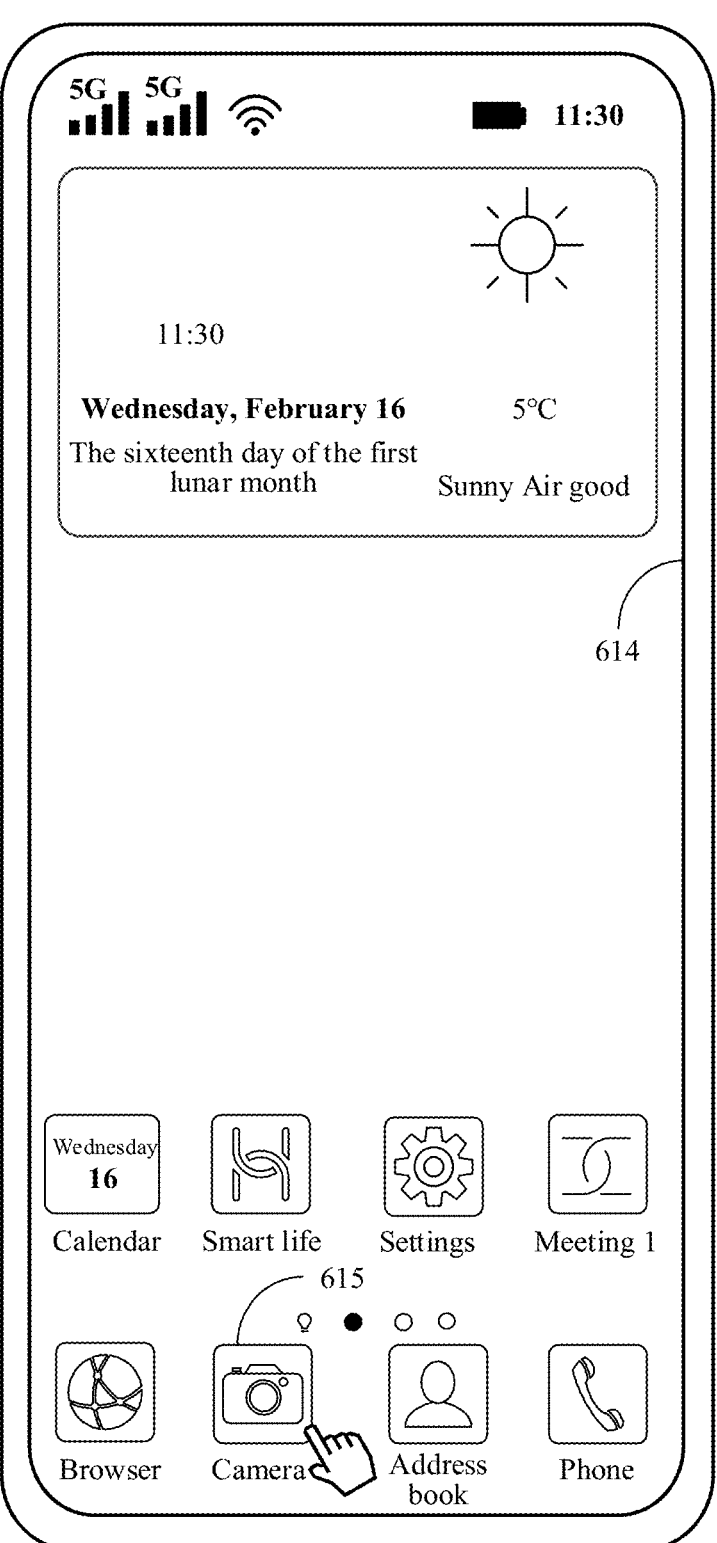
FIG. 22A, FIG. 22B, FIG. 22C, and FIG. 22D are still another schematic diagrams of a graphical user interface according to an embodiment of this application.
Figure 22B:
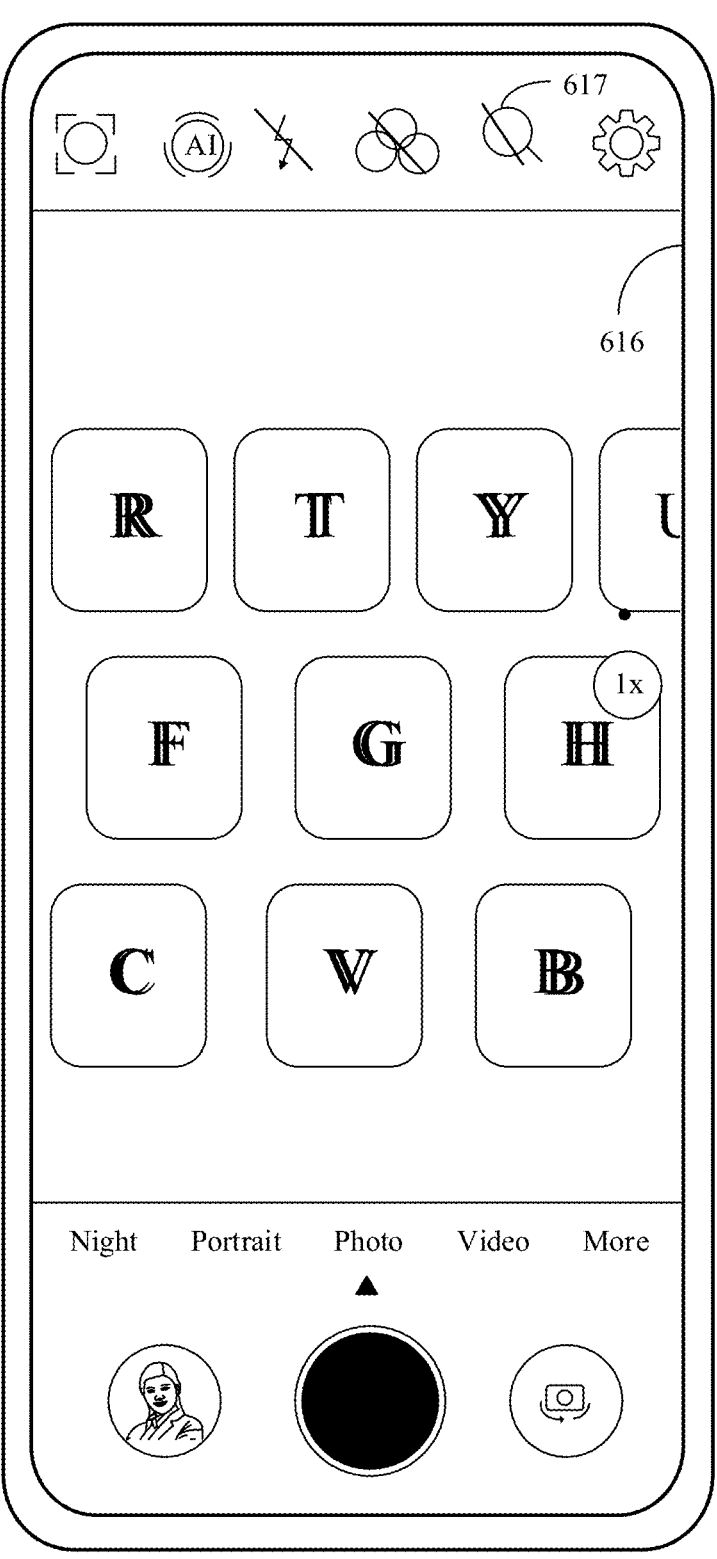
Figure 22C:
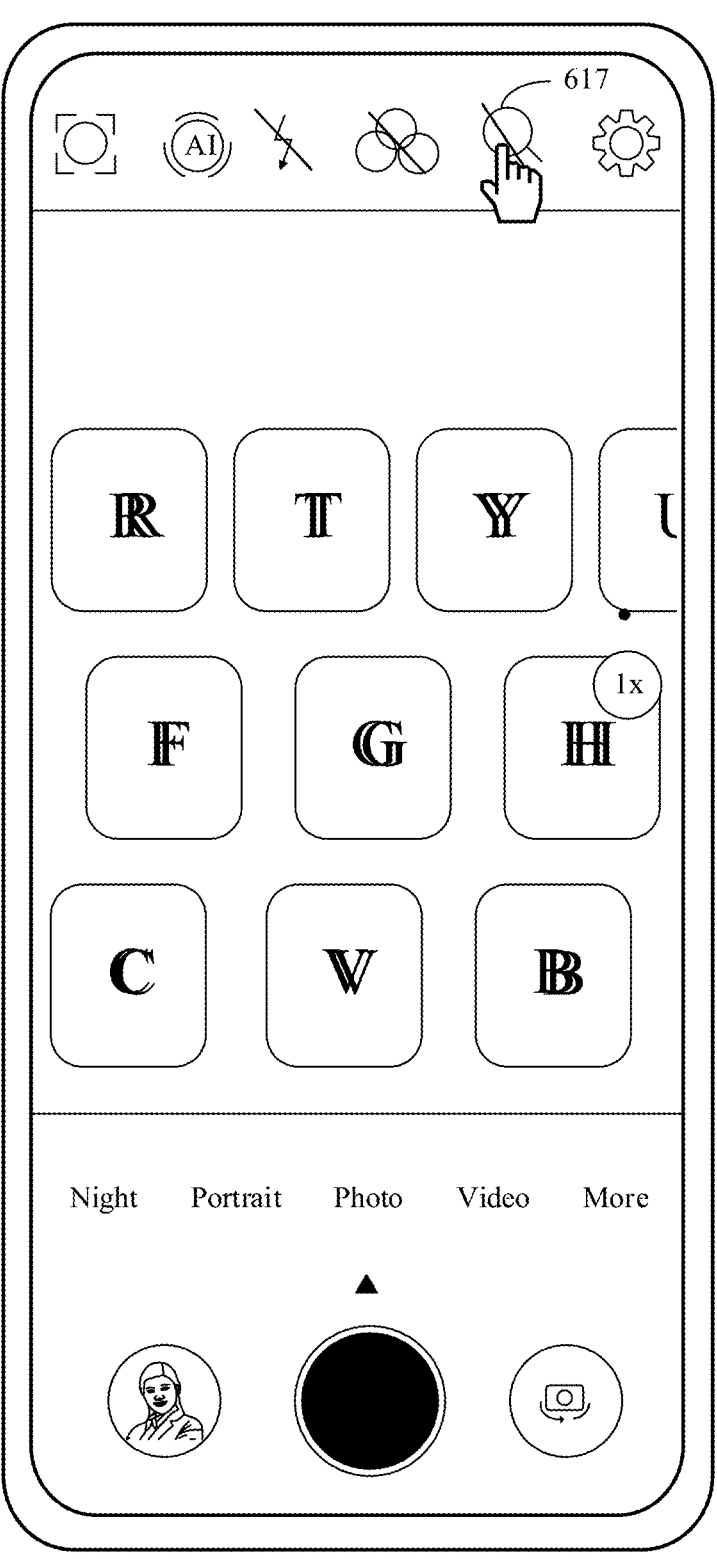
Figure 22D:
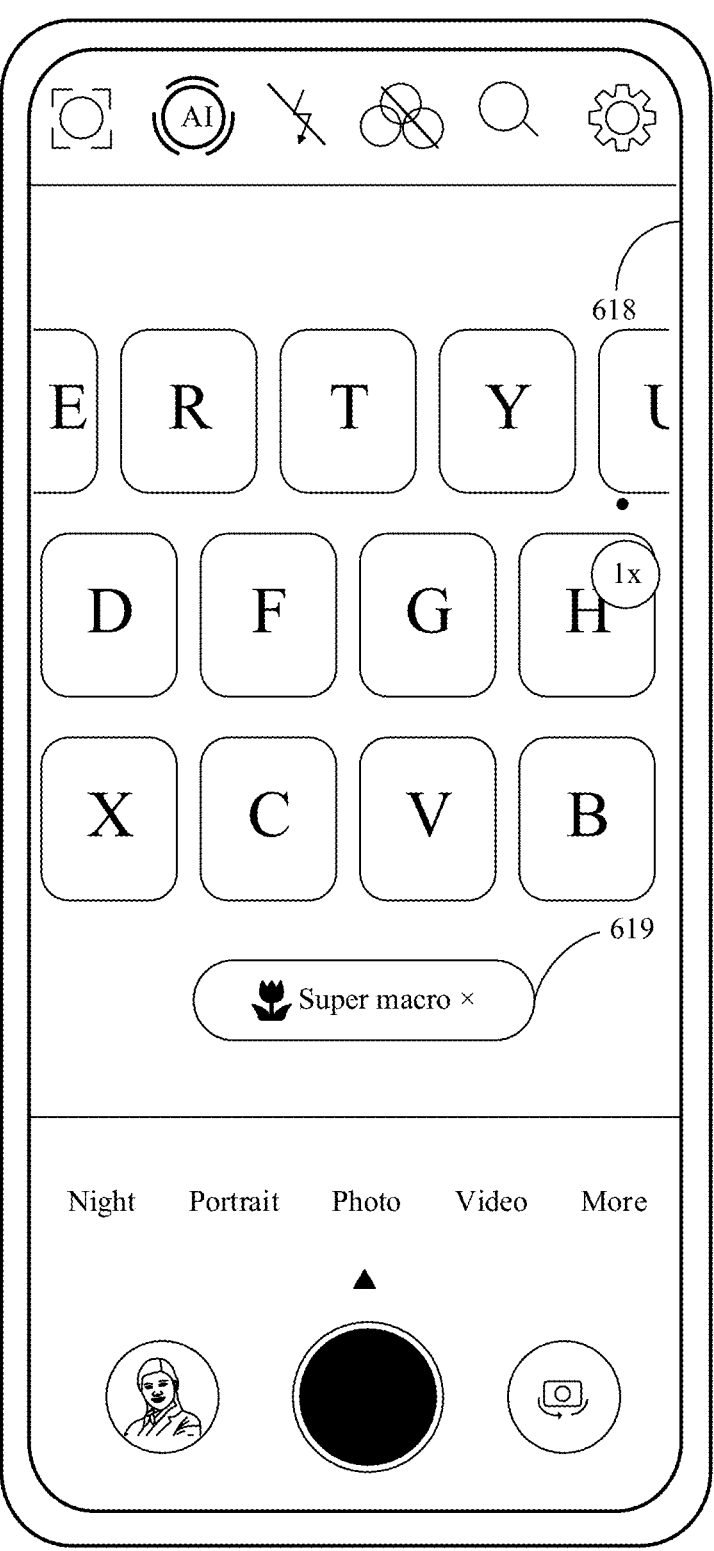
Figure 23A:
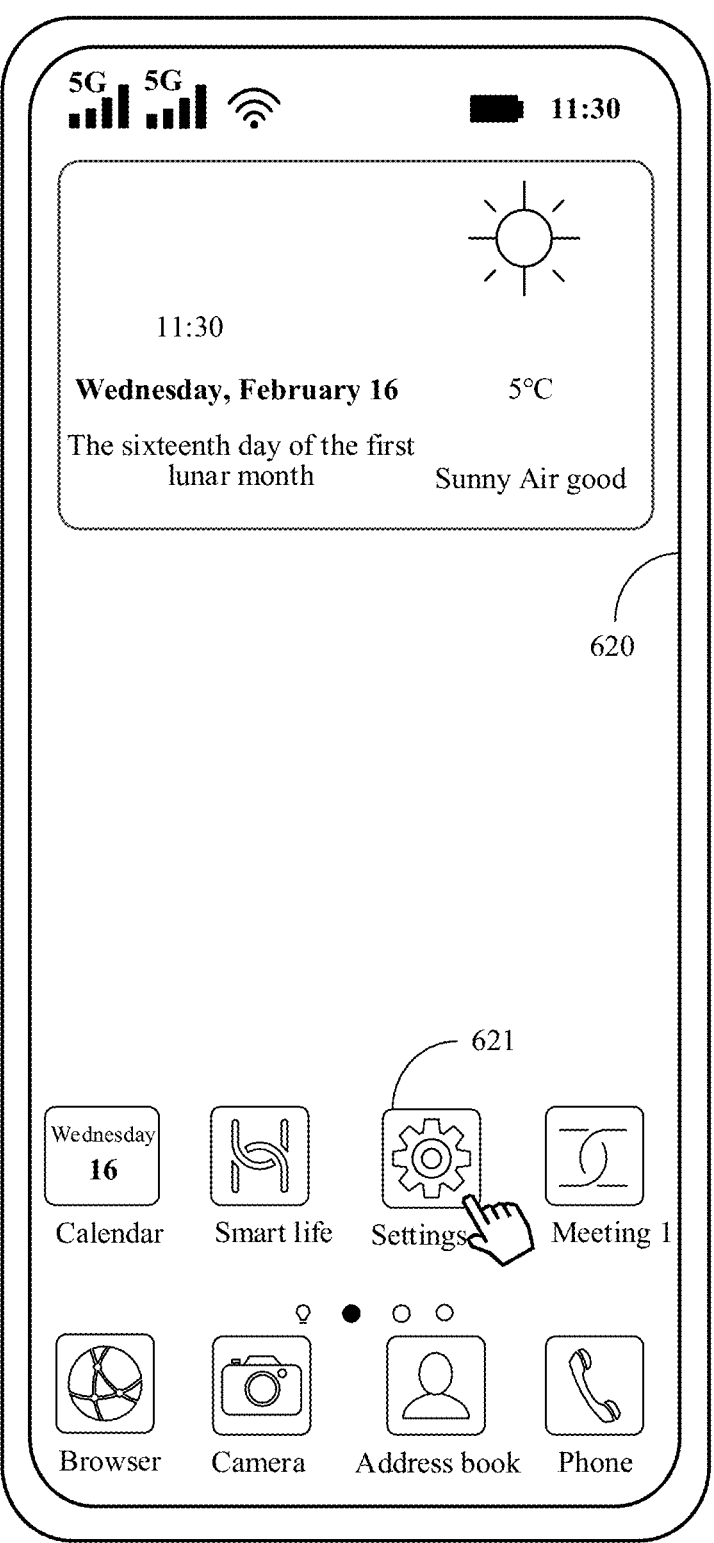
FIG. 23A, FIG. 23B, FIG. 23C, FIG. 23D, FIG. 23E, FIG. 23F, FIG. 23G, and FIG. 23H are still another schematic diagrams of a graphical user interface according to an embodiment of this application.
Figure 23B:
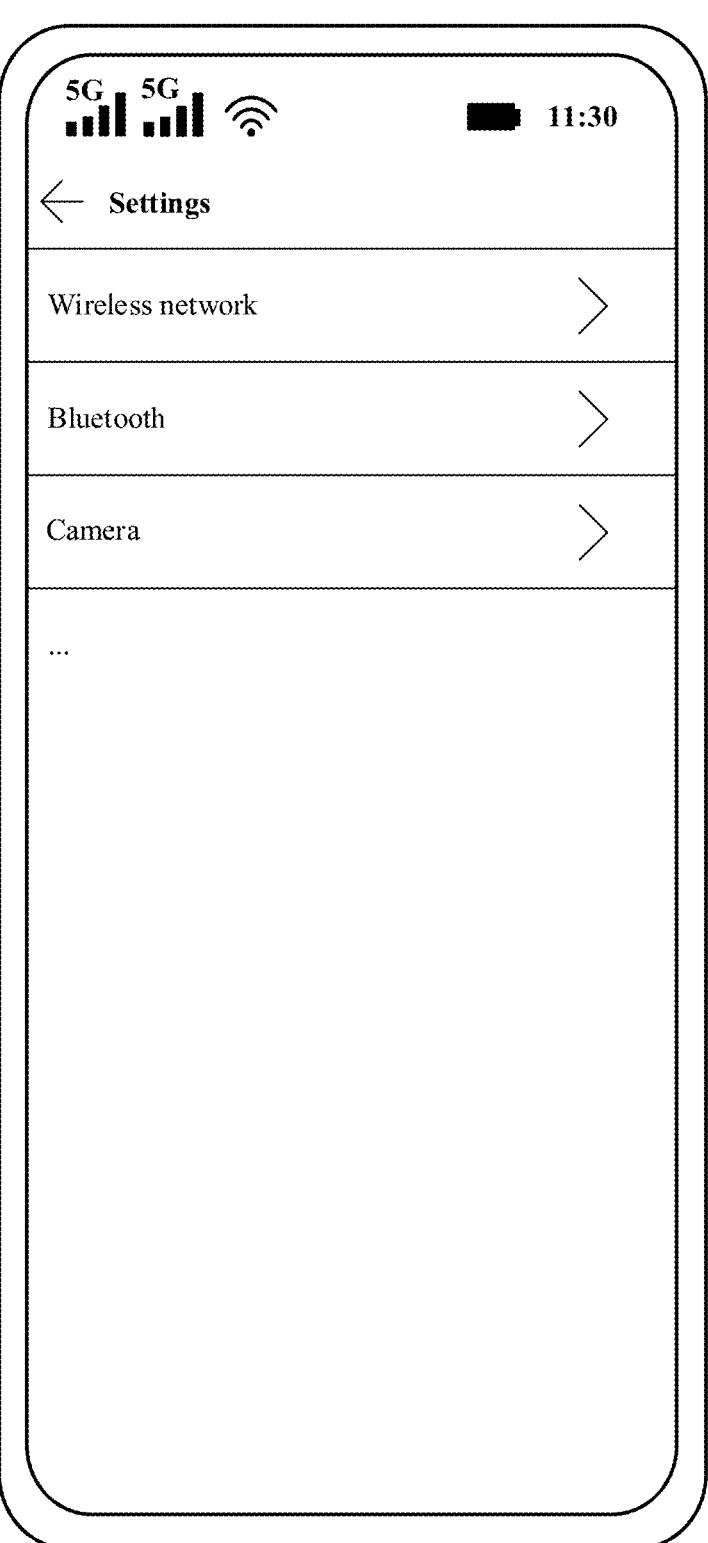
Figure 23C:
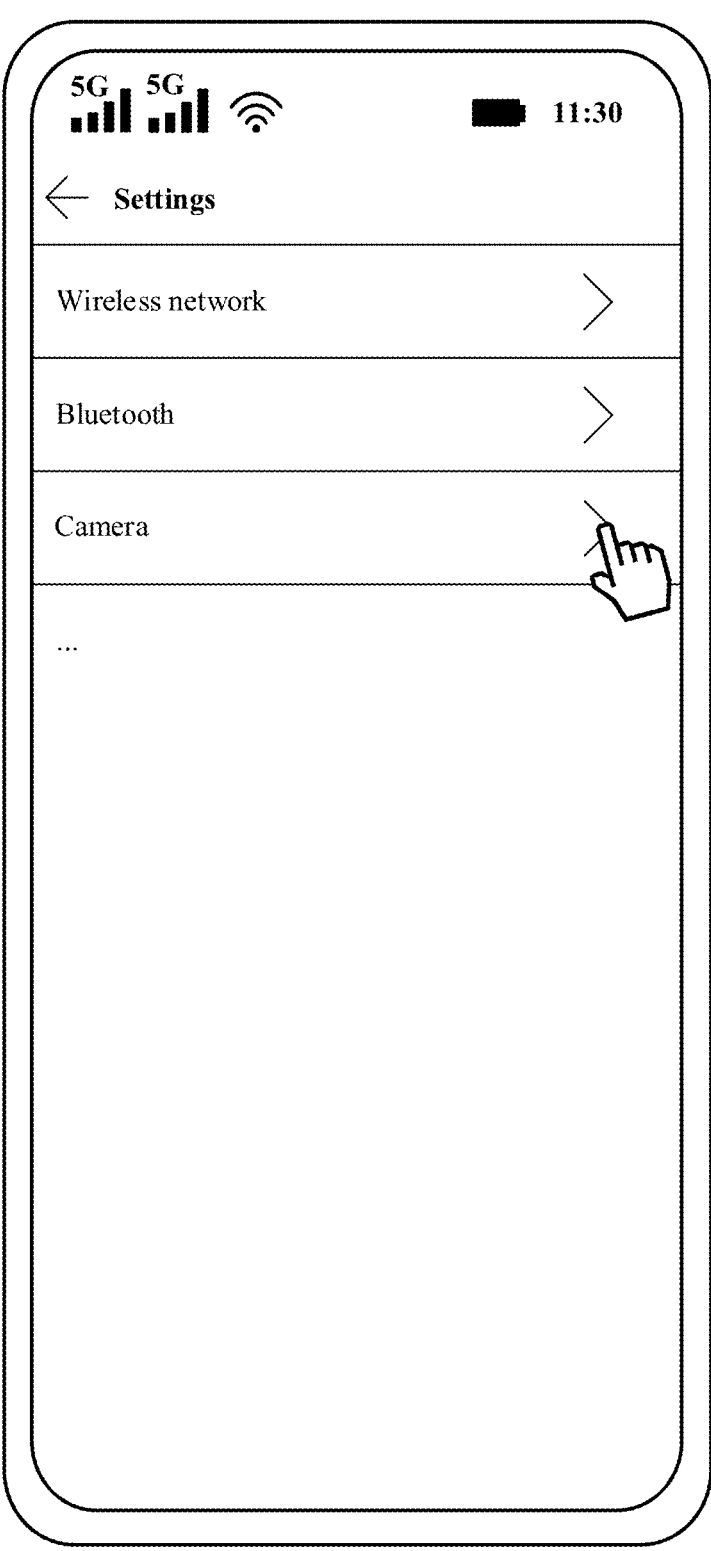
Figure 23D:
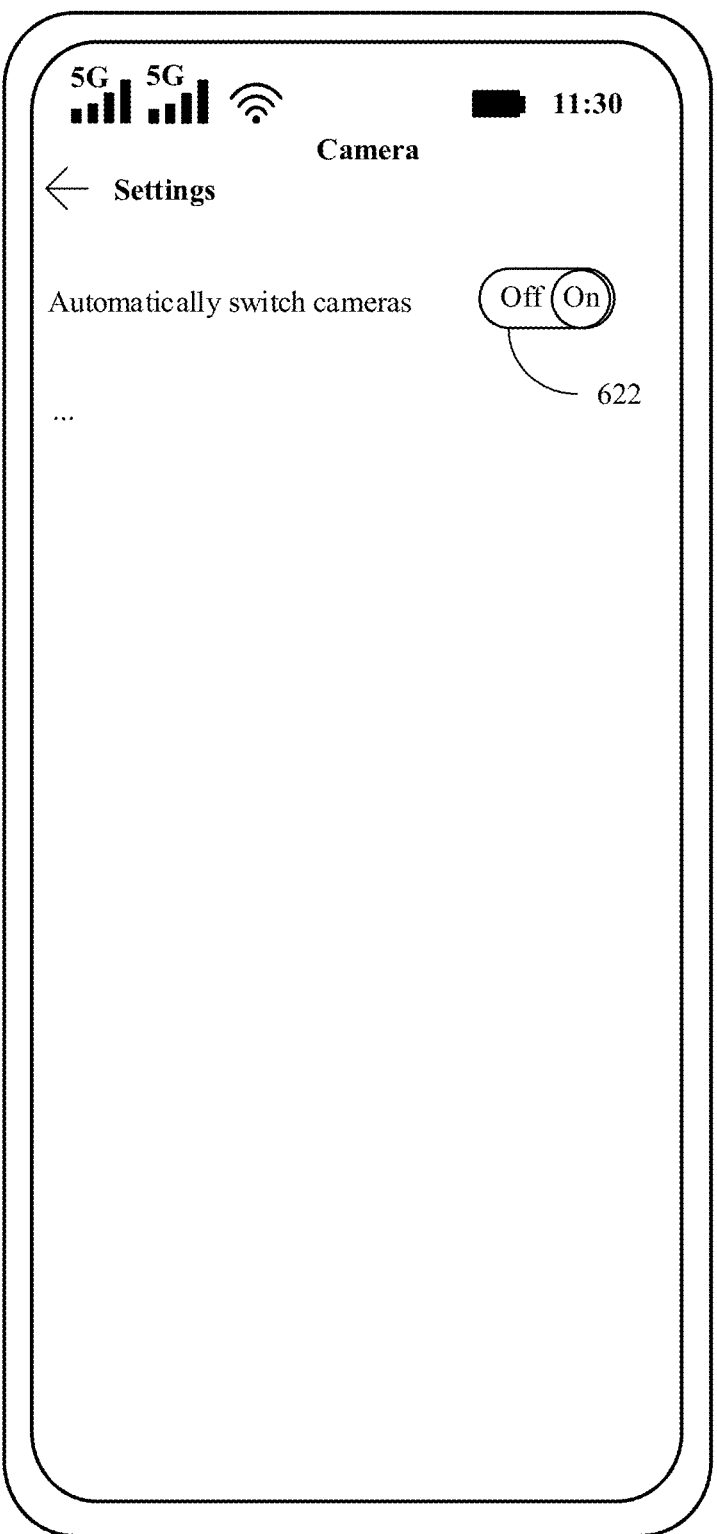
Figure 23E:
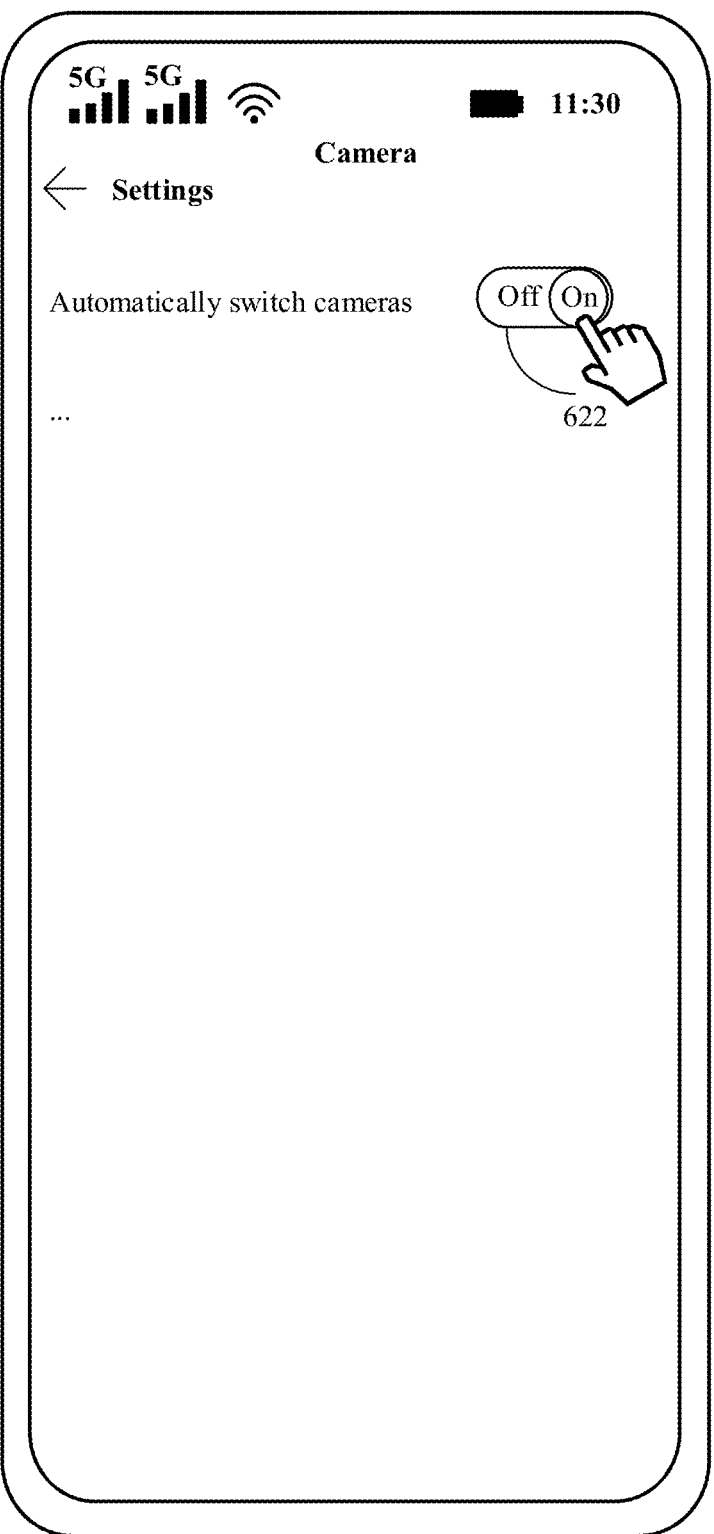
Figure 23F:
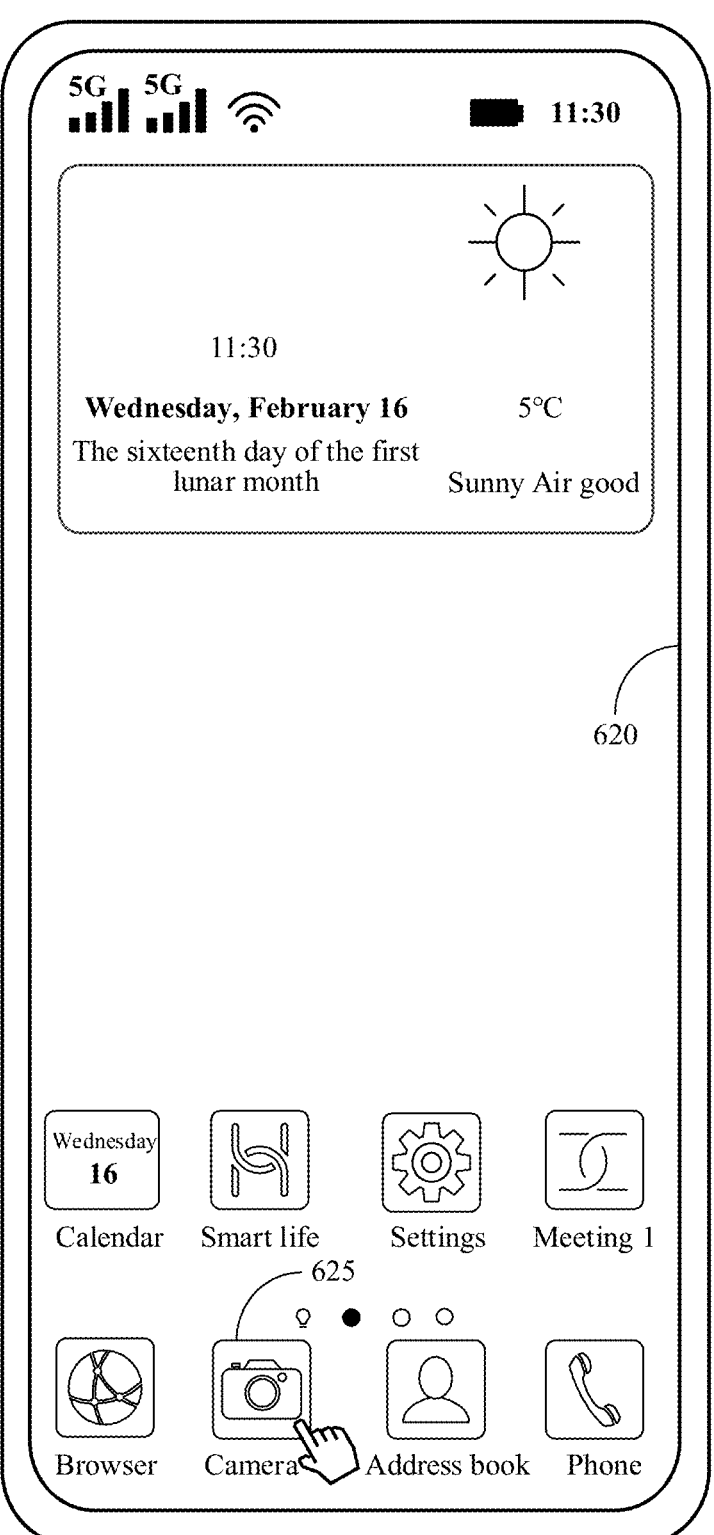
Figure 23G:
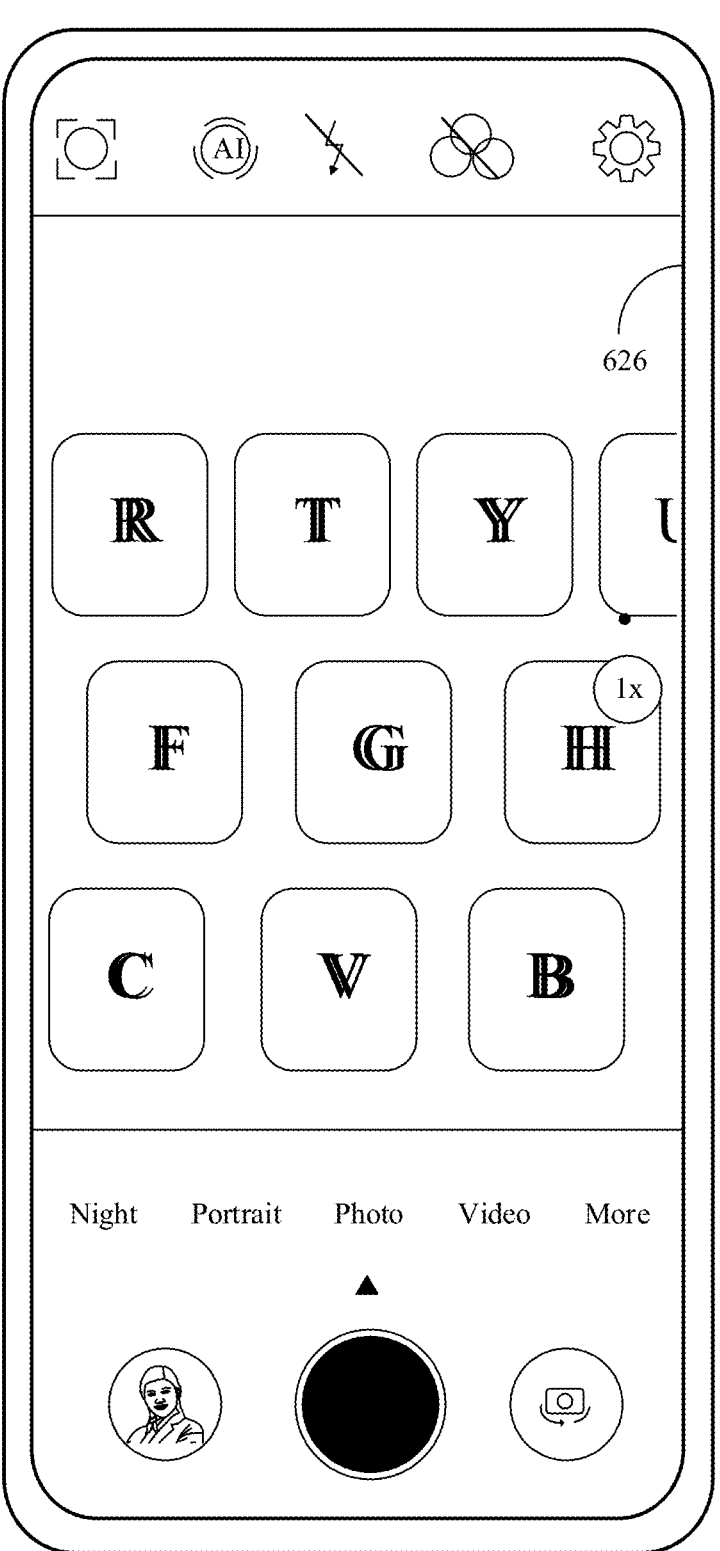
Figure 23H:
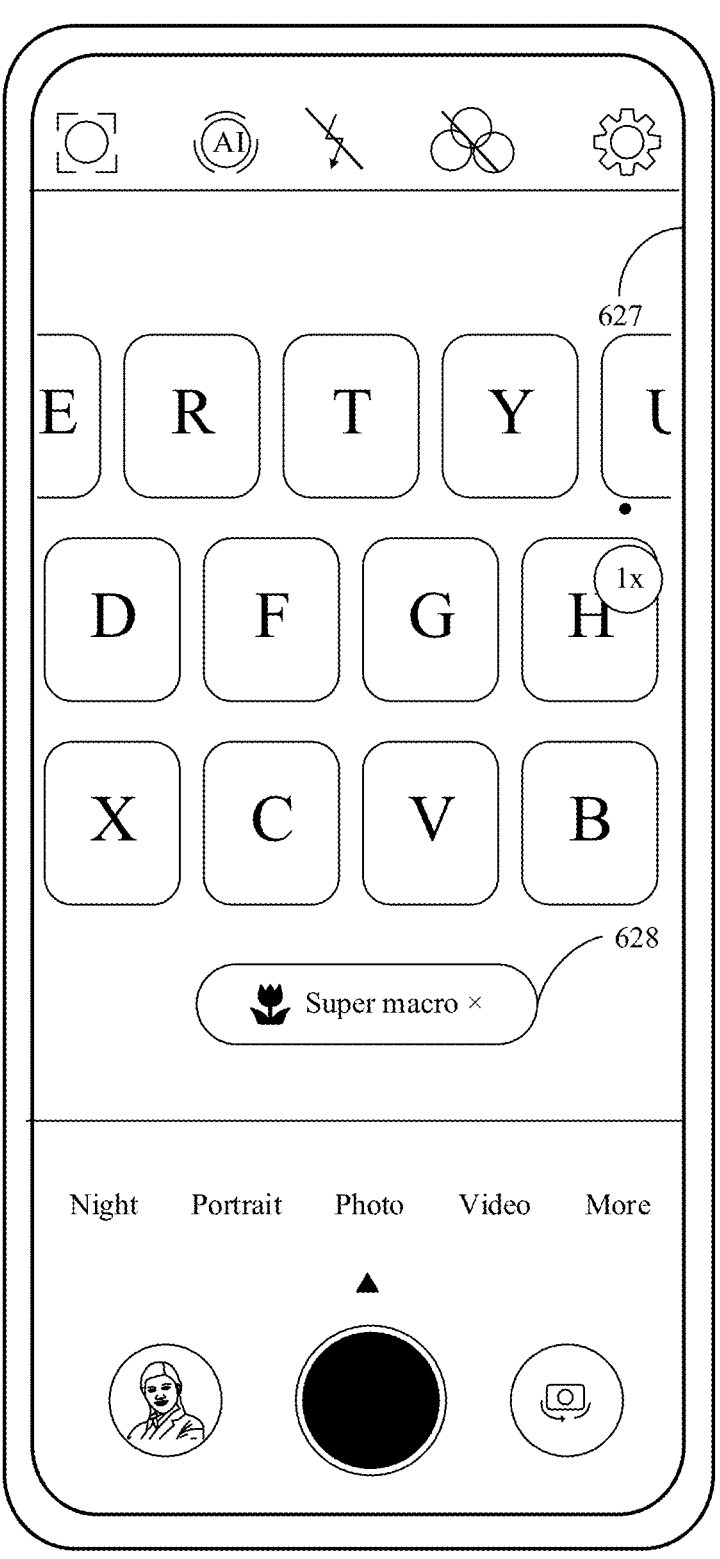
Figure 24A:
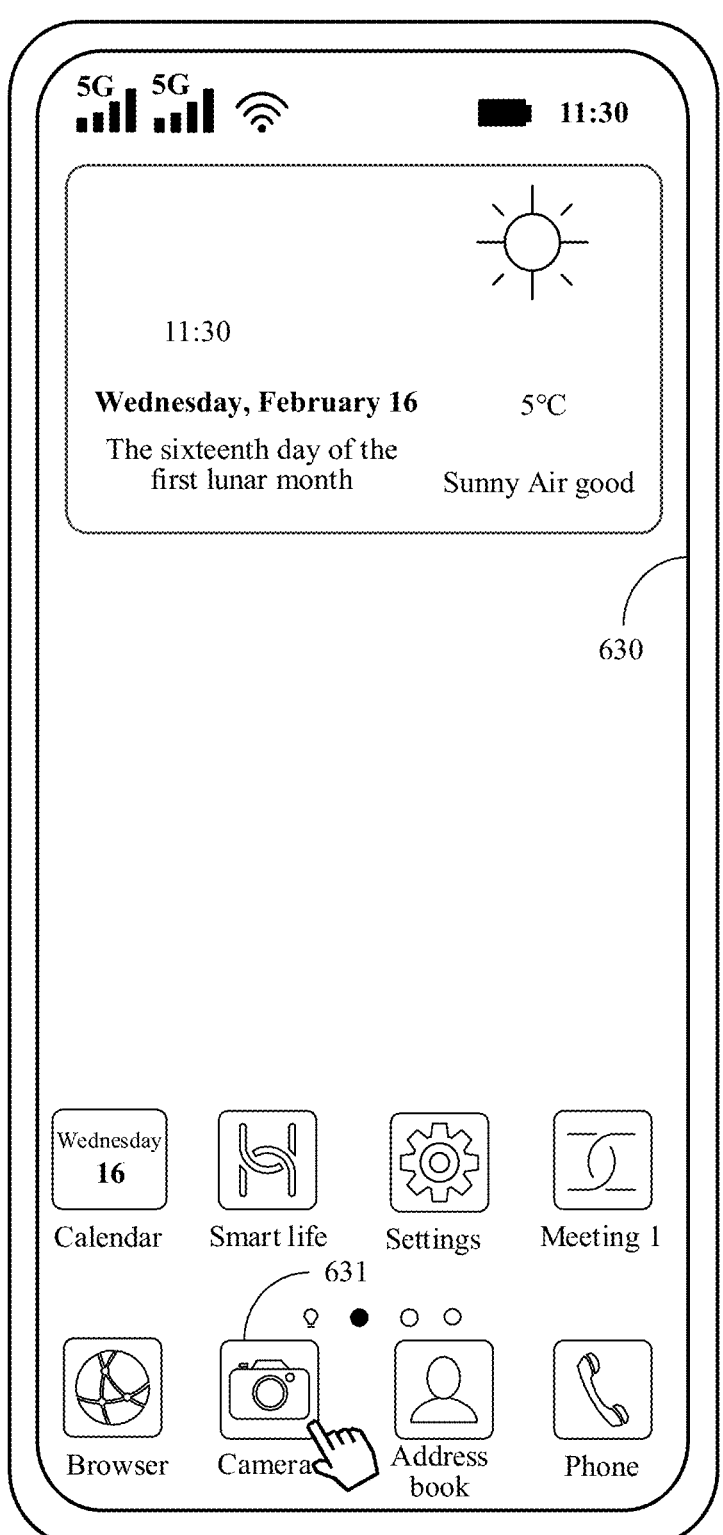
FIG. 24A, FIG. 24B, FIG. 24C, FIG. 24D, FIG. 24E, and FIG. 24F are still another schematic diagrams of a graphical user interface according to an embodiment of this application.
Figure 24B:
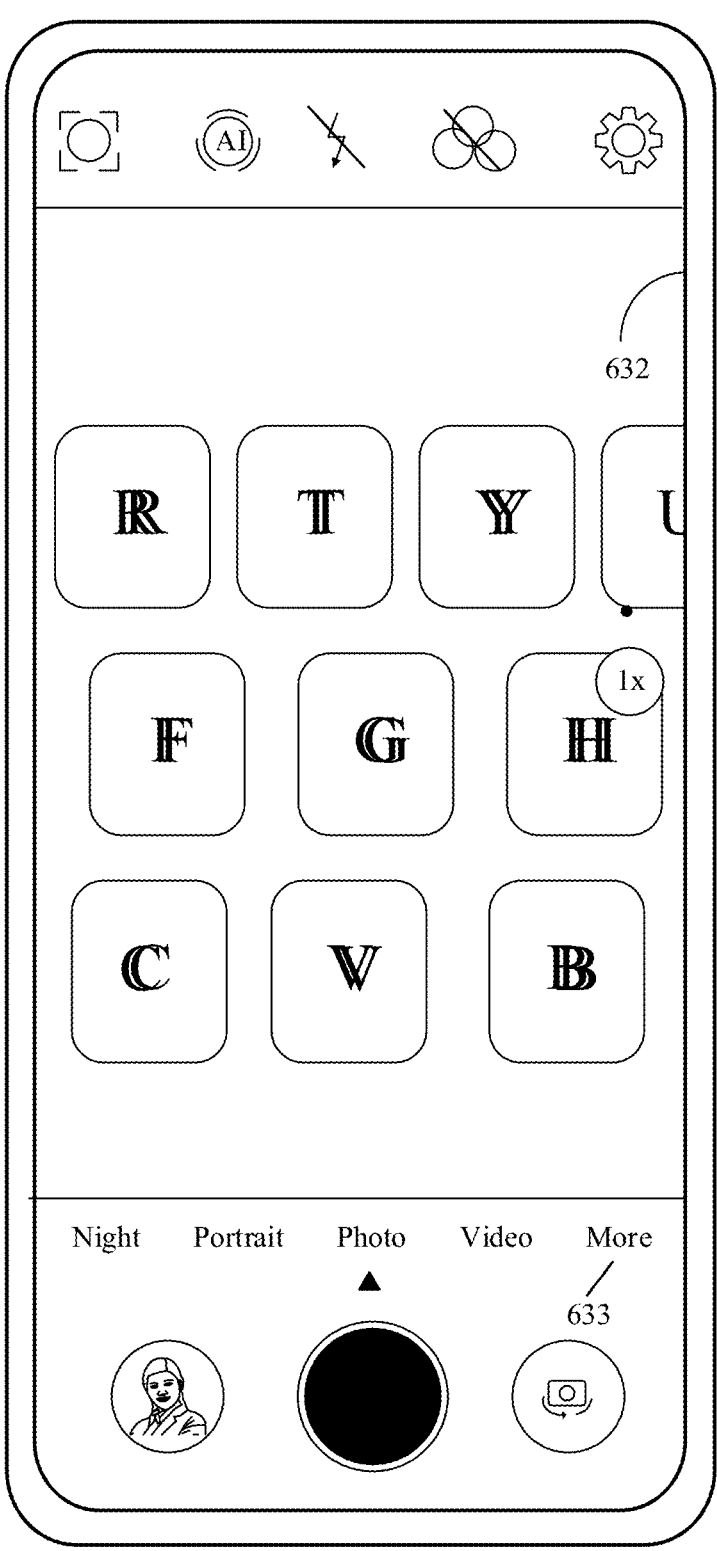
Figure 24C:
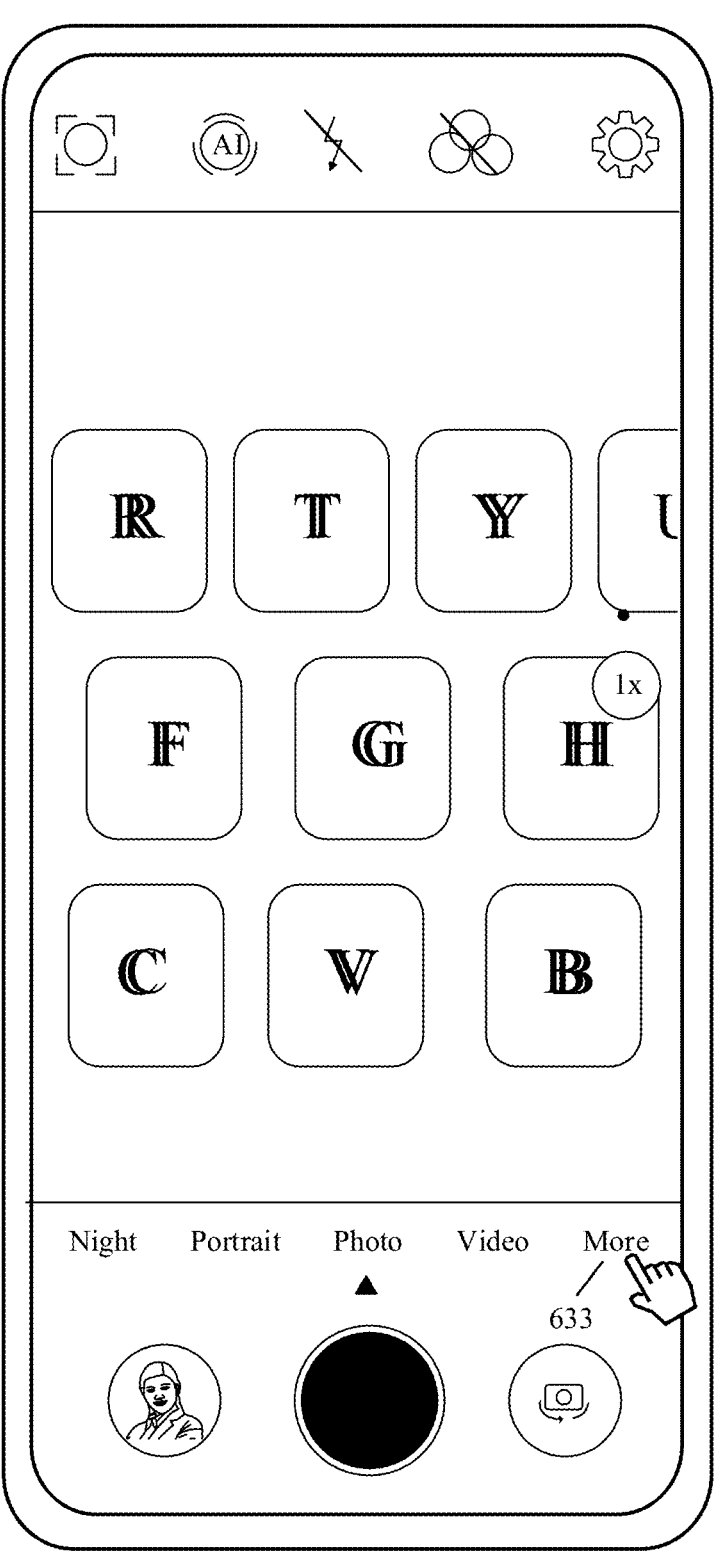
Figure 24D:
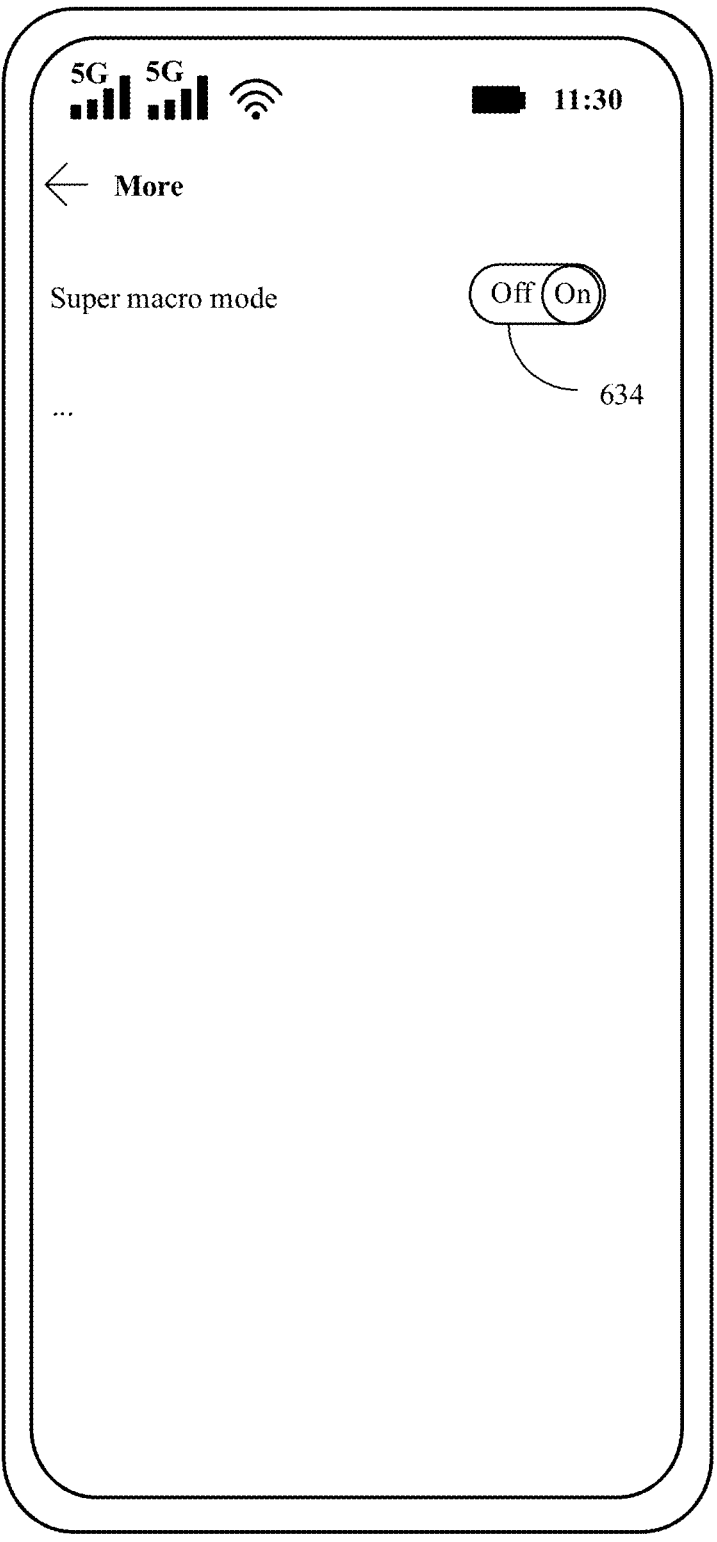
Figure 24E:
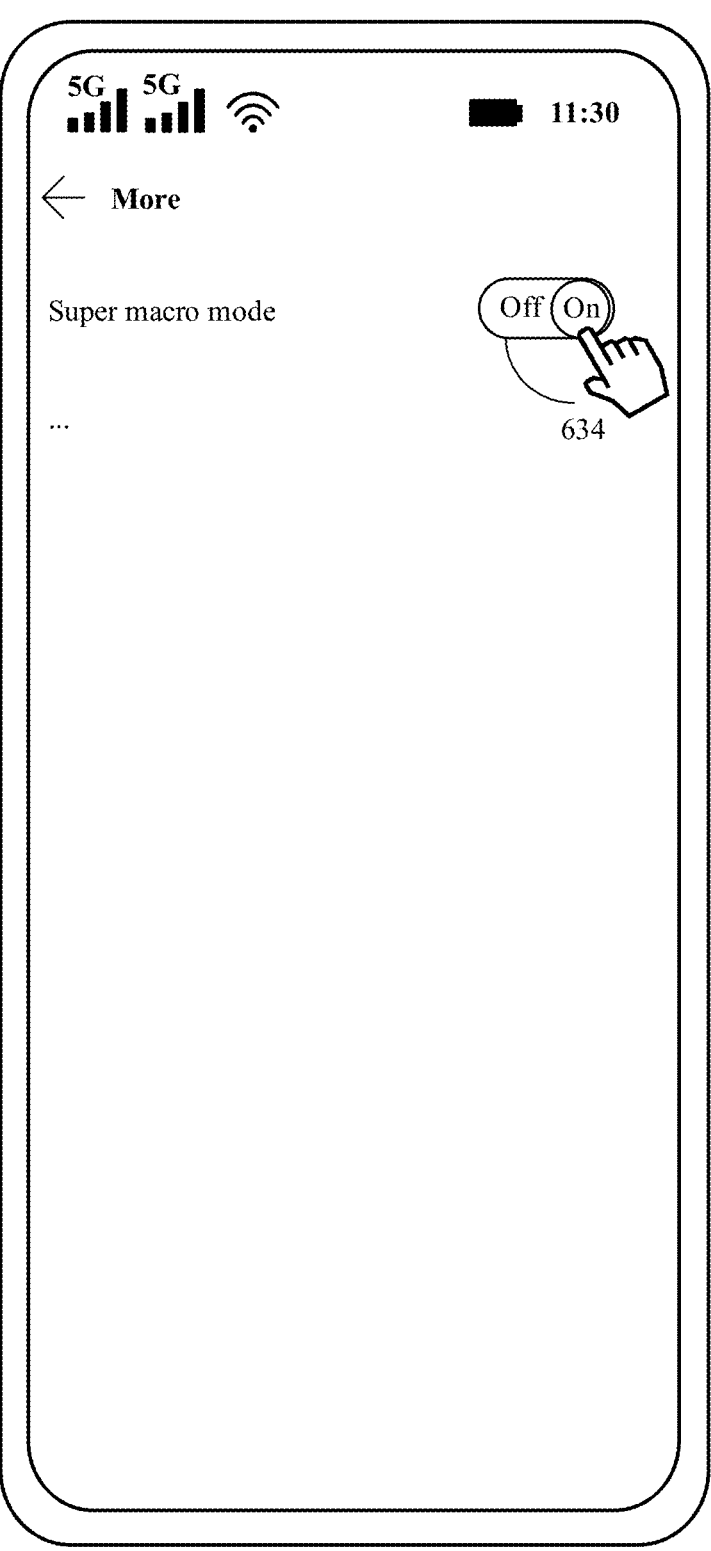
Figure 24F:
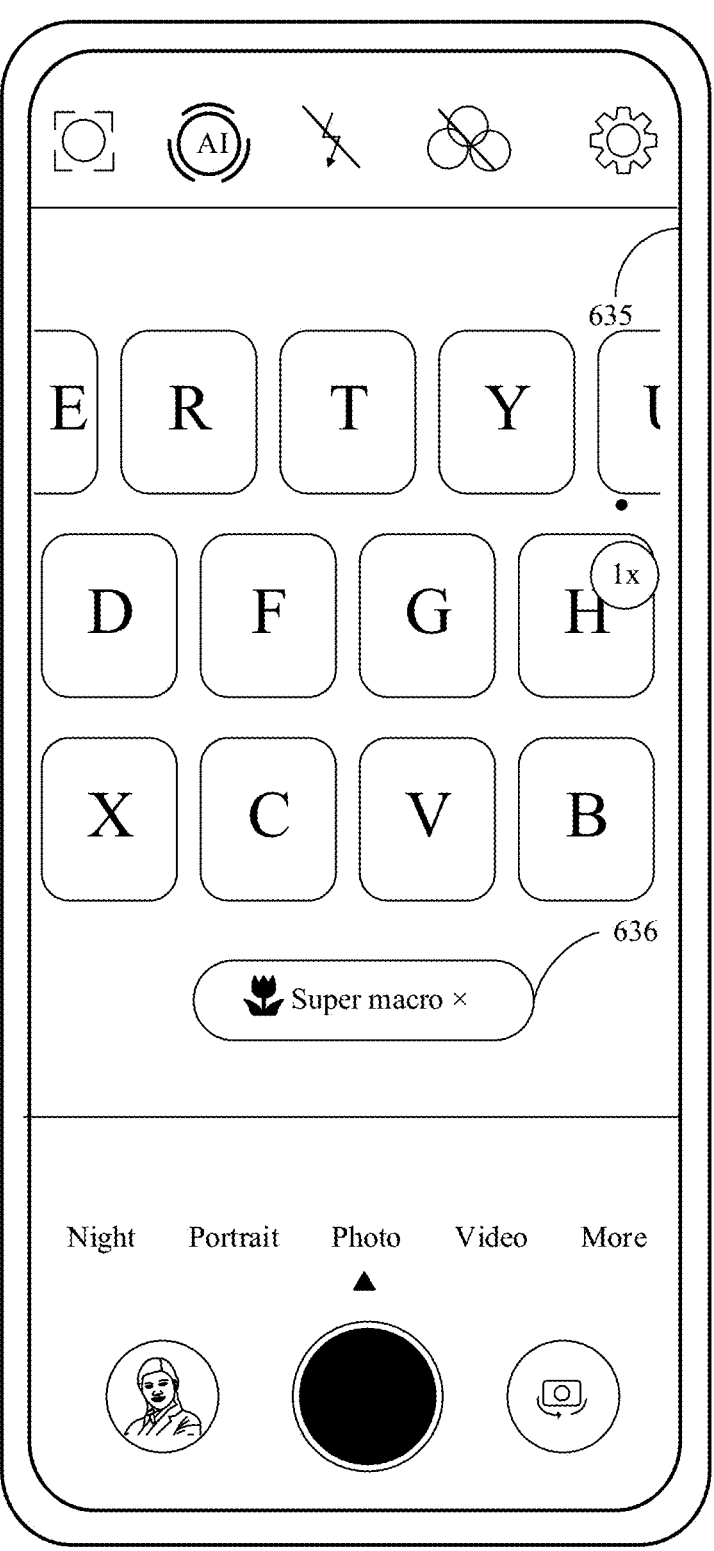

In an example, when the object distance 1 does not meet the first preset threshold, and/or the object distance 2 does not meet the second preset threshold, it may be determined whether to exit the super macro mode based on the brightness value of the photographing scene and the current zoom ratio of the electronic device, as shown in FIG. 19A and FIG. 19B.

FIG. 19A and FIG. 19B are schematic flowcharts of a method for switching cameras according to an embodiment of this application. The method may be performed by the electronic device shown in FIG. 9. The method 500 includes step S510 to step S554. Step S410 to step S554 are respectively described in detail below.

Step S510: Run a camera application.

Step S520: Determine whether an electronic device is in a super macro mode; if the electronic device is in the super macro mode, perform step S530; and if the electronic device is not in the super macro mode, perform step S550.

Step S530: Obtain data of an ultra wide-angle camera.

Step S531: Determine whether the ultra wide-angle camera includes an open loop motor; if the ultra wide-angle camera includes the open loop motor, perform step S532; and if the ultra wide-angle camera does not include the open loop motor, perform step S534.

Step S533: Obtain an object distance 2 between an electronic device and a to-be-photographed object based on a code value after compensation processing and a function relationship 1.

Step S534: When the ultra wide-angle camera does not include the open loop motor, obtain the object distance 2 between the electronic device and the to-be-photographed object based on the code value and the function relationship 1.

Step S535: Determine whether an object distance 1 meets a first preset threshold, and whether the object distance 2 meets a second preset threshold; if the object distance 1 meets the first preset threshold, and the object distance 2 meets the second preset threshold, perform step S536; and if the object distance 1 does not meet the first preset threshold, and the object distance 2 does not meet the second preset threshold, perform step S537.

Step S536: Exit the super macro mode.

Step S537: Determine whether a brightness parameter is less than or equal to a brightness threshold 1. If the brightness parameter is less than or equal to the brightness threshold 1, step 538 is performed; and if the brightness threshold is greater than the brightness threshold 1, step S539 is performed.

In embodiments of this application, when the electronic device is in the super macro mode, and when it is determined whether to exit the super macro mode, determining may be performed based on the brightness parameter of the photographing scene in which the electronic device is located; and if the brightness value of the photographing scene in which the electronic device is located is low, to be specific, the brightness parameter of the photographing scene is less than or equal to the brightness threshold 1, because a parameter of the ultra wide-angle camera is less accurate than a parameter of the wide-angle camera in the photographing scene in which brightness is low, the super macro mode may be directly exited.

Optionally, when the electronic device is in the super macro mode, the ultra wide-angle camera in the electronic device is used as the main camera. In this case, a brightness threshold 1 may be a brightness threshold corresponding to the ultra wide-angle camera.

Step S538: Exit a super macro mode.

For example, when the brightness parameter is less than or equal to the brightness threshold 1, the super macro mode is exited.

Step S539: Determine whether a zoom ratio changes; if the zoom ratio changes, perform step S540; and if the zoom ratio does not change, perform S541.

Optionally, when the electronic device runs the super macro mode, the zoom ratio is a first zoom ratio; a current zoom ratio of the electronic device is a second zoom ratio; if the second zoom ratio is different from the first zoom ratio, it represents that the zoom ratio of the electronic device changes, and step S540 is performed; and if the second zoom ratio is the same as the first zoom ratio, it represents that the zoom ratio of the electronic device does not change, and step S541 is performed.

Optionally, if the electronic device detects an operation of adjusting the zoom ratio, step S540 is performed; and if the electronic device does not detect the operation of adjusting the zoom ratio, step S541 is performed.

In embodiments of this application, when the electronic device runs the super macro mode, whether to exit the super macro mode may be determined based on the current zoom ratio of the electronic device, thereby further improving stability of the super macro mode.

Step S540: Exit a super macro mode.

Optionally, when the zoom ratio of the electronic device is greater than the 1-fold zoom ratio, the super macro mode may be exited.

For example, if the electronic device detects an operation performed by a user to adjust the zoom ratio (for example, adjusting the ratio to be greater than the 1-fold zoom ratio); and in response to the operation performed by the user, the electronic device may exit the super macro mode.

Step S541: Keep the super macro mode.

Step S550: Obtain data of a wide-angle camera.

Step S551: Obtain an object distance 1 between an electronic device and a to-be-photographed object based on a code value of a wide-angle camera and a function relationship 2.

Step S552: Determine whether a brightness parameter meets a brightness threshold 2, whether a zoom ratio is equal to a ratio 1, and whether the object distance 1 meets a third preset threshold; if yes, perform step S553; and if not, perform step S554.

It should be understood that because step S550 to step S562 are steps performed when the electronic device is not in the super macro mode, the brightness threshold 2 in step S562 is a brightness threshold related to the wide-angle camera.

Optionally, that the brightness parameter meets the brightness threshold 2 may mean that the brightness parameter is greater than the brightness threshold 2; and that the object distance 1 meets the third preset threshold may mean that the object distance 1 is less than or equal to the third preset threshold.

Optionally, the brightness parameter may include an illuminance value or a brightness value.

Optionally, in embodiments of this application, when the super macro mode is run, the illuminance value (for example, Lux index) may be obtained through the ultra wide-angle camera; and if the illuminance value is greater than the brightness threshold 2, it indicates that a photographing environment in which the electronic device is located is a low-light photographing environment.

It should be understood that generally, the greater the illumination value, the lower the brightness of the photographing environment.

Optionally, in embodiments of this application, a brightness value of the electronic device may be obtained; and if the brightness value is less than the brightness threshold 2, it indicates that a photographing environment in which the electronic device is located is a night view photographing environment.

For example, a specific calculation formula for the brightness value is as follows:

$$LV = 10 * \log_2\left(\frac{\text{Aperture}^2}{\text{Exposure}} * \frac{100}{\text{Iso}} * \frac{\text{Luma}}{46}\right),$$

Exposure is an exposure time period; Aperture is an aperture size; Iso is sensitivity; and Luma is an average value of Y in an XYZ color space of an image.

Step S553: Run the super macro mode.

For example, when the object distance 1 meets the third preset threshold, the super macro mode is run.

It should be understood that the super macro mode refers to a photographing mode in which the electronic device automatically switches to the ultra wide-angle camera and uses the ultra wide-angle camera as the main camera when the electronic device is between a 1-fold zoom ratio (1×) and a 2-fold zoom ratio (2×).

For example, when the electronic device does not detect an operation performed by the user, the electronic device may switch from the wide-angle camera that is used as the main camera to the ultra wide-angle camera and use the ultra wide-angle camera as the main camera; and in other words, the electronic device may automatically use the ultra wide-angle camera as the main camera without detecting any operation.

It should be understood that the electronic device may include a plurality of cameras; for example, the plurality of cameras may include the main camera and the auxiliary camera; when the electronic device collects an image, the image collected by the main camera is usually used as a benchmark, to perform processing on the image collected by the main camera; and in a process of processing, a part of image information collected by the auxiliary camera may be extracted to compensate for the image collected by the main camera, images collected by the two cameras may be fused, and a displayed image is obtained after processing, to implement functions such as improving shooting quality, background blur, optical zoom, and the like. For example, if the electronic device is in a single-camera mode when collecting the image, to be specific, the electronic device turns on one camera to collect the image, the camera is the main camera.

For example, if the electronic device is in a dual-camera mode when collecting the image, to be specific, the electronic device turns on two cameras to collect images, where one camera is the main camera and the other camera is the auxiliary camera; when the electronic device collects an image, the image collected by the main camera is usually used as a benchmark, to perform processing on the image collected by the main camera; and in a process of processing, a part of image information collected by the auxiliary camera may be extracted to compensate for the image collected by the main camera, images collected by the two cameras may be fused, and the displayed image is obtained after processing, to implement functions such as improving shooting quality, background blur, optical zoom, and the like.

For example, if the electronic device is in a multi-camera mode when collecting an image, for example, when the electronic device is in a three-camera mode when collecting an image, the electronic device may turn on three cameras when collecting an image; the three cameras include one main camera and two auxiliary cameras; when the electronic device collects an image, the image collected by the main camera is usually used as a benchmark, to perform processing on the image collected by the main camera; and in a process of processing, a part of image information collected by two auxiliary cameras may be extracted to compensate for the image collected by the main camera, images collected by the three cameras may be fused, and the displayed image is obtained after processing, to implement functions such as improving shooting quality, background blur, optical zoom, and the like.

Case 1

If the electronic device is in a single-camera mode, the electronic device may turn off the wide-angle camera; and turn on the ultra wide-angle camera, and use the ultra wide-angle camera as the main camera.

Case 2

If the electronic device is in a multi-camera mode (for example, including a dual-camera mode or a three-camera mode), the electronic device may use the ultra wide-angle camera as the main camera, and auxiliary cameras may be fully or partially turned on.

Optionally, after running the super macro mode, the electronic device may determine whether to exit the super macro mode based on step S430 to step S437 as shown in FIG. 15.

Optionally, it may be determined whether to run the super macro mode based on one frame of image; and for example, for one frame of image, if the brightness parameter is greater than the brightness threshold 2, a zoom ratio is a ratio 1, and the object distance 1 meets the third preset threshold, the electronic device switches the camera to run the super macro mode.

Optionally, to ensure stability of images collected by the electronic device, the electronic device may perform determining based on a plurality of frames of images before switching cameras; for example, it may be determined, for at least two consecutive frames of images, whether the object distance 1 meets the first preset threshold, and the object distance 2 meets the second preset threshold; and for at least two consecutive frames of images, if the object distance 1 meets the first preset threshold, and the object distance 2 meets the second preset threshold, the electronic device switches cameras to exit the super macro mode.

In embodiments of this application, when determining whether to run the super macro mode, the electronic device may further determine whether to run the super macro mode based on the brightness value of the photographing scene, a zoom ratio, and an object distance 1; in a dark photographing scene, accuracy of focus is low, to be specific, accuracy of the code value of the wide-angle camera is low. In this case, the electronic device may determine to skip running the super macro mode, thereby improving accuracy of running the super macro mode.

Step S554: Skip running the super macro mode.

Optionally, skipping running the super macro mode may include the electronic device continuing to run the current photographing mode and skipping entering the super macro mode.

In embodiments of this application, when the object distance 1 meets the first preset threshold, and the object distance 2 meets the second preset threshold, the electronic device switches to the wide-angle camera and uses the wide-angle camera as the main camera, and exits the super macro mode; because the object distance 2 is the object distance that is obtained based on the parameter of the ultra wide-angle camera, the object distance 1 is the object distance that is obtained based on the parameter of the wide-angle camera; Therefore, in embodiments of this application, when determining whether to exit the super macro mode, it is determined whether to switch cameras based on a double-restriction condition; and compared with an existing solution, which determines whether to switch cameras based only on the parameter of the wide-angle camera, the method for switching cameras provided in embodiments of this application is more accurate, to be specific, stability of a photographing mode in the electronic device is better.

In addition, when the object distance 1 does not meet the first preset threshold, and/or the object distance 2 does not meet the second preset threshold, the electronic device may determine whether to exit the super macro mode based on the brightness parameter of the photographing environment in which the electronic device is located; further, when the brightness parameter of the photographing scene does not meet a condition to exit the super macro mode, it may be determined whether to exit the super macro mode based on the zoom ratio; and the method for switching cameras provided in embodiments of this application is more accurate, to be specific, stability of a photographing mode in the electronic device is better.

It should be understood that step S510 to step S554 are described by using switching between the wide-angle camera and the ultra wide-angle camera as an example; and step S510 to step S554 may be further applied to switching between other types of cameras, and types of cameras are not limited in this application.

Optionally, step S510 to step S554 may be further applied to switching between the wide-angle camera and the telephoto camera. In other words, the method may also be applied to running a super long shot mode, exiting the super long shot mode, or maintaining the super long shot mode. This is not described herein again.

In an example, when a preset time point is reached, the electronic device may continue to perform a next determining procedure; and for example, the electronic device may include a timer. When the timer reaches a preset moment (for example, 30S), the electronic device may continue to perform step S402 and step S403, and perform a corresponding subsequent step based on a result of step S403.

It should be understood that step S401 to step S414 are described by using switching between the wide-angle camera and the ultra wide-angle camera as an example; and step S401 to step S414 may be further applied to switching between other types of cameras, and types of cameras are not limited in this application.

An example of a schematic diagram of an interface of an electronic device performing the method for switching cameras is used for description below according to an embodiment of this application with reference to FIG. 20 to FIG. 26.

In an example, as shown in FIG. 20A, FIG. 20B, FIG. 20C, and FIG. 20D, the display interface shown in (a) in FIG. 20A, FIG. 20B, FIG. 20C, and FIG. 20D may be a desktop 601 of the electronic device; after the electronic device detects that the user taps a control 602 of a camera application on the desktop 601, another display interface as shown in (b) in FIG. 20A, FIG. 20B, FIG. 20C, and FIG. 20D may be displayed; a display interface 603 shown in (b) in FIG. 20A, FIG. 20B, FIG. 20C, and FIG. 20D may be a display interface of the camera application, and the display interface 603 may include a smart control 604; the electronic device detects an operation on the smart control 604, as shown in (c) in FIG. 20A, FIG. 20B, FIG. 20C, and FIG. 20D; after detecting the operation on the smart control 604, the electronic device runs the super macro mode according to the method for switching cameras provided in embodiments of this application, exits the super macro mode, or keeps the super macro mode; for example, the electronic device is in a non-super macro mode based on obtaining the parameter of the wide-angle camera and the zoom ratio; after determining that a distance parameter and a zoom ratio meet a preset condition, the electronic device switches to the ultra wide-angle camera and uses the ultra wide-angle camera as the main camera. In other words, the electronic device enters the super macro mode, and displays the display interface 605 as shown in (d) in FIG. 20A, FIG. 20B, FIG. 20C, and FIG. 20D. The display interface 605 may include a control 606 indicating a photographing mode. The current photographing mode is the super macro mode, as shown in (d) in FIG. 20A, FIG. 20B, FIG. 20C, and FIG. 20D; if it is detected that the user taps "×" in "super macro ×", the electronic device may turn off the super macro mode; and optionally, after turning off the super macro mode, the electronic device may no longer push the super macro mode on the preview display interface.

For example, with reference to (c) in FIG. 20A, FIG. 20B, FIG. 20C, and FIG. 20D and (d) in FIG. 20A, FIG. 20B, FIG. 20C, and FIG. 20D, it may be learnt that a field of view of the electronic device in the super macro mode is greater than a field of view of the electronic device in the non-super macro mode.

Optionally, after detecting an operation indicating to take pictures, the electronic device uses the camera that is currently turned on as a camera to collect images; and as shown in (d) in FIG. 20A, FIG. 20B, FIG. 20C, and FIG. 20D, when the photographing mode of the electronic device is the super macro mode, the electronic device collects images by using the ultra wide-angle camera as the main camera.

It should be understood that as shown in the display interface shown in (d) in FIG. 20A, FIG. 20B, FIG. 20C, and FIG. 20D, when the electronic device is in the super macro mode, the displayed zoom ratio may be a 1-fold zoom ratio (1×), and the ultra wide-angle camera is used as the main camera to collect images; and in this case, an actual zoom value of the camera application may be 0.99×, or 0.98×, or another zoom ratio value less than 1×.

Optionally, the actual zoom value of the camera application may be obtained by adjusting based on a unit scale of a zoom indicator axis of the camera application; for example, if a unit scale of the zoom axis is 0.01×, the actual zoom value in this case may be 0.99×; and if a unit scale of the zoom axis is 0.02×, the actual zoom value in this case may be 0.98×.

Optionally, the control 606 indicating the super macro mode may not be displayed on the display interface shown in (d) in FIG. 20A, FIG. 20B, FIG. 20C, and FIG. 20D; and this is not limited in this application.

In an example, as shown in FIG. 21A, FIG. 21B, FIG. 21C, FIG. 21D, FIG. 21E, and FIG. 21F, the display interface shown in (a) in FIG. 21A, FIG. 21B, FIG. 21C, FIG. 21D, FIG. 21E, and FIG. 21F may be a desktop 607 of the electronic device; after the electronic device detects that the user taps a control 608 of a camera application on the desktop 607, another display interface as shown in (b) in FIG. 21A, FIG. 21B, FIG. 21C, FIG. 21D, FIG. 21E, and FIG. 21F may be displayed; a display interface 609 shown in (b) in FIG. 21A, FIG. 21B, FIG. 21C, FIG. 21D, FIG. 21E, and FIG. 21F may be a display interface of the camera application, and the display interface 609 may include a setting control 610; the electronic device detects an operation on the setting control 610, as shown in (c) in FIG. 21A, FIG. 21B, FIG. 21C, FIG. 21D, FIG. 21E, and FIG. 21F; after detecting the operation on the setting control 610, the electronic device may display a setting display interface. The setting display interface includes a control 611 indicating to turn on automatic camera switching, as shown in (d) in FIG. 21A, FIG. 21B, FIG. 21C, FIG. 21D, FIG. 21E, and FIG. 21F; the electronic device detects an operation on the control 611, as shown in (e) in FIG. 21A, FIG. 21B, FIG. 21C, FIG. 21D, FIG. 21E, and FIG. 21F; after detecting the operation on the control 611, the electronic device performs the method for switching cameras provided in embodiments of this application, runs the super macro mode, exits the super macro mode, or keeps the super macro mode; for example, the electronic device enters the super macro mode, and displays the display interface 612 as shown in (f) in FIG. 21A, FIG. 21B, FIG. 21C, FIG. 21D, FIG. 21E, and FIG. 21F, the display interface 612 may include an icon 613 indicating the photographing mode, and the current photographing mode is the super macro mode; if it is detected that the user taps "×" in "super macro ×", the electronic device may turn off the super macro mode; and optionally, after turning off the super macro mode, the electronic device may no longer push the super macro mode on the preview display interface. Optionally, the related descriptions in FIG. 20A, FIG. 20B, FIG. 20C, and FIG. 20D are also applicable to FIG. 21A, FIG. 21B, FIG. 21C, FIG. 21D, FIG. 21E, and FIG. 21F and will not be described herein again.

In an example, super macro may be turned on through one separate control on a display interface in the camera application, as shown in FIG. 22A, FIG. 22B, FIG. 22C, and FIG. 22D; the display interface shown in (a) in FIG. 22A, FIG. 22B, FIG. 22C, and FIG. 22D may be a desktop 614 of the electronic device; after detecting that the user taps an icon 615 of a camera application on the desktop 614, the electronic device may display another display interface 616 as shown in (b) in FIG. 22A, FIG. 22B, FIG. 22C, and FIG. 22D; a display interface 616 shown in (b) in FIG. 22A, FIG. 22B, FIG. 22C, and FIG. 22D may be a display interface of the camera application, and the display interface 616 may include a control 617; as shown in (c) in FIG. 22A, FIG. 22B, FIG. 22C, and FIG. 22D, after detecting an operation on the setting control 617, the electronic device performs the method for switching cameras provided in embodiments of this application; for example, the electronic device is in a non-super macro mode based on obtaining a distance parameter and a zoom ratio of the camera module; after determining that a distance parameter and a zoom ratio meet a first preset condition, the electronic device switches to the ultra wide-angle camera and uses the ultra wide-angle camera as the main camera. In other words, the electronic device enters the super macro mode, and displays the display interface 618 as shown in (d) in FIG. 22A, FIG. 22B, FIG. 22C, and FIG. 22D. The display interface 618 may include an icon 619 indicating the photographing mode. The current photographing mode is the super macro mode; if it is detected that the user taps "×" in "super macro ×", the electronic device may turn off the super macro mode; and optionally, after turning off the super macro mode, the electronic device may no longer push the super macro mode on the preview display interface. Optionally, the related descriptions in FIG. 20A, FIG. 20B, FIG. 20C, and FIG. 20D are also applicable to FIG. 22A, FIG. 22B, FIG. 22C, and FIG. 22D and will not be described herein again.

It should be understood that a difference between the display interface shown in FIG. 22A, FIG. 22B, FIG. 22C, and FIG. 22D and the display interface shown in FIG. 20A, FIG. 20B, FIG. 20C, and FIG. 20D is that in FIG. 20A, FIG. 20B, FIG. 20C, and FIG. 20D, the smart control 604 is configured to indicate to turn on/off automatic camera switching; and in FIG. 22A, FIG. 22B, FIG. 22C, and FIG. 22D, automatic camera switching is turned on/off through a control independent of the smart control.

In an example, as shown in FIG. 23A, FIG. 23B, FIG. 23C, FIG. 23D, FIG. 23E, FIG. 23F, FIG. 23G, and FIG. 23H the user may indicate to turn on automatic camera switching on a setting display interface of the electronic device, thereby causing the electronic device to perform the method for switching cameras provided in embodiments of this application.

For example, the display interface shown in (a) in FIG. 23A, FIG. 23B, FIG. 23C, FIG. 23D, FIG. 23E, FIG. 23F, FIG. 23G, and FIG. 23H may be a desktop 620 of the electronic device; after the electronic device detects that the user taps an icon 621 set on the desktop 620, another display interface as shown in (b) in FIG. 23A, FIG. 23B, FIG. 23C, FIG. 23D, FIG. 23E, FIG. 23F, FIG. 23G, and FIG. 23H may be displayed; the display interface shown in (b) in FIG. 23A, FIG. 23B, FIG. 23C, FIG. 23D, FIG. 23E, FIG. 23F, FIG. 23G, and FIG. 23H may be the setting display interface, and the setting display interface may include options such as a wireless network, Bluetooth, or a camera; as shown in (c) in FIG. 23A, FIG. 23B, FIG. 23C, FIG. 23D, FIG. 23E, FIG. 23F, FIG. 23G, and FIG. 23H, the electronic device detects tapping a camera option, and enters a setting interface of the camera, which displays what is shown in (d) in FIG. 23A, FIG. 23B, FIG. 23C, FIG. 23D, FIG. 23E, FIG. 23F, FIG. 23G, and FIG. 23H; the camera setting interface may include a control 622 for automatically switching cameras; as shown in (c) in FIG. 23A, FIG. 23B, FIG. 23C, FIG. 23D, FIG. 23E, FIG. 23F, FIG. 23G, and FIG. 23H, after detecting an operation on the control 622, the electronic device may perform the method for switching cameras provided in embodiments of this application; as shown in (f) in FIG. 23A, FIG. 23B, FIG. 23C, FIG. 23D, FIG. 23E, FIG. 23F, FIG. 23G, and FIG. 23H, the electronic device detects that the user taps an icon 625 of the camera application on the desktop 620, to enter the camera application; after entering the camera application, another display interface 626 as shown in (g) in FIG. 23A, FIG. 23B, FIG. 23C, FIG. 23D, FIG. 23E, FIG. 23F, FIG. 23G, and FIG. 23H may be displayed, and in this case, the electronic device may be in the non-super macro mode; the electronic device may obtain a distance parameter and a zoom ratio of the camera module;

after determining that the distance parameter and the zoom ratio meet a first preset condition, the electronic device switches to the ultra wide-angle camera and uses the ultra wide-angle camera as the main camera. In other words, the electronic device enters the super macro mode, and displays the display interface 627 as shown in (h) in FIG. 23A, FIG. 23B, FIG. 23C, FIG. 23D, FIG. 23E, FIG. 23F, FIG. 23G, and FIG. 23H. The display interface 627 may include an icon 628 indicating the photographing mode. The current photographing mode is the super macro mode; if it is detected that the user taps "×" in "super macro ×", the electronic device may turn off the super macro mode; and Optionally, after turning off the super macro mode, the electronic device may no longer push the super macro mode on the preview display interface.

Optionally, the related descriptions in FIG. 20A, FIG. 20B, FIG. 20C, and FIG. 20D are also applicable to FIG. 23A, FIG. 23B, FIG. 23C, FIG. 23D, FIG. 23E, FIG. 23F, FIG. 23G, and FIG. 23H and will not be described herein again.

Optionally, after entering the display interface of the camera application, the electronic device may also directly display the display interface as shown in (h) in FIG. 23A, FIG. 23B, FIG. 23C, FIG. 23D, FIG. 23E, FIG. 23F, FIG. 23G, and FIG. 23H; and in other words, the electronic device may directly display the display interface shown in (f) in FIG. 23A, FIG. 23B, FIG. 23C, FIG. 23D, FIG. 23E, FIG. 23F, FIG. 23G, and FIG. 23H to the display interface shown in (h) in FIG. 23A, FIG. 23B, FIG. 23C, FIG. 23D, FIG. 23E, FIG. 23F, FIG. 23G, and FIG. 23H.

In an example, a control for more options is included in the camera application; the control for the super macro module is included in the control for more options; and when the electronic device detects the control for turning on the super macro mode, the electronic device may directly run the super macro mode.

For example, as shown in FIG. 24A, FIG. 24B, FIG. 24C, FIG. 24D, FIG. 24E, and FIG. 24F, the display interface shown in (a) in FIG. 24A, FIG. 24B, FIG. 24C, FIG. 24D, FIG. 24E, and FIG. 24F may be a desktop 630 of the electronic device; after the electronic device detects that the user taps a control 631 of a camera application on the desktop 630, another display interface as shown in (b) in FIG. 24A, FIG. 24B, FIG. 24C, FIG. 24D, FIG. 24E, and FIG. 24F may be displayed; a display interface 632 shown in (b) in FIG. 24A, FIG. 24B, FIG. 24C, FIG. 24D, FIG. 24E, and FIG. 24F may be a display interface of the camera application, and the display interface 632 may include a control 633 for more options; the electronic device detects an operation on the control 633 for more options, as shown in (c) in FIG. 24A, FIG. 24B, FIG. 24C, FIG. 24D, FIG. 24E, and FIG. 24F; after detecting the operation on the control 633 for more options, the electronic device may display an interface with more options. The interface with more options includes a control 634 that indicates to turn on the super macro mode, as shown in (d) in FIG. 24A, FIG. 24B, FIG. 24C, FIG. 24D, FIG. 24E, and FIG. 24F; the electronic device detects an operation on the control 634, as shown in (e) in FIG. 24A, FIG. 24B, FIG. 24C, FIG. 24D, FIG. 24E, and FIG. 24F; after the electronic device detects the operation on the control 634, the electronic device may directly run a super macro model, and display the display interface 635 as shown in (f) in FIG. 24A, FIG. 24B, FIG. 24C, FIG. 24D, FIG. 24E, and FIG. 24F, the display interface 635 may include an icon 636 that indicates the photographing mode, and the current photographing mode is the super macro mode; if it is detected that the user taps "×" in "super macro x", the electronic device may turn off the super macro mode; and Optionally, after turning off the super macro mode, the electronic device may no longer push the super macro mode on the preview display interface. Optionally, the related descriptions in FIG. 24A, FIG. 24B, FIG. 24C, FIG. 24D, FIG. 24E, and FIG. 24F are also applicable to FIG. 20A, FIG. 20B, FIG. 20C, and FIG. 20D and will not be described herein again.

Figure 25A:
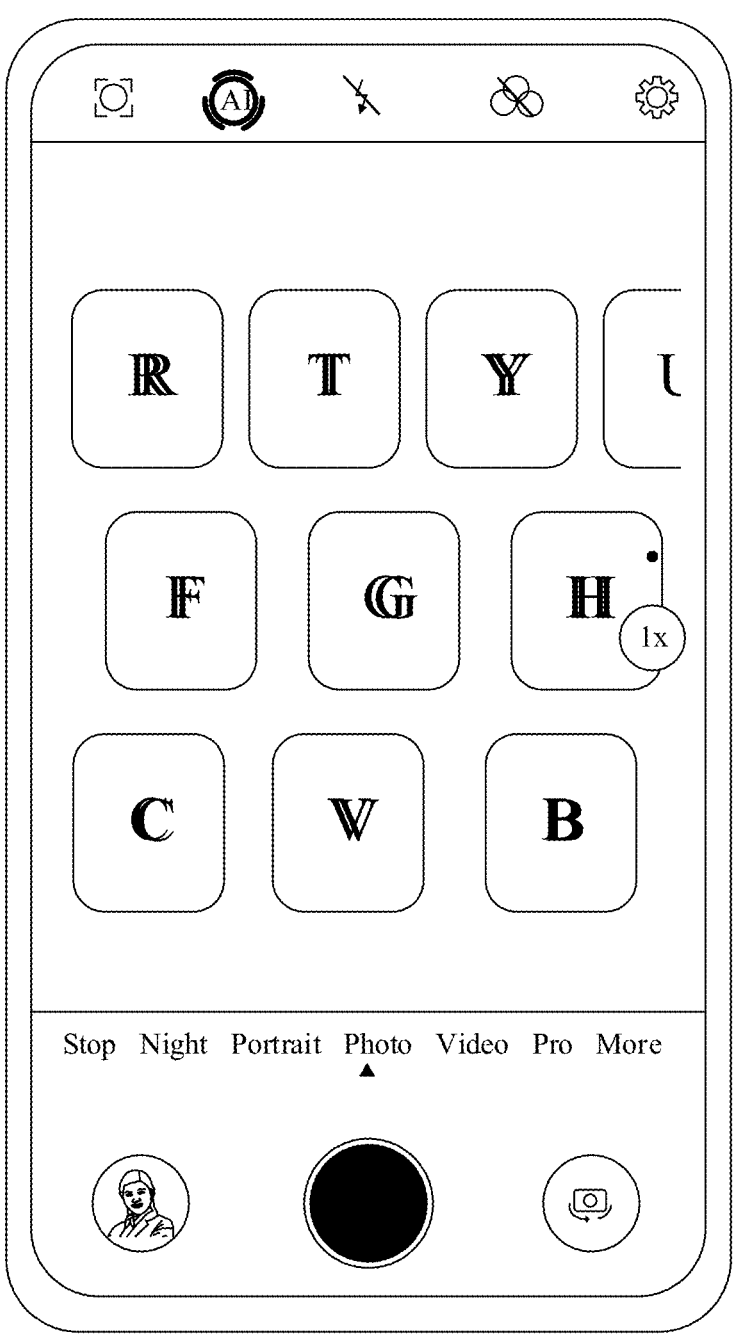
FIG. 25A and FIG. 25B are schematic diagrams of a preview interface of a camera application according to an embodiment of this application.
Figure 25B:
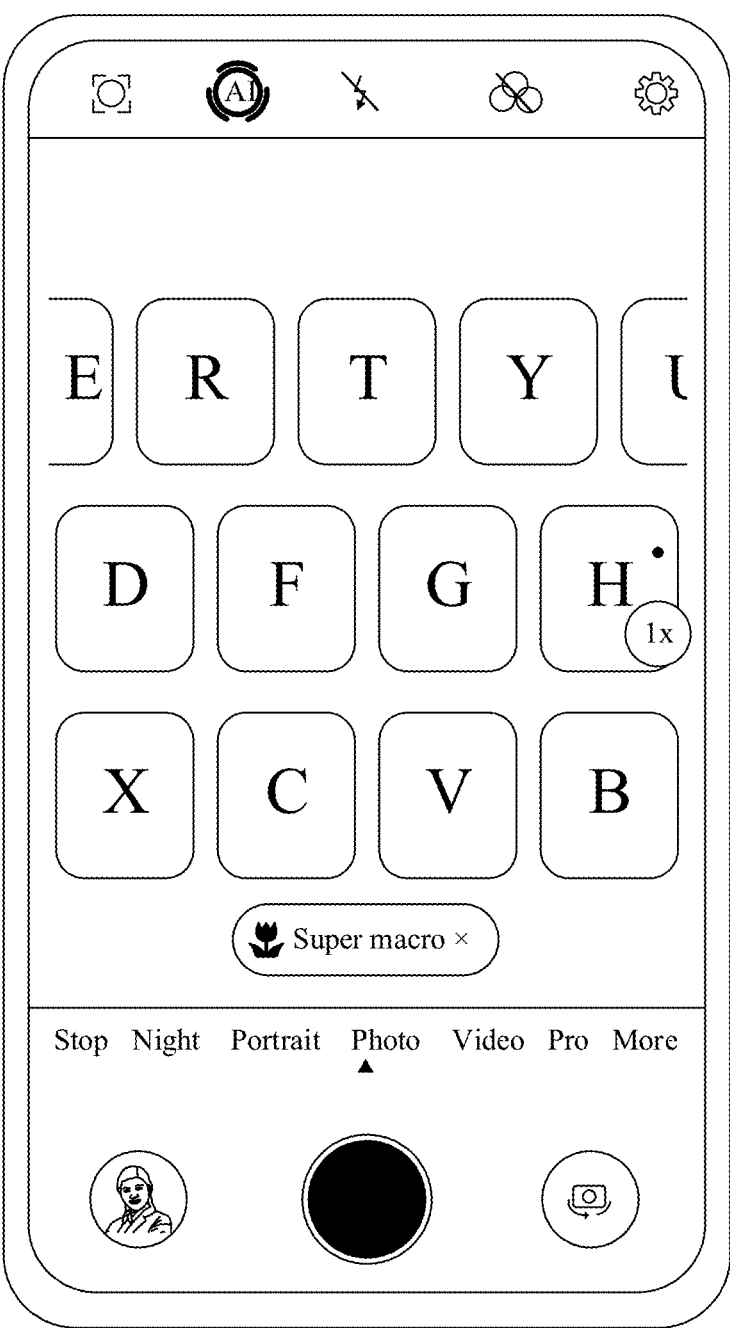

FIG. 25A and FIG. 25B are schematic diagrams of a preview interface of a camera application according to an embodiment of this application.

For example, when the electronic device is in a short-distance photographing scene, (a) in FIG. 25A and FIG. 25B shows a preview image that is collected by using a wide-angle camera as a main camera; (b) in FIG. 25A and FIG. 25B is a preview image that is collected by the electronic device in a super macro mode, namely, a preview image that is collected by the electronic device by using an ultra wide-angle camera as the main camera; and with reference to (a) in FIG. 25A and FIG. 25B and (b) in FIG. 25A and FIG. 25B, it may be learnt that in a short-distance photographing scene, when the electronic device collects images by using the ultra wide-angle camera as the main camera, both clarity of the image and a field of view of the electronic device are improved.

Figure 26A:
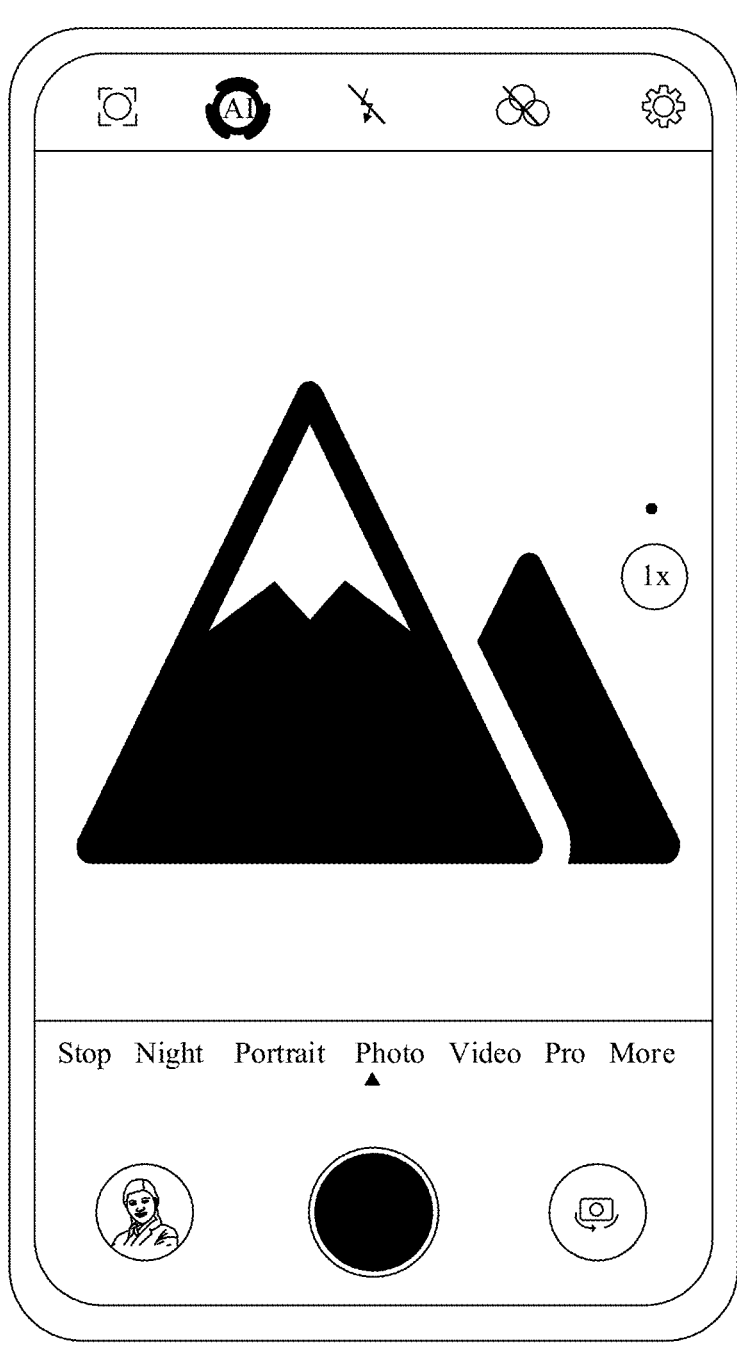
FIG. 26 is a schematic diagram of a preview interface of a camera application according to an embodiment of this application.
Figure 26B:
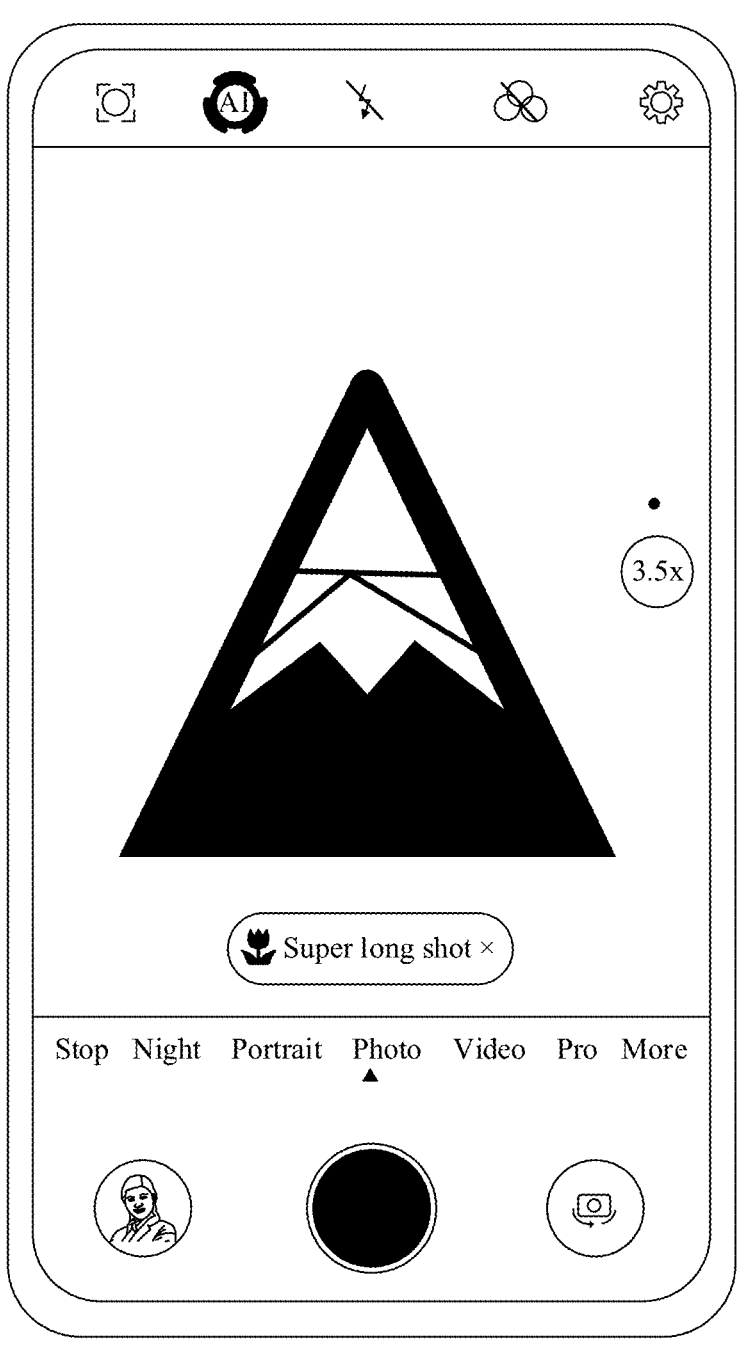

FIG. 26A and FIG. 26B are schematic diagrams of a preview interface of a camera application according to an embodiment of this application.

For example, when an electronic device is in a long-distance photographing scene, (a) in FIG. 26A and FIG. 26B shows a preview image that is collected by using a wide-angle camera as a main camera; (b) in FIG. 26A and FIG. 26B shows a preview image collected by an electronic device in a super long shot mode, namely, a preview image that is collected by the electronic device by using a telephoto camera as the main camera; and with reference to the preview image shown in (a) in FIG. 26A and FIG. 26B and the preview image shown in (b) in FIG. 26A and FIG. 26B, it may be learnt that in a long-distance photographing scene, when the electronic device collects images by using the telephoto camera as the main camera, detailed information of the images is improved.

It should be understood that the foregoing examples are provided to help a person skilled in the art understand embodiments of this application, but are not intended to limit embodiments of this application to specific numerical values or specific scenes illustrated. A person skilled in the art may obviously perform various equivalent modifications or changes based on the foregoing examples, and such modifications or changes also fall within the scope of embodiments of this application.

The method for switching cameras provided in embodiments of this application is described in detail above with reference to FIG. 1A and FIG. 1B to FIG. 26A and FIG. 26B; and the apparatus embodiment of this application will be described in detail below with reference to FIG. 27 and FIG. 28. It should be understood that the apparatus in embodiments of this application may perform various methods in embodiments of this application. In other words, for a specific operating process of the following various products, refer to corresponding processes in the method embodiments.

Figure 27:
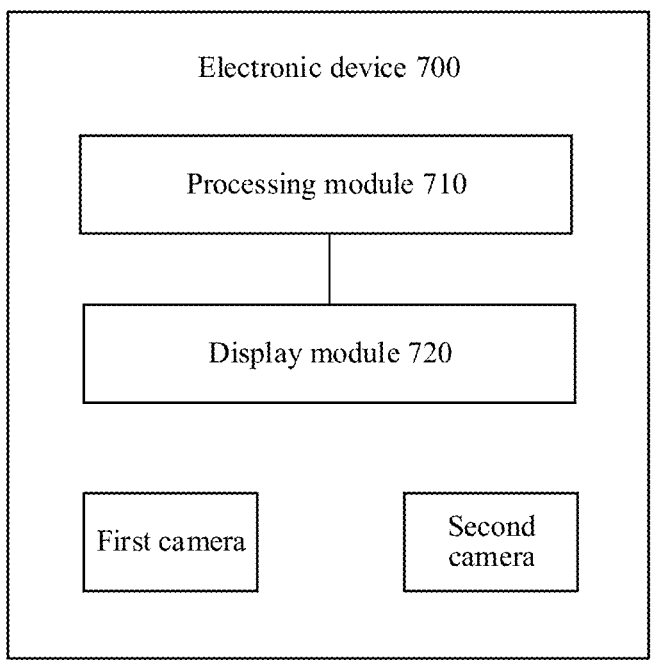
FIG. 27 is a schematic diagram of a structure of an electronic device according to an embodiment of this application.

FIG. 27 is a schematic structural diagram of an electronic device according to an embodiment of this application. The electronic device 700 includes a processing module 710, a display module 720, a first camera, and a second camera.

The processing module 710 is configured to run a camera application in the electronic device; the display module 720 is configured to display a first image, where the first image is obtained by collecting an image by using the first camera as a main camera; the processing module 710 is further configured to determine whether a first distance and a second distance meet a first preset condition, where the first distance and the second distance indicate an object distance between the electronic device and a to-be-photographed object, the first distance is an object distance that is obtained based on a parameter of the first camera, and the second distance is an object distance that is obtained based on a parameter of the second camera; and the display module 720 is further configured to display a second image when the first distance and the second distance meet the first preset condition, where the second image is obtained by collecting an image by using the second camera as the main camera.

Optionally, as an embodiment, the processing module 710 is further configured to:

determine that the first distance is greater than a first preset threshold, and the second distance is greater than a second preset threshold, where the first preset threshold is different from the second preset threshold.

Optionally, as an embodiment, the first preset threshold is a preset threshold that is obtained based on a first distance range, and the first distance range is used to represent an effective distance range for focusing by the first camera.

Optionally, as an embodiment, the second preset threshold is a preset threshold that is obtained based on a second distance range, and the second distance range is used to represent an effective distance range for focusing by the second camera.

Optionally, as an embodiment, the processing module 710 is further configured to:

determine whether a brightness parameter of a photographing scene in which the electronic device is located is less than or equal to a first brightness threshold when the first distance and/or the second distance do not meet the first preset condition; and display the second image when the brightness parameter is less than or equal to the first brightness threshold.

Optionally, as an embodiment, the first brightness threshold is a preset threshold obtained based on a first brightness range, and the first brightness range is used to represent an effective brightness range in which the first camera performs focusing.

Optionally, as an embodiment, a zoom ratio corresponding to a case that the electronic device displays the first image is a first zoom ratio, a current zoom ratio of the electronic device is a second zoom ratio, and the processing module 710 is further configured to:

determine whether the second zoom ratio is the same as the first zoom ratio when the brightness parameter is greater than the first brightness threshold; and display the second image when the second zoom ratio is different from the first zoom ratio.

Optionally, as an embodiment, the display module 720 is further configured to display the first image when a brightness parameter of a photographing environment in which the electronic device is located is greater than a second brightness threshold, and the second distance is less than or equal to a third preset threshold.

Optionally, as an embodiment, the second brightness threshold is a preset threshold that is obtained based on a second brightness range, and the second brightness range is used to represent an effective brightness range in which the second camera performs focusing.

Optionally, as an embodiment, when the first camera includes an open loop motor, the processing module 710 is further configured to:

obtain the parameter of the first camera;

perform compensation processing on the parameter of the first camera based on a calibration value of the first camera, to obtain a processed parameter; and obtain the first distance based on the processed parameter.

Optionally, as an embodiment, the display module 720 is further configured to:

display the first image when the electronic device is in a super macro mode.

Optionally, as an embodiment, the display module 720 is further configured to:

display the first image on a first display interface of the electronic device, where the first display interface further includes a first icon, and the first icon indicates the super macro mode.

Optionally, as an embodiment, the first icon includes a first control, and the processing module 710 is further configured to:

detect a first operation on the first control; and exit, by the electronic device, the super macro mode in response to the first operation.

Optionally, as an embodiment, the display module 720 is further configured to display the second image when the electronic device exits the super macro mode.

Optionally, as an embodiment, the first camera includes an ultra wide-angle camera or a telephoto camera, and/or the second camera includes a wide-angle camera.

Optionally, as an embodiment, the electronic device is at a same position when the electronic device displays the first image and the second image.

Optionally, as an embodiment, the first image includes a first to-be-photographed object, the second image includes a second to-be-photographed object, the first to-be-photographed object and the second to-be-photographed object are at a same position, a distance between the first to-be-photographed object and the electronic device is a third distance, a distance between the second to-be-photographed object and the electronic device is a fourth distance, and the third distance is less than the fourth distance.

Optionally, as an embodiment, the first image and the second image include a third to-be-photographed object, and the third to-be-photographed object is at a same position when the first image and the second image are displayed; a distance between the third to-be-photographed object and the electronic device is a fifth distance when the first image is collected; and a distance between the third to-be-photographed object and the electronic device is a sixth distance when the second image is collected, and the fifth distance is less than the sixth distance.

It should be noted that the electronic device 700 is embodied in the form of a functional module. The term "module" may be implemented in the form of software and/or hardware, and is not specifically limited.

For example, the "module" may be a software program, a hardware circuit, or a combination of the two that implements the foregoing functions. The hardware circuit may include an application specific integrated circuit (application specific integrated circuit, ASIC), an electronic circuit, a processor (such as shared processor, a dedicated processor, or a group processor) and a memory that are configured to execute one or more software or firmware programs, a merged logic circuit, and/or other suitable components to support the described function.

Therefore, the units of each example described in embodiments of this application may be implemented by electronic hardware, or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

Figure 28:
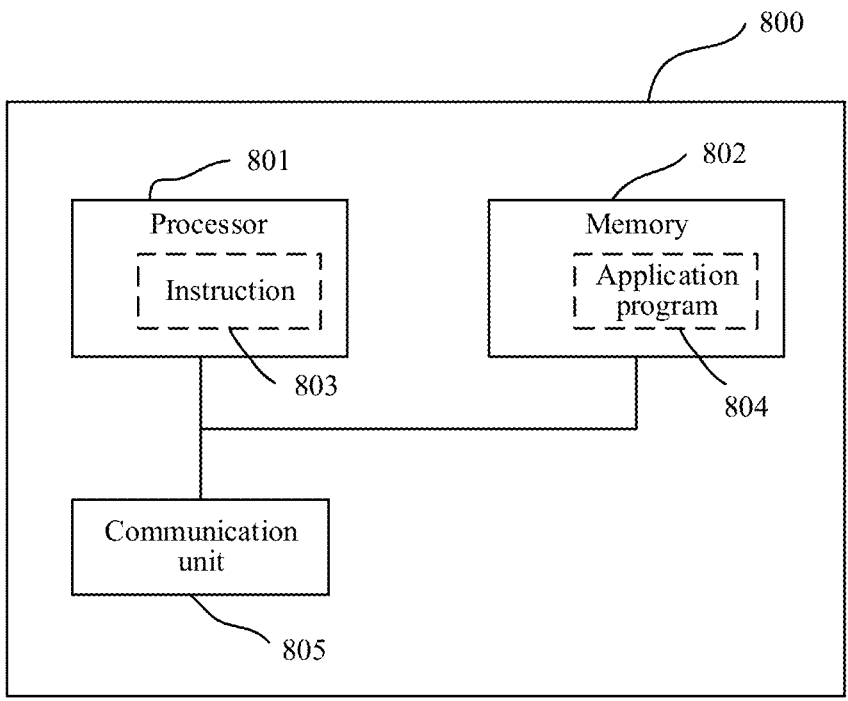
FIG. 28 is a schematic diagram of a structure of an electronic device according to an embodiment of this application.

FIG. 28 is a schematic diagram of a structure of an electronic device according to this application. A dotted line in FIG. 28 indicates that the unit or the module is optional; and the electronic device 800 may be configured to implement the method described in the foregoing method embodiments.

The electronic device 800 includes one or more processors 801, and the one or more processors 801 may support the electronic device 800 to implement the method for switching cameras in the method embodiments. The processor 801 may be a general-purpose processor, a dedicated processor, or the like. For example, the processor 801 may be a central processing unit (central processing unit, CPU), a digital signal processor (digital signal processor, DSP), an application specific integrated circuit (application specific integrated circuit, ASIC), a field programmable gate array (field programmable gate array, FPGA), or another programmable logic device, discrete gate or transistor logic device, discrete hardware component, or the like.

The processor 801 may be configured to control the electronic device 800, execute a software program, process data of the software program, and the like. The electronic device 800 may further include a communication unit 805, configured to implement input (receiving) and output (sending) of signals.

For example, the electronic device 800 may be a chip, and the communication unit 805 may be an input and/or output circuit of the chip, or the communication unit 805 may be a communication interface of the chip. The chip may be used as a component of a terminal device or another electronic device.

For another example, the electronic device 800 may be a terminal device, and the communication unit 805 may be a transceiver of the terminal device, or the communication unit 805 may be a transceiver circuit of the terminal device.

The electronic device 800 may include one or more memories 802, storing a program 804. The program 804 may be run by the processor 801, to generate an instruction 803, causing the processor 801 to perform the method for switching cameras in the method embodiment based on the instruction 803.

Optionally, the memory 802 may further store data.

Optionally, the processor 801 may further read the data stored in the memory 802. The data and the program 804 may be stored at the same storage address, or the data and the program 804 may be stored at different storage addresses.

The processor 801 and the memory 802 may be separately arranged or jointly integrated, for example, on a system on chip (system on chip, SOC) of the terminal device.

For example, the memory 802 may be configured to store related programs 804 of the method for switching cameras provided in embodiments of this application. The processor 801 may be configured to invoke the related program 804 of the method for switching cameras stored in the memory 802 when performing the method for switching cameras, and perform the method for switching cameras according to embodiments of this application; for example, run a camera application in the electronic device; display a first image, where the first image is obtained by collecting an image by using the first camera as a main camera; determine whether a first distance and a second distance meet a first preset condition, where the first distance and the second distance indicate an object distance between the electronic device and a to-be-photographed object, the first distance is an object distance that is obtained based on a parameter of the first camera, and the second distance is an object distance that is obtained based on a parameter of the second camera; and display a second image when the first distance and the second distance meet the first preset condition, where the second image is obtained by collecting an image by using the second camera as the main camera.

This application further provides a computer program product. When the computer program product is performed by the processor 801, the method for switching cameras of any method embodiment in this application is implemented.

The computer program product may be stored in a memory 802, such as a program 804. The program 804 is finally converted into an executable target file that may be performed by the processor 801 through processing processes such as preprocessing, compilation, assembly, and linking.

This application further provides a computer-readable storage medium. The computer-readable medium stores a computer program. When the computer program is executed by the computer, the method for switching cameras described in any method embodiment of this application is implemented. The computer program may be a high-level language program or an executable object program.

The computer-readable storage medium is, for example, a memory 802. The memory 802 may be a volatile memory or a non-volatile memory, or the memory 802 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described embodiments of the electronic device are merely examples. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, each functional unit in embodiments of this application may be integrated into one processing unit, or each of the units may exist alone physically, or two or more units are integrated into one unit.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, a protection scope of this application should be subject to a protection scope of the claims. In short, the foregoing descriptions are merely example embodiments of this application and are not intended to limit the protection scope of this application. Any modification, equivalent replacement, or improvement made without departing from the spirit and principle of this application shall fall within the protection scope of this application.

What is claimed is:

1. A method for switching cameras, applicable to an electronic device, wherein the electronic device comprises a camera module, the camera module comprises a first camera and a second camera, and the method comprises:

starting a camera application in the electronic device;

displaying a first image, wherein the first image is an image collected by the first camera;

obtaining a first distance based on a parameter of the first camera, and obtaining a second distance based on a parameter of the second camera, wherein the first distance and the second distance indicate an object distance between the electronic device and a to-be-photographed object; and displaying a second image when the first distance is greater than a first preset threshold, and the second distance is greater than a second preset threshold, wherein the second image is an image collected by the second camera;

the first preset threshold is different from the second preset threshold;

the first preset threshold is a threshold obtained based on a focus parameter of the first camera;

the second preset threshold is a threshold obtained based on a focus parameter of the second camera;

the focus parameter of the first camera is a focus distance range [X1, X2], and the first preset threshold is greater than or equal to X1; and the focus parameter of the second camera is a focus distance range [X3, X4], and the second preset threshold is greater than or equal to X3.

2. The method according to claim 1, further comprising:

determining whether a brightness parameter of a photographing scene in which the electronic device is located is less than or equal to a first brightness threshold when the first distance is less than or equal to the first preset threshold, and/or the second distance is less than or equal to the second preset threshold; and displaying the second image when the brightness parameter is less than or equal to the first brightness threshold, wherein the first brightness threshold is a preset threshold obtained based on a first brightness range, and the first brightness range is used to represent an effective brightness range in which the first camera performs focusing.

3. The method according to claim 2, wherein a zoom ratio corresponding to a case that the electronic device displays the first image is a first zoom ratio, a current zoom ratio of the electronic device is a second zoom ratio, and the method further comprises:

determining whether the second zoom ratio is the same as the first zoom ratio when the brightness parameter is greater than the first brightness threshold; and displaying the second image when the second zoom ratio is different from the first zoom ratio.

4. The method according to claim 1, wherein the displaying a first image comprises:

displaying the first image when a brightness parameter of a photographing environment in which the electronic device is located is greater than a second brightness threshold, and the second distance is less than or equal to a third preset threshold.

5. The method according to claim 4, wherein the second brightness threshold is a preset threshold that is obtained based on a second brightness range, and the second brightness range is used to represent an effective brightness range in which the second camera performs focusing.

6. The method according to claim 1, wherein when the first camera comprises an open loop motor, the method further comprises:

obtaining the parameter of the first camera;

performing compensation processing on the parameter of the first camera based on a calibration value of the first camera, to obtain a processed parameter; and obtaining the first distance based on the processed parameter.

7. The method according to claim 1, wherein the displaying a first image comprises:

displaying the first image when the electronic device is in a super macro mode.

8. The method according to claim 7, wherein the displaying the first image when the electronic device is in a super macro mode comprises:

displaying the first image on a first display interface of the electronic device, wherein the first display interface further comprises a first icon, and the first icon indicates the super macro mode.

9. The method according to claim 8, wherein the first icon comprises a first control, and the method further comprises:

detecting a first operation on the first control; and exiting, by the electronic device, the super macro mode in response to the first operation.

10. The method according to claim 7, wherein the displaying a second image comprises:

displaying the second image when the electronic device exits the super macro mode.

11. The method according to claim 1, wherein the first camera comprises an ultra wide-angle camera, and the second camera comprises a wide-angle camera; or the first camera comprises a wide-angle camera, and the second camera comprises a telephoto camera.

12. The method according to claim 1, wherein the electronic device is at a same position when the electronic device displays the first image and the second image.

13. The method according to claim 1, wherein the first image comprises a first to-be-photographed object, the second image comprises a second to-be-photographed object, the first to-be-photographed object and the second to-be-photographed object are at a same position, a distance between the first to-be-photographed object and the electronic device is a third distance, a distance between the second to-be-photographed object and the electronic device is a fourth distance, and the third distance is less than the fourth distance.

14. The method according to claim 1, wherein the first image and the second image comprise a third to-be-photographed object, and the third to-be-photographed object is at a same position when the first image and the second image are displayed; a distance between the third to-be-photographed object and the electronic device is a fifth distance when the first image is collected; and a distance between the third to-be-photographed object and the electronic device is a sixth distance when the second image is collected, and the fifth distance is less than the sixth distance.

15. An electronic device, comprising:
   one or more processors and a memory, wherein
   the memory is coupled to the one or more processors, the memory is configured to store computer program code, the computer program code comprises computer instructions, and the one or more processors invoke the computer instructions to enable the electronic device to:
   start a camera application in the electronic device;
   display a first image, wherein the first image is an image collected by a first camera;
   obtain a first distance based on a parameter of the first camera, and obtaining a second distance based on a parameter of a second camera, wherein the first distance and the second distance indicate an object distance between the electronic device and a to-be-photographed object; and
   display a second image when the first distance is greater than a first preset threshold, and the second distance is greater than a second preset threshold, wherein
   the second image is an image collected by the second camera;
   the first preset threshold is different from the second preset threshold; the first preset threshold is a threshold obtained based on a focus parameter of the first camera;
   the second preset threshold is a threshold obtained based on a focus parameter of the second camera;
   the focus parameter of the first camera is a focus distance range [X1, X2], and the first preset threshold is greater than or equal to X1; and
   the focus parameter of the second camera is a focus distance range [X3, X4], and the second preset threshold is greater than or equal to X3.

16. The electronic device according to claim 15, wherein the processors are configured to invoke computer instructions to enable the electronic device further to:
   determine whether a brightness parameter of a photographing scene in which the electronic device is located is less than or equal to a first brightness threshold when the first distance is less than or equal to the first preset threshold, and/or the second distance is less than or equal to the second preset threshold; and
   display the second image when the brightness parameter is less than or equal to the first brightness threshold, wherein
   the first brightness threshold is a preset threshold obtained based on a first brightness range, and the first brightness range is used to represent an effective brightness range in which the first camera performs focusing.

17. The electronic device according to claim 16, wherein a zoom ratio corresponding to a case that the electronic device displays the first image is a first zoom ratio, a current zoom ratio of the electronic device is a second zoom ratio, and wherein the processors are configured to invoke computer instructions to enable the electronic device further to:
   determine whether the second zoom ratio is the same as the first zoom ratio when the brightness parameter is greater than the first brightness threshold; and
   display the second image when the second zoom ratio is different from the first zoom ratio.

18. A chip system, wherein the chip system is applicable to an electronic device, and the chip system comprises one or more processors, wherein the processors are configured to invoke computer instructions to enable the electronic device to:
   start a camera application in the electronic device;
   display a first image, wherein the first image is an image collected by a first camera;
   obtain a first distance based on a parameter of the first camera, and obtaining a second distance based on a parameter of a second camera, wherein the first distance and the second distance indicate an object distance between the electronic device and a to-be-photographed object; and
   display a second image when the first distance is greater than a first preset threshold, and the second distance is greater than a second preset threshold, wherein the second image is an image collected by the second camera;
   the first preset threshold is different from the second preset threshold;
   the first preset threshold is a threshold obtained based on a focus parameter of the first camera;
   the second preset threshold is a threshold obtained based on a focus parameter of the second camera;
   the focus parameter of the first camera is a focus distance range [X1, X2], and the first preset threshold is greater than or equal to X1; and
   the focus parameter of the second camera is a focus distance range [X3, X4], and the second preset threshold is greater than or equal to X3.

19. The chip system according to claim 18, wherein the processors are configured to invoke computer instructions to enable the electronic device further to:
   determine whether a brightness parameter of a photographing scene in which the electronic device is located is less than or equal to a first brightness threshold when the first distance is less than or equal to the first preset threshold, and/or the second distance is less than or equal to the second preset threshold; and
   display the second image when the brightness parameter is less than or equal to the first brightness threshold, wherein
   the first brightness threshold is a preset threshold obtained based on a first brightness range, and the first brightness range is used to represent an effective brightness range in which the first camera performs focusing.

20. The chip system according to claim 19, wherein a zoom ratio corresponding to a case that the electronic device displays the first image is a first zoom ratio, a current zoom ratio of the electronic device is a second zoom ratio, and wherein the processors are configured to invoke computer instructions to enable the electronic device further to:
   determine whether the second zoom ratio is the same as the first zoom ratio when the brightness parameter is greater than the first brightness threshold; and
   display the second image when the second zoom ratio is different from the first zoom ratio.

* * * * *